(12) United States Patent
Kottenstette et al.

(10) Patent No.: US 10,366,288 B1
(45) Date of Patent: Jul. 30, 2019

(54) SYSTEMS AND METHODS FOR ANALYZING REMOTE SENSING IMAGERY

(71) Applicant: Cape Analytics, Inc., Mountain View, CA (US)

(72) Inventors: Ryan Kottenstette, Los Altos, CA (US); Peter Lorenzen, Los Altos, CA (US); Suat Gedikli, Planegg (DE)

(73) Assignee: CAPE ANALYTICS, INC., Mountain View, CA (US)

( * ) Notice: Subject to any disclaimer, the term of this patent is extended or adjusted under 35 U.S.C. 154(b) by 0 days.

(21) Appl. No.: 16/353,361

(22) Filed: Mar. 14, 2019

Related U.S. Application Data

(62) Division of application No. 15/253,488, filed on Aug. 31, 2016.

(60) Provisional application No. 62/315,180, filed on Mar. 30, 2016, provisional application No. 62/212,424, filed on Aug. 31, 2015.

(51) Int. Cl.
| | |
|---|---|
| *G06K 9/00* | (2006.01) |
| *G06K 9/46* | (2006.01) |
| *G06K 9/62* | (2006.01) |
| *H04N 5/33* | (2006.01) |

(52) U.S. Cl.
CPC ....... *G06K 9/00637* (2013.01); *G06K 9/4623* (2013.01); *G06K 9/627* (2013.01); *H04N 5/332* (2013.01)

(58) Field of Classification Search
CPC .. G06K 9/00637; G06K 9/4623; G06K 9/627; H04N 5/332
USPC ................................................. 382/103, 294
See application file for complete search history.

(56) References Cited

U.S. PATENT DOCUMENTS

| | | | |
|---|---|---|---|
| 7,327,902 B2 * | 2/2008 | Ritt | G06K 9/32 382/294 |
| 7,945,117 B2 * | 5/2011 | Hermosillo Valadez | G06K 9/6206 382/128 |
| 8,207,964 B1 | 6/2012 | Meadow et al. | |
| 9,159,130 B2 * | 10/2015 | Kneepkens | G06K 9/0014 |
| 2003/0146913 A1 * | 8/2003 | Shen | G06T 7/0012 345/419 |
| 2005/0084178 A1 * | 4/2005 | Lure | G06T 7/0012 382/294 |

(Continued)

OTHER PUBLICATIONS

Communication pursuant to Rule 164(1) EPC dated Mar. 19, 2019 in corresponding European Patent Application No. 16842927.2 (13 pages).

(Continued)

*Primary Examiner* — Van D Huynh
(74) *Attorney, Agent, or Firm* — Wilmer Cutler Pickering Hale and Dorr LLP

(57) ABSTRACT

Disclosed systems and methods relate to remote sensing, deep learning, and object detection. Some embodiments relate to machine learning for object detection, which includes, for example, identifying a class of pixel in a target image and generating a label image based on a parameter set. Other embodiments relate to machine learning for geometry extraction, which includes, for example, determining heights of one or more regions in a target image and determining a geometric object property in a target image. Yet other embodiments relate to machine learning for alignment, which includes, for example, aligning images via direct or indirect estimation of transformation parameters.

7 Claims, 50 Drawing Sheets

(56) References Cited

U.S. PATENT DOCUMENTS

| | | |
|---|---|---|
| 2006/0165267 A1* | 7/2006 | Wyman .................... G06T 7/32 382/128 |
| 2010/0111428 A1 | 5/2010 | Yu et al. |
| 2013/0121571 A1 | 5/2013 | Gokturk et al. |
| 2015/0269598 A1 | 9/2015 | Terrazas et al. |
| 2015/0286786 A1 | 10/2015 | El-Baz et al. |
| 2015/0347872 A1 | 12/2015 | Taylor et al. |
| 2016/0026900 A1 | 1/2016 | Ando |

OTHER PUBLICATIONS

Eigen et al., "Depth Map Prediction from a Single Image using a Multi-Scale Deep Network". 9 pages (2014), retrieved online, <https://papers.nips.cc/paper/5539-depth-map-prediction-from-a-single-image-using-a-multi-scale-deep-network.pdf>.

Maire et al., "A Convolutional Neural Network for Automatic Analysis of Aerial Imagery," 2014 International Conference on Digital Image Computing: Techniques and Applications (DICTA), 8 pages (2014).

Moussa and Ei-Sheimy, "Man-made objects classification from satellite/aerial imagery using neural networks," International Archives of the Photogrammetry, Remote Sensing and Spatial Information Sciences—ISPRS Archives, 4 pages (2010).

* cited by examiner

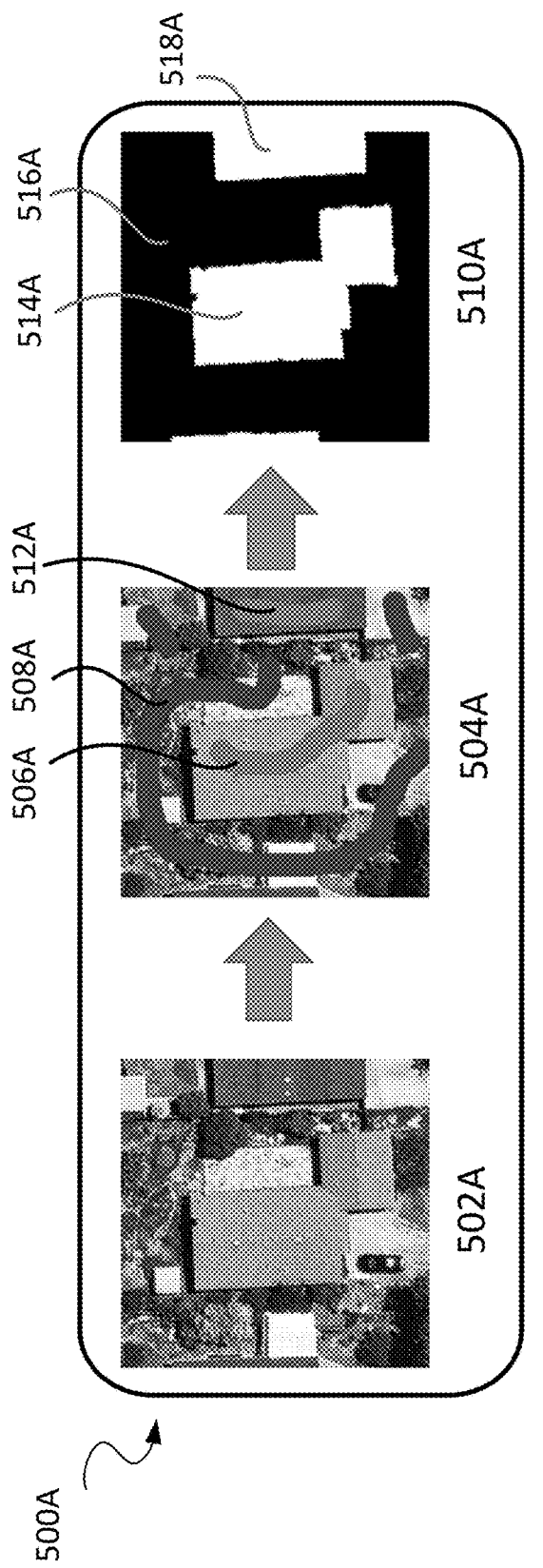

| focal | focal | skew | ppi | ppi |
|---|---|---|---|---|
| 250 | 250 | 0.1 | 45 | 45 |

FIG. 33B

| Date | Time | Latitude | Longitude |
|---|---|---|---|
| 01-Jan-2016 | 13:45:09 | 35.6 | -111.83 |

FIG. 33C

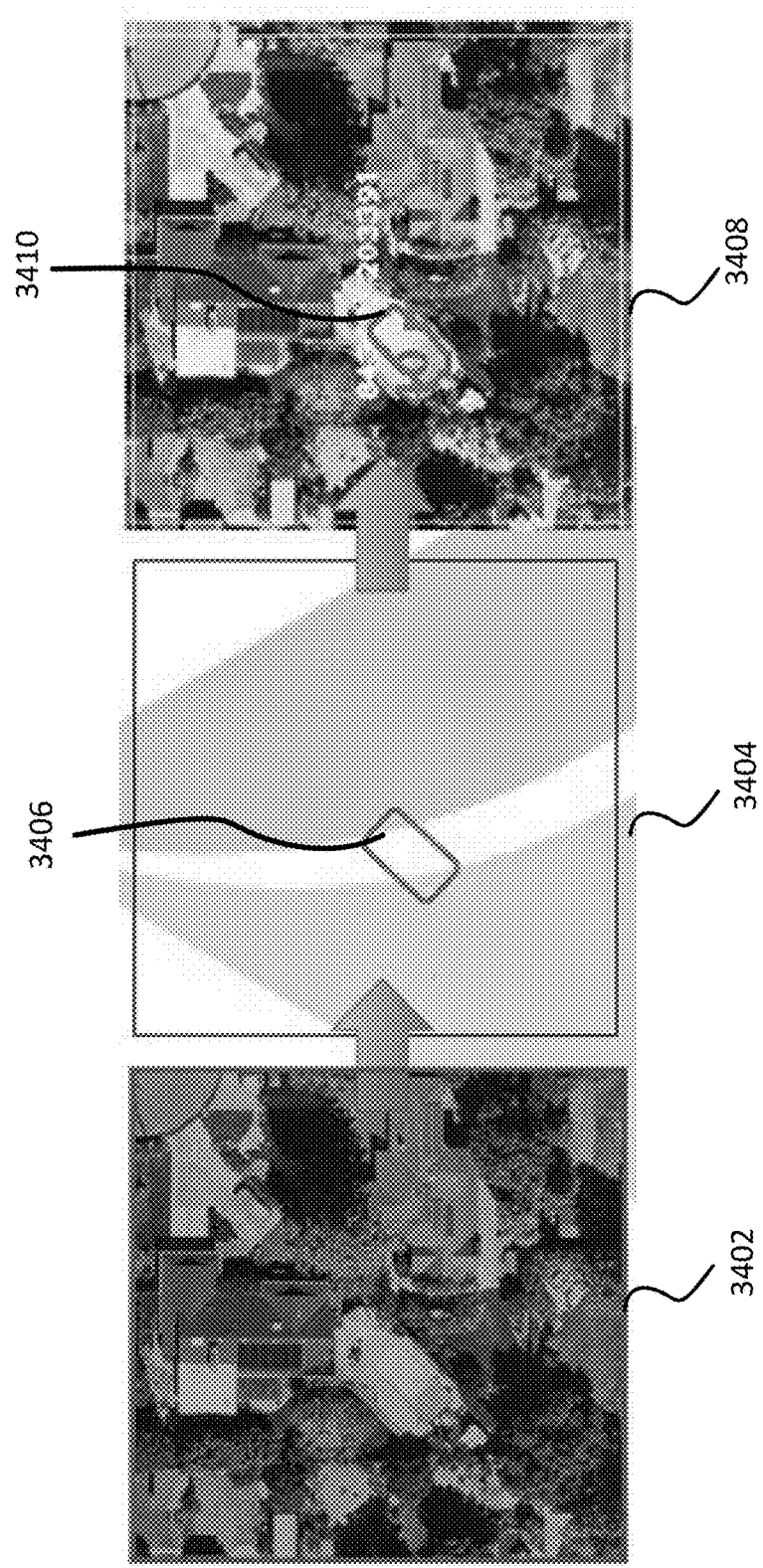

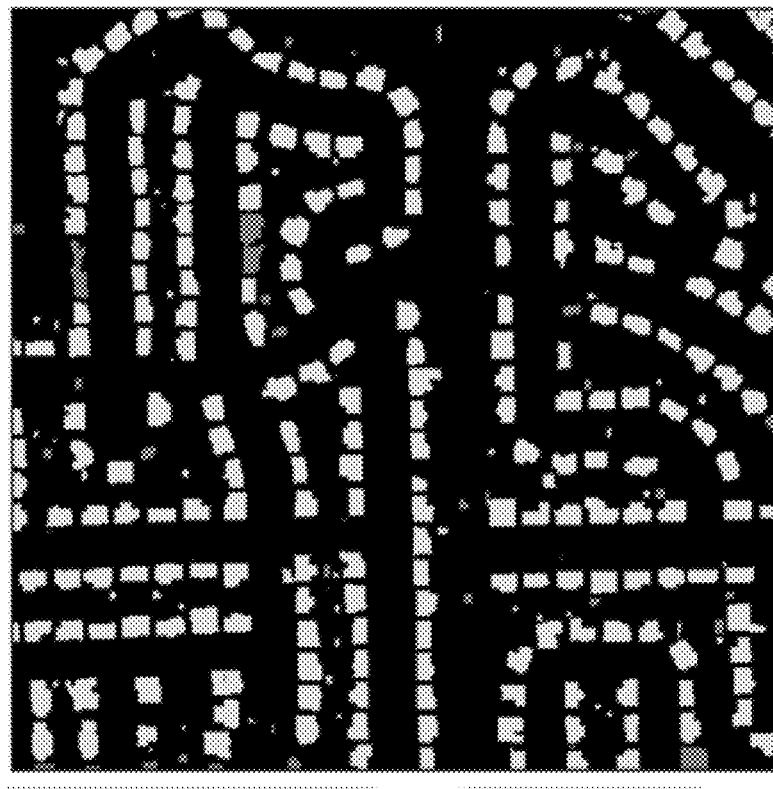
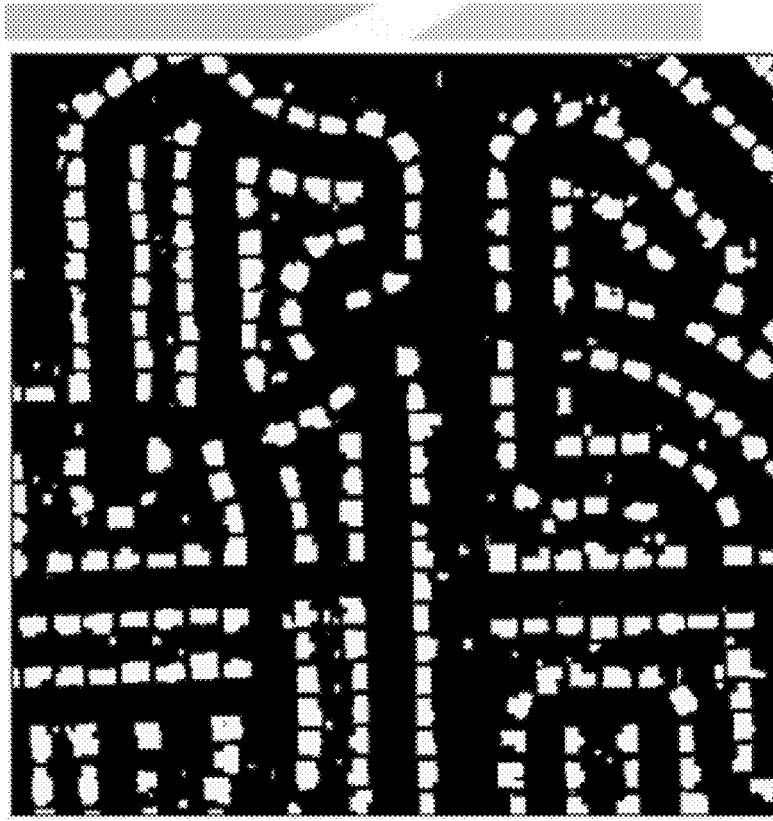
FIG. 38

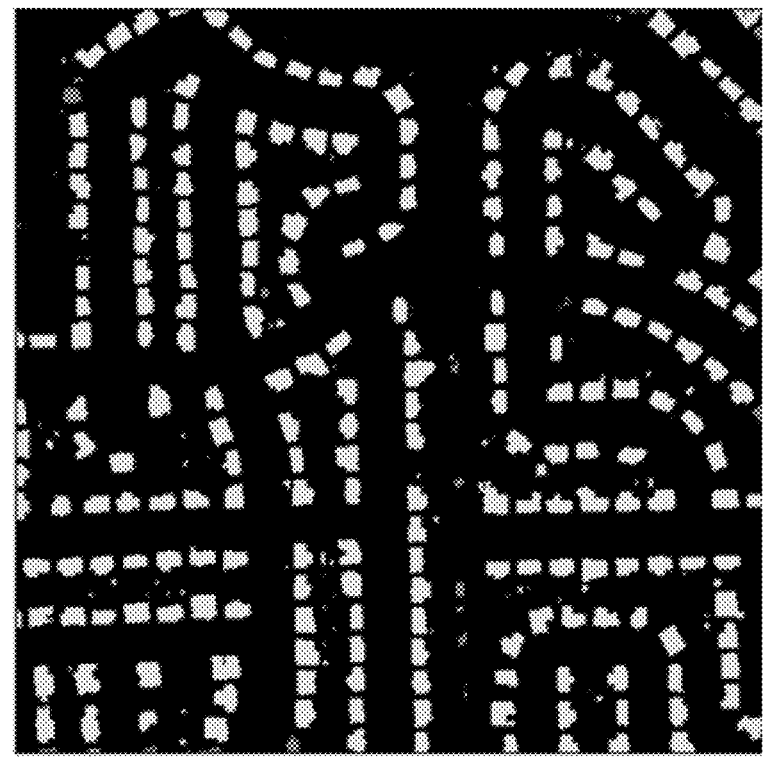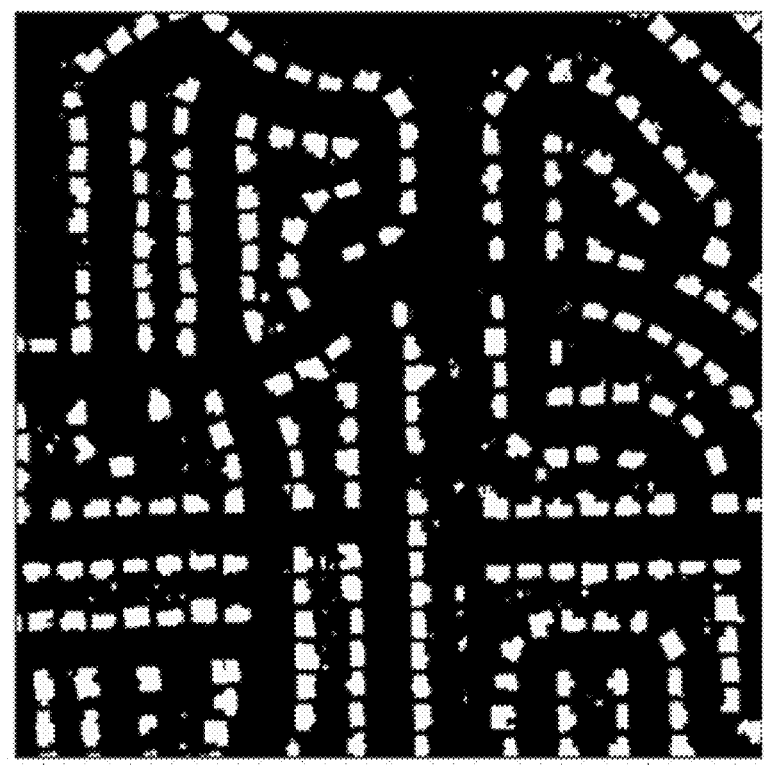
FIG. 39

SYSTEMS AND METHODS FOR ANALYZING REMOTE SENSING IMAGERY

RELATED APPLICATION

This application is a divisional of U.S. Non-Provisional patent application Ser. No. 15/253,488, titled "Systems And Methods For Analyzing Remote Sensing Imagery," which was filed on Aug. 31, 2016; which further claims the benefit of the following applications: U.S. Provisional Patent Application No. 62/212,424, titled "Systems And Methods For Analyzing Remote Sensing Imagery," which was filed on Aug. 31, 2015; and U.S. Provisional Patent Application No. 62/315,180, titled "Systems And Methods For Analyzing Remote Sensing Imagery," which was filed on Mar. 30, 2016; all of the foregoing patent applications are incorporated herein by reference in their entirety for all purposes.

BACKGROUND OF THE INVENTION

Technical Field

Embodiments of the present disclosure relate to the field of remote sensing, deep learning, and object detection.

Description of the Related Art

Structural and geospatial data are valuable in areas such as, for example, real estate transaction, planning, and/or insurance. Non-limiting examples of the structural and geospatial data include the following: the area of real property including land and/or buildings; the square footage of a building; the roof size and/or type; the presence of a pool and its size and/or location; and the presence of trees and its type, size, and/or location.

Traditionally, the structural and geospatial information can be obtained by (1) manually checking real estate records from relevant agencies; or (2) manually surveying the underlying real properties. These traditional methods suffer from a number of drawbacks and deficiencies. First, the records can be out of date, missing, or destroyed. Second, the manual checking and surveying are labor intensive and costly. Third, surveying area such as the roof of a building or the crown of a tree can be dangerous.

Therefore, there is a need in the art to provide systems and methods for obtaining structural and geospatial data that overcome these drawbacks and deficiencies.

SUMMARY

In accordance with the disclosed subject matter, systems, methods, and computer readable media are provided for remote sensing, deep learning, and detecting object.

A method of identifying a class of a pixel in a target image according to one embodiment of the present disclosure can include receiving, at an object detector, training images, wherein each training image includes pixels; receiving, at the object detector, labels, wherein each label associates a class to each of the pixels of the training images; creating, at the object detector, a classifier configured to identify the class of each pixel based on the training images and the labels; receiving, at the object detector, a target image; dividing, at the object detector, the target image into a plurality of divisions, wherein each division includes a plurality of pixels; selecting, at the object detector, a target pixel from the plurality of pixels; and determining, at the object detector using the classifier, a target class for the target pixel of the target image by comparing the target pixel to neighboring pixels from the plurality of pixels.

According to some embodiments, the method can further include generating a segmented image based on the target image and the determined target class for the target pixel.

According to some embodiments, the segmented image can be generated using one of a graph-cut, GrabCut, conditional random fields, or manual technique.

According to some embodiments, each of the training images and the target image can be one of a red-green-blue, panchromatic, infrared, ultraviolet, multi-spectral, or hyperspectral image.

According to some embodiments, the classifier can be created using a convolutional neural network.

According to some embodiments, the neighboring pixels can be immediately adjacent to the target pixel.

According to some embodiments, each of the class and the target class can be at least one of a building, roof, pool, road, trampoline, automobile, truck, boat, plane, communication tower, power transmission tower, hedge, porch, patio, deck, or a tree trunk.

A method of generating a label image based on a parameter set according to one embodiment of the present disclosure can include receiving, at an object detector, training images; receiving, at the object detector, training parameter sets, wherein each of the training parameter sets corresponds to a transformed representation of one or more labels, and wherein the one or more labels correspond to a different training image; creating, at the object detector, a classifier configured to determine a parameter set for an image based on the training images and the training parameter sets; receiving, at the object detector, a target image; determining, at the object detector using the classifier, a target parameter set that corresponds to one or more target labels for the target image, wherein the target parameter set corresponds to a target transformed representation of the one or more target labels; and generating, at the object detector, a label image by applying an inverse target parameter set to the target image, wherein the inverse target parameter set corresponds to an inverse transformation of a transformation represented by the target parameter set, wherein one or more pixels of the label image are associated with a class.

According to some embodiments, each of the one or more classes can be either two-class or multi-class.

According to some embodiments, the method can further include receiving second training parameter sets for the training images, wherein the second training parameter sets comprise at least one of time, date, sun direction, sun position, latitude, or longitude.

According to some embodiments, each of the training parameters sets and the target parameter set can represent a transformation created using one of discrete cosine transform, wavelets, discrete Fourier transform, principal component analysis, non-negative Matrix Factorization, or Hadamard transform.

According to some embodiments, each of the training images and the target image can be one of a red-green-blue, panchromatic, infrared, ultraviolet, multi-spectral, or hyperspectral image.

A method of determining heights of one or more regions in a target image according to one embodiment of the present disclosure can include receiving, at an extractor, training images, wherein each of the training images includes one or more regions, wherein each region includes one or more pixels; receiving, at the extractor, labels that indicate a height for each pixel of the one or more regions of each training image; creating, at the extractor, a regression model configured to determine a height of a region based on the training images and the labels; receiving, at the extractor, a target image comprising a target region; and determining, at the extractor using the regression model, a height of the target region in the target image.

According to some embodiments, each of the training images and the target image can be one of a red-green-blue, panchromatic, infrared, ultraviolet, multi-spectral, or hyperspectral image.

According to some embodiments, receiving the training images can include receiving the training images from one or more sensors at fixed positions.

According to some embodiments, receiving the training images can further include receiving orientations of the sensors relative to one another if the training images are from two or more sensors.

According to some embodiments, receiving the training images can include receiving the training images from one or more sensors and parameters related to at least one of one or more positions of the one or more sensors, orientation of illumination source that associates formation of the training images, time, date, latitude, or longitude.

According to some embodiments, the training images can be projected onto a same geographic surface that defines the one or more regions.

According to some embodiments, the method can further include receiving, at the extractor, parameters related to positions of one or more sensors configured to capture the training images.

A method of determining a geometric object property in a target image according to one embodiment of the present disclosure can include receiving, at an extractor, training images; receiving, at the extractor, a geometric object corresponding to a portion of one or more of the training images; receiving, at the extractor, training geometric object properties, wherein each of the training geometric object properties identifies a corresponding geometric object; receiving, at the extractor, first one or more parameters related to orientation of illumination source that associates formation of the training images for the training images; creating, at the extractor, at least one of a classifier or a regression model configured to determine a geometric object property for an image based on the training images, the geometric object, the training geometric object properties, and the first one or more parameters; receiving, at the extractor, a target image; receiving, at the extractor, a target geometric object corresponding to a portion of the target image; receiving, at the extractor, second one or more parameters related to orientation of illumination source that associates formation of the target image; and determining, at the extractor using the at least one of a classifier or a regression model, a target geometric object property associated with the target geometric object.

According to some embodiments, each of the training images and the target image can be one of a red-green-blue, panchromatic, infrared, ultraviolet, multi-spectral, or hyperspectral image.

According to some embodiments, the training geometric object property can be at least one of slope, pitch, dominant pitch, material, area, height, or volume, and the target geometric object property can be at least one of slope, pitch, dominant pitch, material, area, height, or volume.

According to some embodiments, the geometric object can be at least one of a point, a contour, an area, or a binary mask, and the target geometric object can be at least one of a point, a contour, an area, or a binary mask.

According to some embodiments, the first one or more parameters can include at least one of time, date, sun direction, sun position, latitude, longitude, or object material, and the second one or more parameters can include at least one of time, date, sun direction, sun position, latitude, longitude, or object material.

A method of aligning images according to one embodiment of the present disclosure can include receiving, at an aligning device, N first type of image sets, wherein N>1, wherein each of the N first type of image sets includes one or more first type of images; receiving, at the aligning device, N second type of image sets, wherein each of the N second type of image sets includes different one or more second type of images, wherein each of the N second type of image sets is aligned with a different one of the N first type of image sets; generating, at the aligning device, M transform parameters, wherein M>1; generating, at the aligning device, M transformed second type of image sets for each of the N first type of image sets so that there are N*M total transformed second type of image sets, wherein each of the M transformed second type of image sets for each of the N first type of image sets is generated by transforming a respective one of the N second type of images sets using a different one of the M transform parameters; creating, at the aligning device, a regressor configured to identify parameters of a transformation that maps a second type of image set to a first type of image set, wherein the regressor is created based on the N first type of image sets, the M transform parameters, and the N*M total transformed second type of image sets; receiving, at the aligning device, a target first type of image set and a target second type of image set; generating, at the aligning device using the regressor, a target transform parameter based on the target first type of image set and the target second type of image set; and generating, at the aligning device, a transformed target second type of image set by transforming the target second type of image set using the target transform parameter so that the transformed target second type of image set is aligned with the target first type of image set.

According to some embodiments, the first type of images can be red-green-blue images, and the second type of images can be parcel maps.

According to some embodiments, each image in the first type of image sets, the second type of image sets, the target first type of image set, and the target second type of image set can be one of a red-green-blue, panchromatic, infrared, ultraviolet, multi-spectral, or hyperspectral image.

According to some embodiments, the method can further include determining, at the aligning device, whether the target transform parameter results in convergence.

According to some embodiments, the method can further include the following: if it is determined that the target transform parameter does not result in convergence, performing the following steps until convergence: (1) generating, at the aligning device, a new target transform parameter; and (2) determining, at the aligning device, whether the new target transform parameter results in convergence.

According to some embodiments, one or more of the N first type of image sets can include a plurality of co-registered first type of images.

According to some embodiments, the transform parameters and the target transform parameter can be for at least one of translation, similarity, perspective, thin-plate-splines, piece-wise affine, B-spline, or high-order bivariate polynomials.

A method of aligning images according to one embodiment of the present disclosure can include receiving, at an aligning device, N first type of image sets, wherein N>1, wherein each of the N first type of image sets includes one or more first type of images; receiving, at the aligning device, N second type of image sets, wherein each of the N second type of image sets includes different one or more second type of images, wherein each of the N second type of image sets is aligned with a different one of the N first type of image sets; creating, at the aligning device, a regressor configured to identify a second type of image set given a first type of image set, wherein the regressor is created based on the N first type of image sets and the N second type of image sets; receiving, at the aligning device, a target first type of image set and a plurality of first key points of the target first type of image set; receiving, at the aligning device, a target second type of image set; dividing, at the aligning device, the target first type of image set into a first plurality of divisions, wherein each of the first plurality of divisions is centered around a different one of the plurality of first key points; generating, at the aligning device using the regressor, a second plurality of divisions of the target second type of image set based on the first plurality of division of the target first type of image set; identifying, at the aligning device, a plurality of second key points, wherein each second key point is from a different division of the second plurality of division; identifying, at the aligning device, transform parameters that maps the plurality of second key points to the plurality of the first key points; and generating, at the aligning device, a transformed target second type of image set by transforming the target second type of image set using the transform parameters so that the transformed target second type of image set is aligned with the target first type of image set.

According to some embodiments, each image in the first type of image sets, the second type of image sets, the target first type of image set, and the target second type of image set can be one of a red-green-blue, panchromatic, infrared, ultraviolet, multi-spectral, or hyperspectral image.

According to some embodiments, the transform parameters can be for at least one of translation, similarity, perspective, thin-plate-splines, piece-wise affine, B-spline, or high-order bivariate polynomials.

According to some embodiments, one or more of the N first type of image sets can include a plurality of co-registered first type of images.

The present disclosure also discloses systems that are operative to perform the method steps described above. Disclosed systems can include but not limited to a processor, memory, storage medium (e.g., local storage medium, remote storage medium), communication network, server (e.g., imagery analysis server), device (e.g., imagery acquisition device, client device), module (e.g., analytical module), web service, and pipeline.

The present disclosure also discloses computer readable media that include executable instructions (e.g., computer program of instructions) operable to cause a system to perform the method steps described above.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be made to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5A illustrates an example of detecting objects using manually identifying labels.

FIGS. 33A-33D illustrate example parameter values related to a sensor according to some embodiments of the present disclosure.

FIG. 34 illustrates an example of determining a geometric object property according to some embodiments of the present disclosure.

FIG. 38 illustrates a binary output generated from using a pseudo multi-label classification method according to some embodiments of the present disclosure.

FIG. 39 illustrates a binary output generated from using a fully convolutional network according to some embodiments of the present disclosure.

DETAILED DESCRIPTION

Figure 1A:
FIG. 1A illustrates an image of a residential neighborhood including a pool.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Disclosed systems and methods relate to the field of remote sensing, deep learning, and object detection.

Remote Sensing

Remote sensing is a technology field that includes the remote acquisition of sensory information. This can include, for example, satellite imagery, aerial imagery, radar, sonar, Light Detection and Ranging (LIDAR), seismography, and/or any other suitable mode or combination of modes of sensory information gathering that does not require direct physical contact.

Deep Learning

Deep learning is a type of machine learning where a multi-level neural network is developed and based on progressively higher levels of abstraction. In a deep learning framework, features are typically learned from raw input data. This is in contrast to a shallow learning framework, which can be viewed as having one input-output layer where handcrafted features (e.g., Scale Invariant Feature Transform (SIFT)) are used for a specific task.

A deep learning framework can be decomposed into generative and discriminative architectures. Generative architectures attempt to characterize high-order correlation properties of input data (e.g., autoencoders) for pattern analysis or synthesis. These approaches estimate joint distributions of input data and associated classes (e.g., as in Bayes nets). In discriminative architectures, networks are designed to provide discriminative power to classification by directly estimating posterior distributions of class conditioned on the input data (e.g., as in convolutional neural networks). The architecture of convolutional neural networks (CNN) can be viewed as a cascade of modules consisting of a convolutional layer (which share many weights spatially) and a pooling layer (which subsamples the output of the convolutional layer).

Object Detection

Object detection is a process of detecting regions in images that have semantic meaning (e.g., locating pools, gabled roofs, roads, trees in aerial imagery). Object detection methods can combine both a bottom-up and a top-down approach.

An example of bottom-up object detection is image segmentation. Image segmentation is a process where pixels in an image are labeled in such a way that pixels sharing the same characteristics (e.g., color, texture, proximity) have the same label. In this way, an image is parceled into distinct segments, typically in a bottom-up approach, where low-level local image properties are used to detect coherent regions. Image segmentation is often difficult in situations where noise, occlusions, shadows, etc. exist. Methods that can be used to overcome these situations include thresholding, clustering, edge detection, region growing, and graph partitioning.

Top-down approaches for object detection often involve a training stage to obtain class-specific model features (e.g., parameters for a classifier) that are used to generate a hypothesis for the existence of objects.

Embodiments of the present disclosure utilize a combined top-down and bottom-up approach.

Remote Sensing Imagery System

Figure 26:
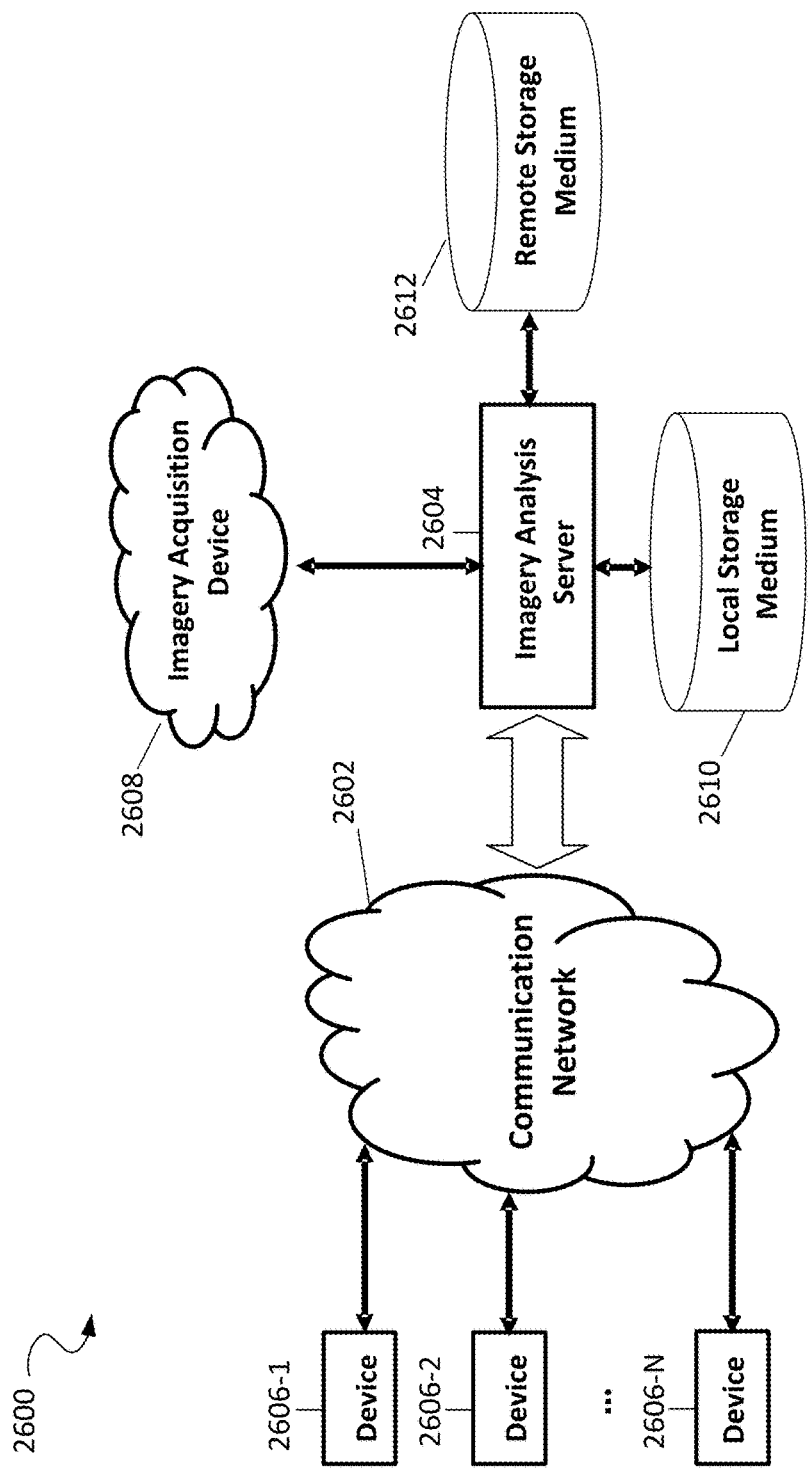
FIG. 26 illustrates a system for analyzing remote sensing imagery according to some embodiments of the present disclosure.

FIG. 26 illustrates a system 2600 for analyzing remote sensing imagery in accordance with embodiments of the present disclosure. The system 2600 can include an imagery analysis server 2604, at least one client device 2606 (e.g., client devices 2606-1, 2606-2, . . . 2606-N), an imagery acquisition device 2608, a local storage medium 2610, and a remote storage medium 2612. All components in the system 2600 can be coupled directly or indirectly to a communication network 2602. The components described in the system 2600 can be further broken down into more than one component and/or combined together in any suitable arrangement. Further, one or more components can be rearranged, changed, added, and/or removed. For example, in some embodiments, the system 2600 can obtain the data from third-party vendors. In other embodiments, the system 2600 can directly acquire data through the imagery acquisition device 2608.

Each client device 2606 can communicate with the imagery analysis server 2604 to send data to, and receive data from, the imagery analysis server 2604 via the communication network 2602. Each client device 2606 can be directly or indirectly coupled to the imagery analysis server 2604. Additionally, each client device 2606 can be connected to the imagery analysis server 2604 via any other suitable device(s), communication network, or combination thereof. A client device 2606 can include, for example, a desktop computer, a mobile computer, a tablet computer, a cellular device, a smartphone, a television, or any computing system that is capable of performing computation.

The imagery analysis server 2604 can receive imagery data from the imagery acquisition device 2608. The imagery analysis server 2604 can extract, analyze, and/or label structural and/or geospatial information of the received imagery data based on the techniques disclosed in this present disclosure. In some embodiments, a classifier can be trained and/or maintained in the imagery analysis server 2604. The imagery analysis server 2604 is shown as a single server; however, the imagery analysis server 2604 can include more than one server. For example, in some embodiments, the imagery analysis server 2604 can include multiple modular and scalable servers and/or other suitable computing resources. The imagery analysis server 2604 can support elastic computing, which can dynamically adapt computing resources based on demand. The imagery analysis server 2604 can be deployed locally and/or remotely in a third-party cloud-based computing environment. In some embodiments, within the imagery analysis server 2604 or any other suitable component of system 2600, a device or a tool—including a classifier, a regressor, an object detector, an extractor, or an aligning device that are described in the present disclosure—can be implemented as software and/or hardware.

The imagery acquisition device 2608 can provide the imagery analysis server 2604 with imagery data. In some embodiments, the imagery acquisition device 2608 can acquire satellite imagery, aerial imagery, radar, sonar, LIDAR, seismography, or any other suitable mode or combination of modes of sensory information. In some embodiments, the system 2600 does not include the imagery acquisition device 2608 and can obtain imagery data from third-party vendors.

The system 2600 includes two storage media: the local storage medium 2610 and the remote storage medium 2612. The local storage medium 2610 can be located in the same physical location as the imagery analysis server 2604, and the remote storage medium 2612 can be located at a remote location or any other suitable location or combination of locations. In some embodiments, the system 2600 can include more than one local storage medium, more than one remote storage medium, and/or any suitable combination thereof. In some embodiments, the system 2600 may only include the local storage medium 2610 or only include the remote storage medium 2612.

The system 2600 can also include one or more relational databases, which include scalable read replicas to support dynamic usage. The one or more relational databases can be located in the local storage medium 2610, the remote storage medium 2612, the imagery analysis server 2604, and/or any other suitable components, combinations of components, or locations of the system 2600.

The communication network 2602 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and/or network protocols. In some embodiments, the communication network 2602 can be an encrypted network. While the system 2600 shows the communication network 2602 as a single network, the communication network 2602 can also include multiple interconnected networks described above.

Figure 27:
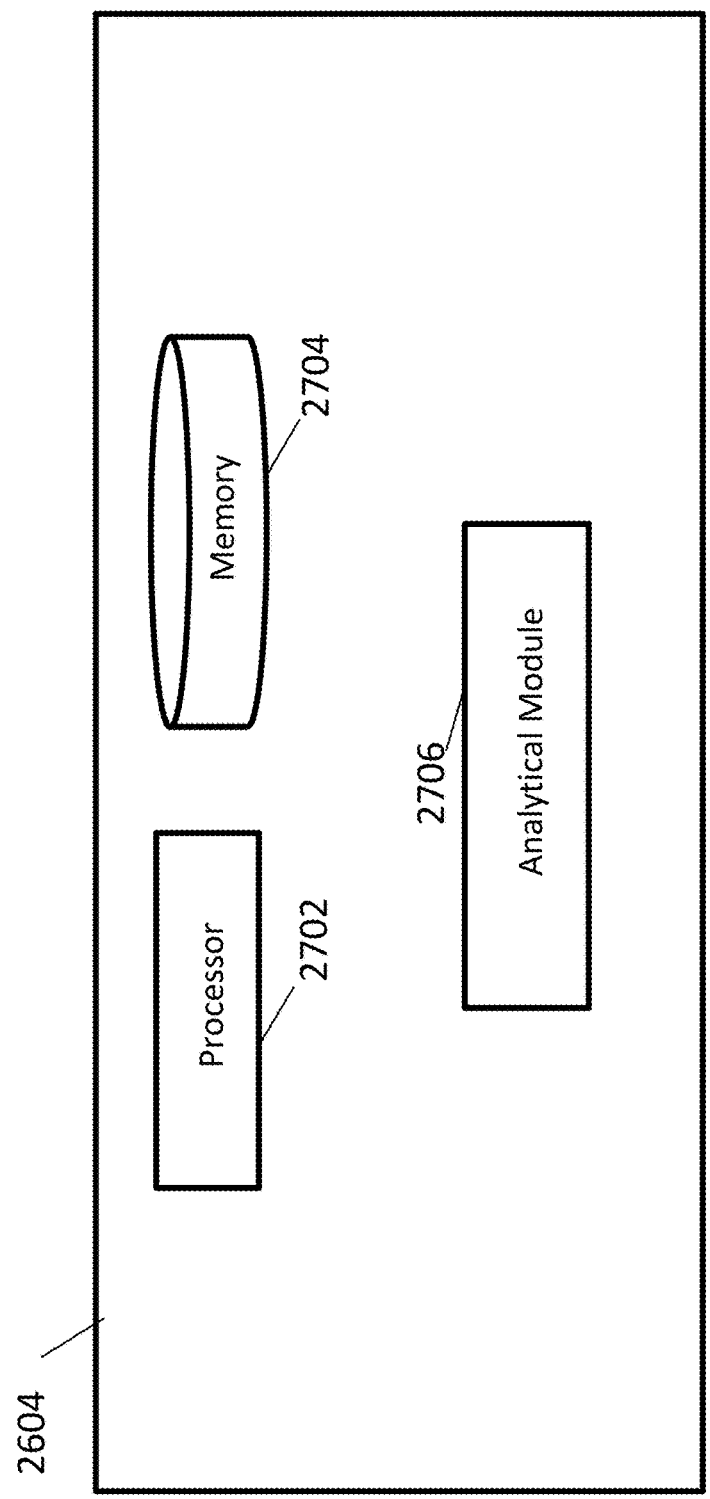
FIG. 27 illustrates a block diagram of an imagery analysis server according to some embodiments of the present disclosure.

FIG. 27 illustrates a block diagram of the imagery analysis server 2604 in accordance with some embodiments of the present disclosure. The imagery analysis server 2604 includes a processor 2702, a memory 2704, and an analytical module 2706. The imagery analysis server 2604 may include additional modules, fewer modules, or any other suitable combination of modules that perform any suitable operation or combination of operations.

The processor 2702 is configured to implement the functionality described herein using computer executable instructions stored in temporary and/or permanent non-transitory memory. The processor can be a general purpose processor and/or can also be implemented using an application specific integrated circuit (ASIC), programmable logic array (PLA), field programmable gate array (FPGA), and/or any other integrated circuit.

The processor 2702 can execute an operating system that can be any suitable operating system (OS), including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OS.

The analytical module 2706 can be configured to cause the processor 2702 or the imagery analysis server 2604 to extract, analyze, and/or label structural and/or geospatial information of any imagery data based on the techniques disclosed in the present disclosure. In some embodiments, the analytical module can implement and/or execute to detect objects, extract objects, align images, and/or any other suitable task or combination of tasks described in the present disclosure. In some embodiments, within the analytical module 2706 or any other suitable component of the imagery analysis server 2604, a device or a tool—including a classifier, a regressor, an object detector, an extractor, or an aligning device that are described in the present disclosure—can be implemented as software and/or hardware.

In some embodiments, the analytical module 2706 can be implemented in software using the memory 2704. The memory 2704 can be a non-transitory computer readable medium, flash memory, a magnetic disk drive, an optical drive, a programmable read-only memory (PROM), a read-only memory (ROM), or any other memory or combination of memories.

FIG. 27 shows the imagery analysis server 2604 having the analytical module 2706 that causes the processor 2702 or the imagery analysis server 2604 to perform the operations in accordance with certain embodiments of the disclosed subject matter. The processor 2702 and/or the imagery analysis server 2604 may include additional modules, less modules, or any other suitable combination of modules that perform any suitable operation or combination of operations.

Figure 28:
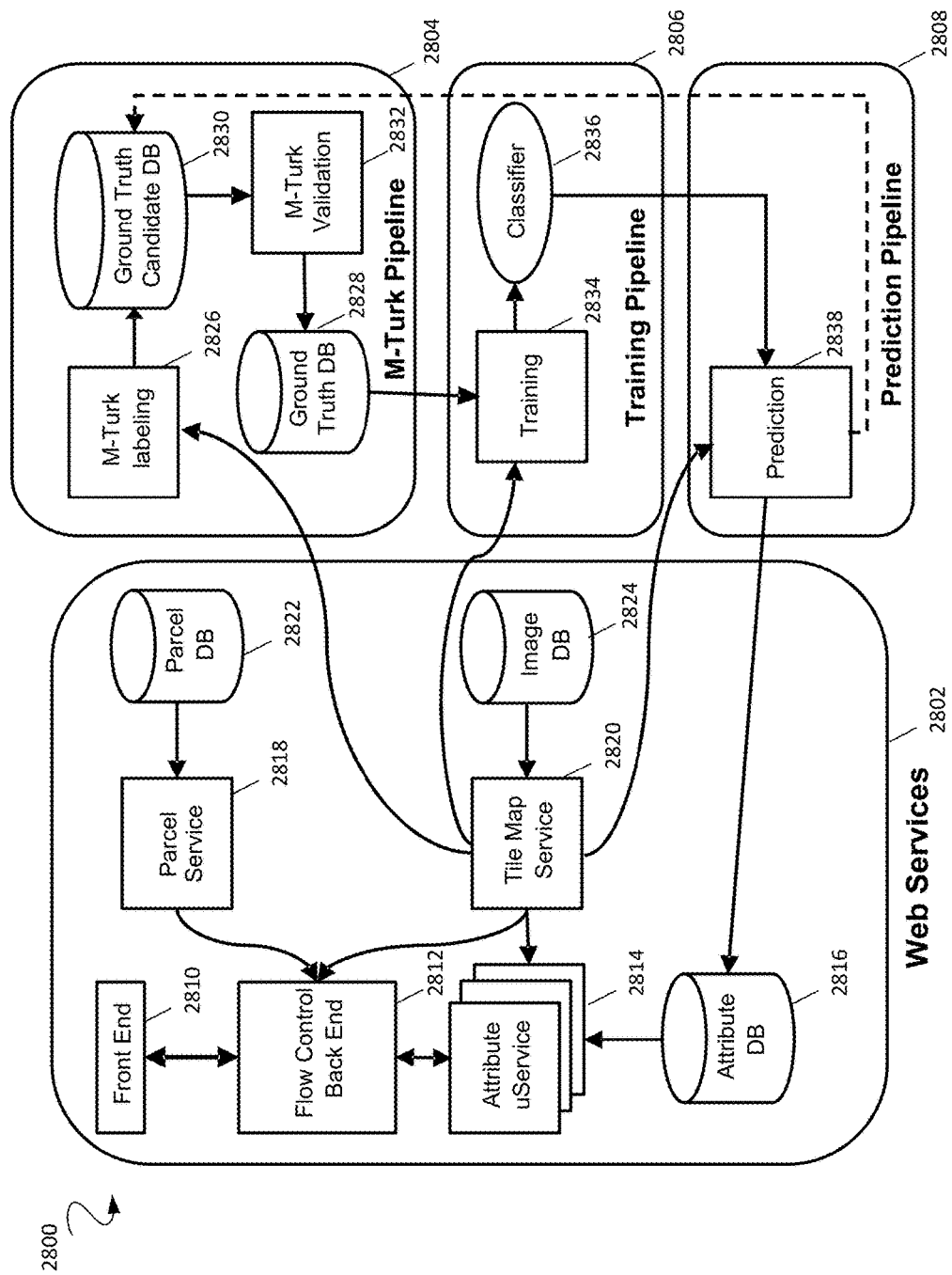
FIG. 28 illustrates a top-level software architecture of a system for analyzing remote sensing imagery according to some embodiments of the present disclosure.

FIG. 28 illustrates a top-level software architecture of a system 2800 for analyzing remote sensing imagery in accordance with some embodiments of the present disclosure. System 2800 can include one or more of the following four components: web services 2802, a Mechanical Turk (M-Turk) pipeline 2804, a training pipeline 2806, or a prediction pipeline 2808.

Web services 2802 can include one or more of the following components: front end 2810, flow control back end 2812, attribute uService 2814, attribute DB 2816, parcel service 2818, tile map service 2820, parcel DB 2822, or image DB 2824. Front end 2810 can provide services to a user. For example, the user can use a browser on a workstation to connect to, and communicate with front end 2810 to execute certain web services functions, such as detecting and extracting objects from remote images. Flow control back end 2812 can communicate with front end 2810. Front control back end 2812 can implement a control flow logic and support a public Representational State Transfer (RESTful) API to client applications and web-based front-end user interface. RESTful APIs can support lightweight, maintainable, and scalable architectures. In some embodiments, flow control back end 2812 can receive and control multiple requests from front end 2810. Flow control back end 2812 can update the status of requests to front end 2810. In some embodiments, flow control back end 2812 can receive data, such as parcel images, from parcel service 2818, which can retrieve these parcel images from parcel DB 2822. Flow control back end 2812 can also receive data, such as images, from tile map service 2820, which can retrieve these images from image DB 2824. Flow control back end 2812 can communicate with attribute uService 2814, which can also receive images from tile map service 2820. In some embodiments, attribute uService 2814 can provide information about detected objects within a context. For example, Attribute uService 2814 can provide information about detected roofs within RGB imagery provided by tile map service 2820. In some embodiments, the information can be related to attributes that can include, for example, whether the detected roof has solar panels, the roof footprint area, etc. In some embodiments, there can be multiple Attribute uServices, each of which can handle a different attribute type. Attribute uService 2814 can also receive attributes from attribute DB 2816. In some embodiments, these attributes can be related to objects in an image. For example, a slope of a roof can be an attribute of the roof. In some embodiments, web services 2802, using attribute uService 2814, can provide information on an attribute of an object in an image based on the image and a related parcel image.

M-Turk pipeline 2804 can support ground truth acquisition by, for example, correctly labeling structures. M-Turk pipeline 2804 can include one or more of the following components: M-Turk labeling 2826, ground truth Candidate DB 2830, M-Turk validation 2832, or ground truth DB 2828. M-Turk labeling 2826 can label images from tile map service 2820 and store the labeled images in ground truth candidate DB 2830. M-Turk validation 2832 can determine whether the ground truth candidate(s) in ground truth candidate DB 2830 is valid. In some embodiments, a ground truth candidate can be valid if its accuracy level can be determined to exceed a threshold value. If the ground truth candidate(s) is valid, it can be stored in ground truth DB 2828.

Training pipeline 2806 can include one or more of the following components: training 2834 and classifier 2836. Training 2834 can receive training images from tile map service 2820 for training. Training 2834 can also receive ground truth data from ground truth DB 2828. Based on the received training images and the received ground truth data, training 2834 can train a classifier 2836. Non-limiting examples of specific instances of training 2834 and classifier 2836 are described in detail below.

Prediction pipeline 2808 can include a prediction 2838 component. Prediction 2838 can use classifier 2836 to predict or classify attributes in an image from tile map service 2820. In some embodiments, the output of classifier 2836 can provide data to prediction 2838. In some embodiments, prediction 2838 can be used to test classifier 2836 to determine whether classifier has been properly tested. In other embodiments, prediction 2838 can be used during the production stage. Prediction 2838 can provide data, including results, from its operation to attribute DB 2816 for storage. In some embodiments, prediction 2838 can optionally provide its data from operation to ground truth candidate DB 2830 for storage. M-Turk validation 2832 can determine whether the data provided from prediction 2838 is valid.

In some embodiments, system 2800 can include both on-line components and/or off-line components. The on-line components can run in real-time and can include one or more of the following components: (1) front-end 2810 (e.g., web-based user interface); (2) flow control back end 2812; (3) tile map service 2820; (4) parcel service 2818; and (5) attribute uService 2814. In some embodiments, parcel service 2818 and/or attribute uService 2814 can be internal modules that can communicate via JavaScript Object Notation Remote Procedure Call (JSON-RPC) protocol. In some embodiments, internal modules are not exposed to top layer applications. For example, when parcel service 2818 and attribute uService 2814 are internal modules, parcel service 2818 and attribute uService 2814 can logically reside behind flow control back end 2812 such that they are not directly visible to front end 2810.

The off-line components can run as separate executables and populate the systems databases, and can include one or more of the following components: (1) M-Turk Pipeline 2804; and (2) machine learning/computer vision (e.g., training pipeline 2806 and prediction pipeline 2808). In some embodiments, training pipeline 2806 and prediction pipeline 2808 are implemented in modules that have their own processing pipelines. In some embodiments, the machine learning/computer vision components can also run on-line. In some embodiments, the on-line components can be implemented as off-line components, the off-line components can be implemented as on-line components, and/or any other suitable combination thereof.

System 2800 may include additional components, less components, or any other suitable combination of components that perform any suitable operation or combination of operations. In some embodiments, these components can reside in a single machine, such as a server. In other embodiments, these components can be distributed across multiple machines.

The hardware, system, and architecture described in connection with FIGS. 26-28 can be deployed, entirely or partially, in a cloud-based environment. Further, the present disclosure is not limited to the exemplary hardware and/or software arrangements described in connection with FIGS. 26-28; other suitable hardware and/or software implementations are also within the spirit of the present disclosure.

Machine Learning for Object Detection

In computer vision, an image can be divided into segments, each of which can represent one or more objects. Each segment can include one or more pixels. Each object type can be associated with a class. A label can be used to associate a class to each pixel. If there are two or more object types from which the class can be associated, the class is considered multi-class. For example, a red-green-blue (RGB) image taken above the ground can include objects, such as, for example, roads, roofs, gardens, and pools. The RGB image can be segmented such that each pixel of the image can correspond to, or labeled as one of the identified objects. A pixel that is part of a road can be labeled as the road class, while another pixel that is part of a roof can be labeled as the roof class.

In some cases, only a specific type of an object may be of interest and thus, needs to be identified. For example, one may be interested in identifying only roofs in an image. In such cases, each pixel of an image can be labeled in a binary way (e.g., represented as a binary "1" or "0"). For example, each pixel can be labeled as either part of a roof (e.g., represented as binary "1") or not part of a roof (e.g., represented as binary "0"). In these cases, the class is considered two-class—that is, each class corresponds to either being that object or not being that object.

In some cases, a pixel can be labeled to indicate a probability of being part of a specific object. In some embodiments, the probability can be a real-valued scalar on the interval [0,1]. In some embodiments, the probability can be expressed as a percentage. For example, each pixel of an image can be labeled with the probability of being part of a roof, such as 0%, 20%, 50%, 93%, or 100% of being part of a roof, or any other suitable percentage.

Model Building

In some embodiments, spatial resolution is measured by a sensor's capability to resolve the smallest objects with distinct boundaries. In remote sensing images, the pixel-center to pixel-center distance is typically called ground sample distance (GSD). For example, a GSD can be 10 cm. In this example, sub-pixel accuracy can imply error of less than 10 cm; pixel accuracy can imply error of about 10 cm; and super-pixel accuracy can imply error of more than 10 cm. According to some embodiments, building models can be fitted with remote sensing imagery in a sub-pixel, pixel, and/or super-pixel accurate manner. These models can be either a whole model or a parts-based model. In both instances, 2D and 3D models can be considered. In the 2D model, the height variable can be held fixed. Per the parts-based model, an object's measures can be taken to be more granular. For example, using the parts-based model, roof summary measures (e.g., dominant pitch, dominant gable configuration, etc.) can be taken to be more granular (e.g., roof is composed of, by area, 25% gable and 75% hip components). In the 2D model setting, the original 3D problem (e.g., measuring a dominant pitch is originally a 3D problem) can become ill-posed. To address this issue, one or more variables can be fixed. For example, the roof height can be fixed, for example, with a small set of common heights.

Figure 29:
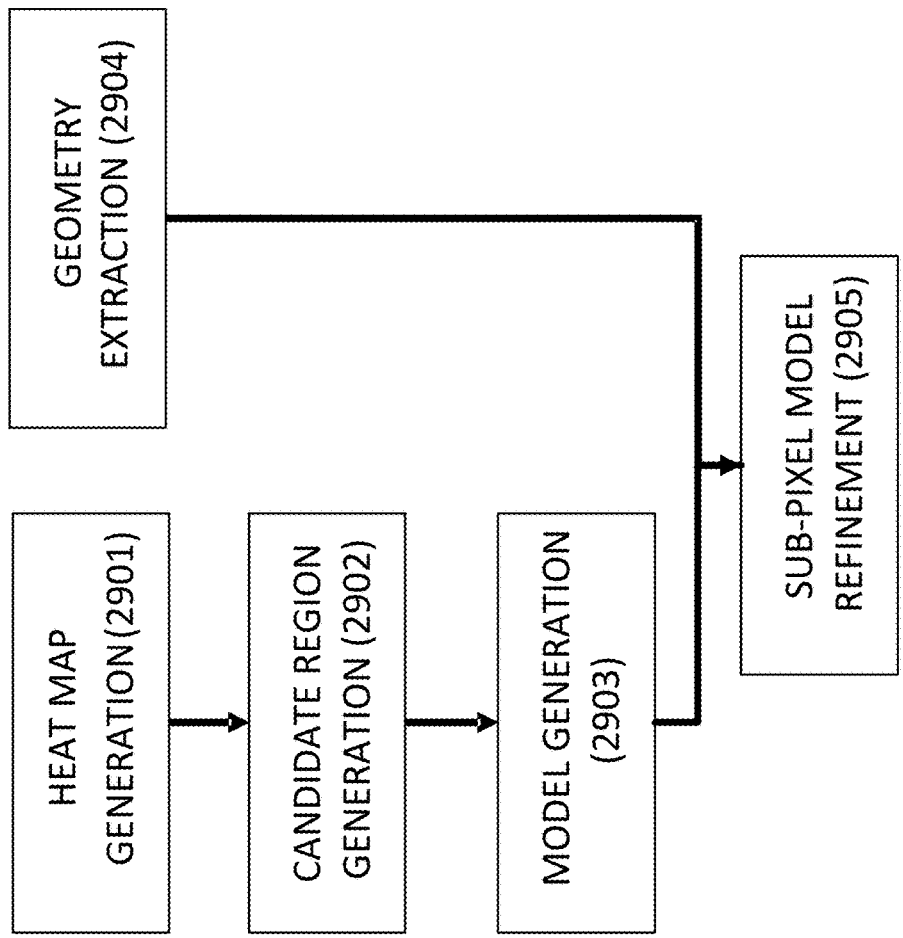
FIG. 29 illustrates a process for the whole model setting, where an input raster image is fed to both a heat map generation module and a geometry extraction module according to some embodiments of the present disclosure.

FIG. 29 illustrates a process for the whole model setting. At step 2901, an input raster image can be used for heat map generation. At step 2904, the input raster image can be used for geometry extraction, which can assume several embodiments including, but not limited to, edge detection and corner detection. At step 2902, the resulting heat map from step 2901 can be used to produce semantically relevant objects by a process that can assume several embodiments including, but not limited to, thresholding, clustering, active contour segmentation, and/or any of the object detection methods discussed in this disclosure (e.g., steps or operations described in connection with methods 300 and 2100). In some embodiments, candidate regions can be generated to identify semantically relevant objects. At step 2903, whole models can be fitted to the regions. In some embodiments, polygons are fitted. At step 2905, these models can be further refined using the extracted geometry from 2904 by using, for example, the estimation of a joint probability of heat map and edges.

Figure 30:
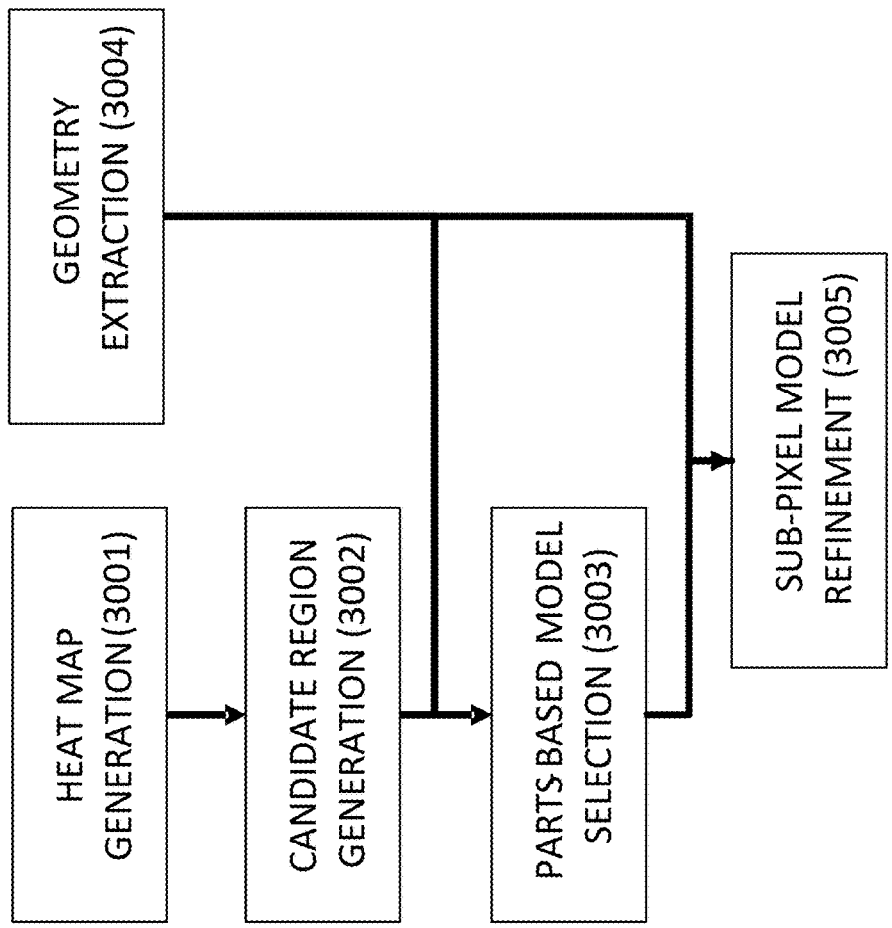
FIG. 30 illustrates a process for the parts-based model setting, where an input raster image is fed to both a heat map generation module and a geometry extraction module according to some embodiments of the present disclosure.

FIG. 30 illustrates a process for the parts-based model setting. At step 3001, an input raster image can be used for heat map generation. At step 3004, the input raster image can be used for geometry extraction, which can assume several embodiments including, but not limited to, edge detection and corner detection. At step 3002, the resulting heat map from step 3001 can be used to produce semantically relevant objects by a process that can assume several embodiments including, but not limited to, thresholding, clustering, and/or active contour segmentation. In some embodiments, candidate regions can be generated to identify semantically relevant objects. At step 3003, parts-based models can be fitted to the regions. In some embodiments, polygons are fitted. At step 3005, these models can be further refined using the extracted geometry from 3004 by using, for example, the estimation of a joint probability of heat map and edges. The distinction between this approach and the whole model approach as shown in FIG. 29 is that extraction geometry 3004 is also used to inform model selection 3003. As an example, in the parts-based model, individual facets of a roof can be modeled.

Hybrid Heat Maps

A heat map can be used to graphically represent an image to show the mapping between the pixels of the image and the class conditional probability that corresponds to each of these pixels. In some embodiments, a segmentation can be derived from the class conditional probability. To distinguish one class from another, different color schemes can be used. Non-limiting examples of color schemes include multi-color, grayscale, and black and white.

In a multi-class label, each color can correspond to an object. For example, white can be used to identify a house, blue can be used to identify a pool, and green can be used to identify a lawn in an image. In some embodiments, any other suitable color or combination of colors can be used to identify an object. Examples of using a heat map for object detection include semantic segmentation of large images into different types of objects, such as pools, buildings, trees, and property parcels.

In a two-class label, each color can correspond to whether a specific pixel corresponds to the specified object. Any suitable color scheme can be used. For example, in identifying a roof in an image, if a black and white scheme is used, white can be used to identify a roof, and black can be used to identify any other object that is not a roof, or vice versa. As another example, if a grayscale scheme is used, white can be used to identify what is certain or almost certain to be a roof (e.g., based on a predetermined probability or percentage), and black can be used to identify what is certain or almost certain to not be a roof (e.g., based on a predetermined probability or percentage), or vice versa. In addition, shades of gray color can be used to represent different probabilities of an object being a roof. For example, the lighter the gray, the more likely the corresponding pixel is a roof, and the darker the gray, the more likely the corresponding pixel is not a roof, or vice versa.

The notion of a heat map H, associated with a raster image I, can be a scalar field, where for each pixel location x, a class probability, conditioned on spatially local features over a neighborhood N(x), is defined as $H(x)=p(c(x)|I(N(x)))$. For example, the class c may be the structural category or class "pool," and the local features may be the raw image signal values (e.g., a red-green-blue (RGB) triple) in a spatial neighborhood of a given pixel location. In this setting, the heat map can represent the probability that a given pixel is part of a pool. Raw image signal values may be multispectral (multiple discrete narrow bands) and hyperspectral (continuous block of narrow bands).

Figure 1B:
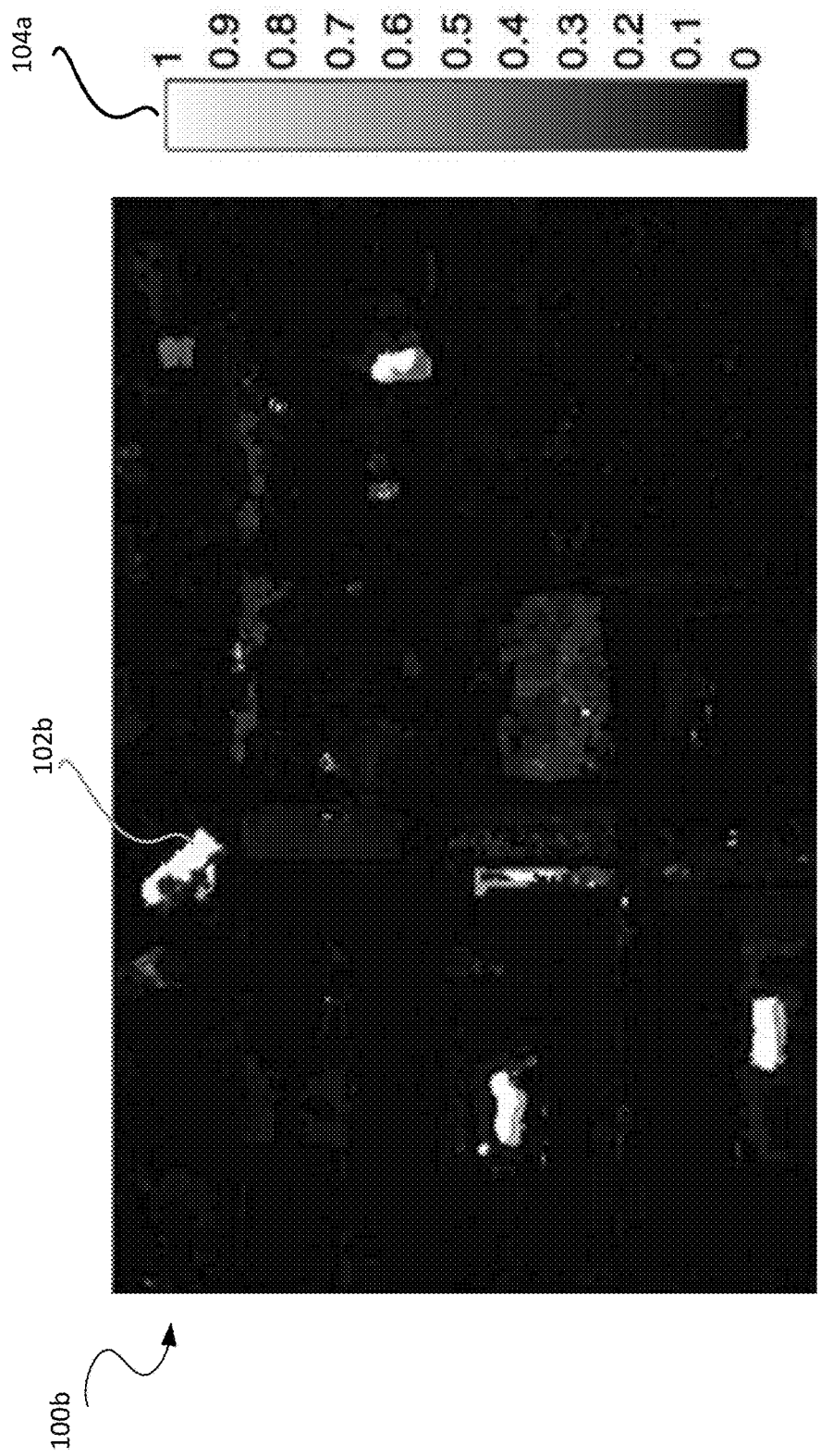
FIG. 1B illustrates a heat map representing the likelihood of the presence of a pool or some other structure.

FIG. 1A illustrates an image of a residential neighborhood 100a including a pool 102a. FIG. 1B illustrates a corresponding heat map 100b representing the likelihood of the presence of a pool or some other structure. The pool 102a in the residential neighborhood 100a is now represented as a light region 102b in the heat map 100b. Bar 104a shows grayscale colors that correspond to the likelihood of presence of a pool or some other structure. For example, a value of "1" indicates that it is certain that the identified object is a pool, while a value of "0" indicates that it is certain that the identified object is not a pool but another structure. In heat map 100b, the light regions, corresponding to a value near "1," indicates a high likelihood of the presence of a pool (and a low likelihood of the presence of some other structure). And the dark regions, corresponding to a value near "0," indicate a low likelihood of the presence of a pool (and a high likelihood of the presence of some other structure).

Traditionally, an image could be segmented using manual hints, where some of the pixels of the image were manually labeled. A computer vision method could use these manual hints to assign labels to the remaining pixels by local similarity (e.g., color) or distance to the labeled pixels. This could be done using the so-called graph-cut approach. Using this approach, the computer vision method could then produce a heat map that segments the image.

Figure 2:
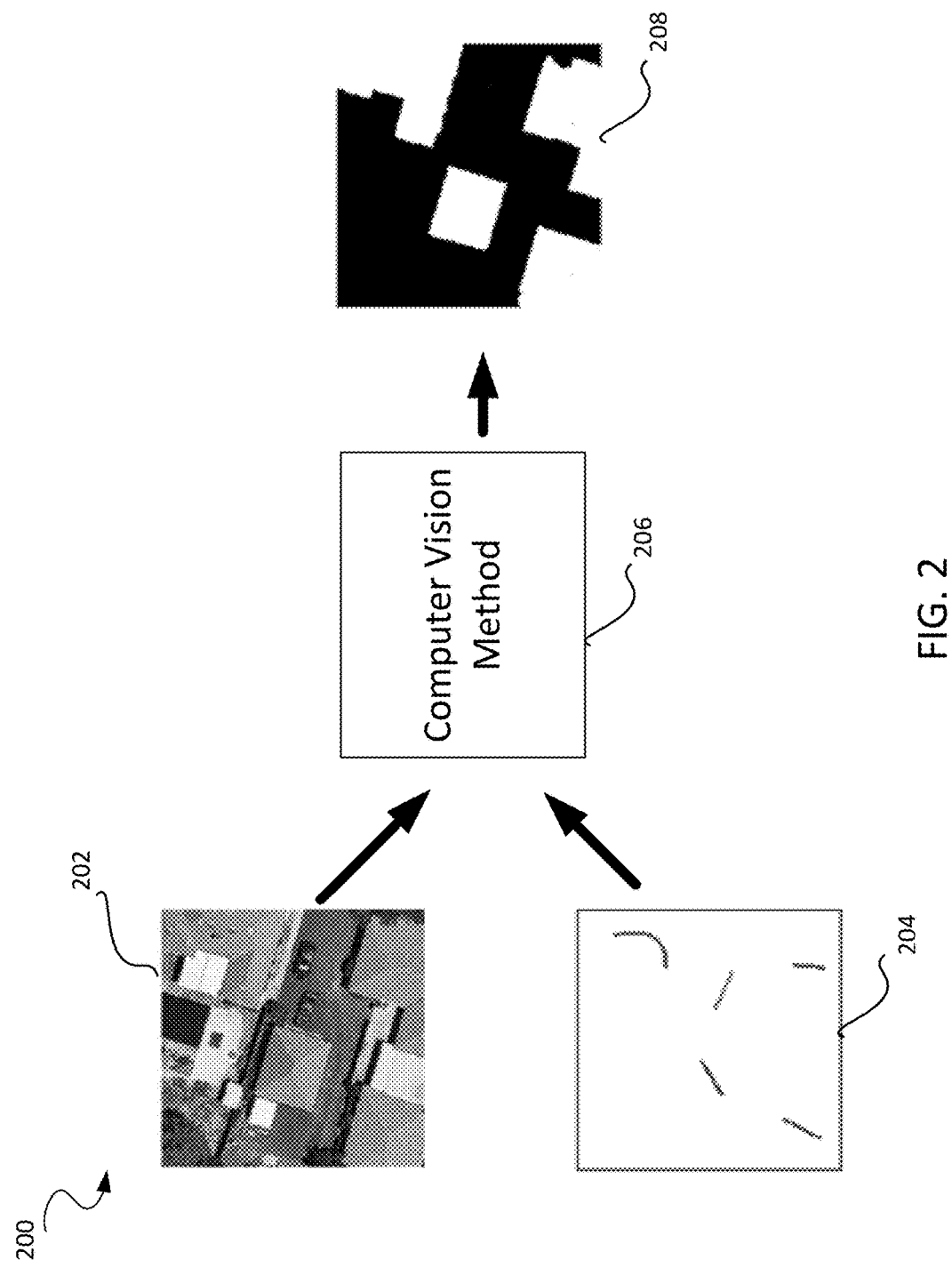
FIG. 2 illustrates a method for producing a heat map for identifying roofs in an image.

FIG. 2 illustrates a prior art method for producing a heat map for identifying roofs in an image. Computer vision method 206 takes in image 202 and manual hints 204. Manual hints 204 are provided by a human who draws lines that correspond to what the person sees as roofs and optionally, what the person sees as not roofs (some other structure). Computer vision method 206 takes in these inputs, assigns a label to each pixel of the image, and produces heat map 208. In heat map 208, the white areas represent the roofs in the image while the black areas represent non-roof areas. This conventional method has a number of problems. First, this method is not efficient and not scalable. This requires a human to provide manual hints for each image, which is a time consuming process. Second, this method may not be accurate. Because this depends on a human to provide accurate hints, it is vulnerable to human errors. In addition, because the hints cover only a small portion of the image, a lot of estimation by the computer needs to be done, which increases the risk of producing an inaccurate heat map.

The problems identified in the prior art can be solved by using an object detector in accordance with some embodiments of the present disclosure. For example, a top-down object detection approach can be used, where heat maps are generated from trained classifiers. In one instance, a heat map(s) can be generated through the use of trained convolutional neural networks (CNNs), where either a sparse or a dense application of the heat map(s) can be applied to an input image.

Heat maps can be used to generate a semantic pixel labeling of the image space in a number of ways including via the simple threshold of a single heat map or by maximum likelihood selection across multiple heat maps. In some embodiments, the maximum likelihood selection can be taken at the pixel-level. As shown in heat map 100b (FIG. 1B), heat maps may not be fully consistent with object edges so a refinement step is often required to produce a final segmentation. In another instance, computer vision methods are used to produce the pixel labeling by using the CNN generated heat maps as hints or weights. Examples of these computer vision methods include GrabCut and conditional random fields (CRFs). In GrabCut image segmentation, an iterative optimization process can be applied to estimating foreground and background. This approach alternates between enforcing intra-region pixel label homogeneity and applying graph-cut optimization (max-flow min-cut) to infer pixel labels with color distribution of foreground objects and background modeled using a Gaussian mixture model. In the case of CRFs, a framework for constructing probabilistic models for image segmentation can be used, where the weights of different features at different states can be balanced against one another through a single joint exponential model for the joint probability.

Figure 3:
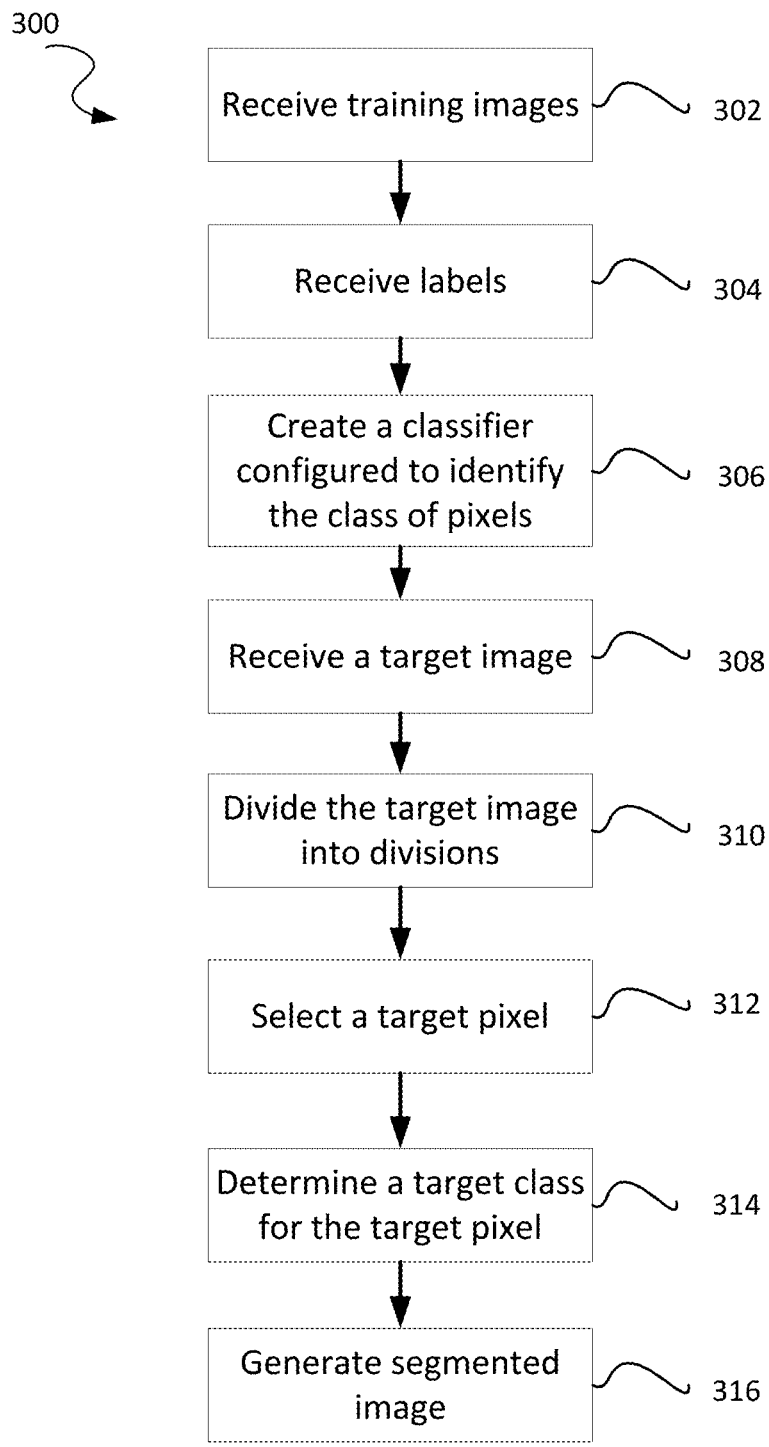
FIG. 3 illustrates method for automatically identifying a class of a pixel according to some embodiments of the present disclosure.

FIG. 3 illustrates a method 300 for automatically identifying a class of a pixel according to some embodiments of the present disclosure. In some embodiments, method 300 can be modified by, for example, having steps combined, divided, rearranged, changed, added, and/or removed. In some embodiments, method 300 can be performed at an object detector. In some embodiments, the object detector can be located in the imagery analysis server 2604 or any other suitable location of the system 2600.

At step 302, training images can be received. The training images can include one or more pixels. In some embodiments, each of the training images includes more than one pixel. In some embodiments, each of the training images is one of red-green-blue (RGB), panchromatic, infrared (IF), ultraviolet (UV), multi-spectral, hyperspectral, and/or any other suitable image. In some embodiments, these training images can be the same image type. For example, these training images are all of one of the following image types: RGB, IR, and UV. In other embodiments, these training images can be a different suitable image type or combination of image types. For example, of the training images, 30% can be RGB, 25% can be IR, and 45% can be UV.

At step 304, labels for the training images can be received. In some embodiments, a label can associate a class to a pixel of one of the training images. For example, a training image can include a roof and a pool. A label can associate one of the pixels making up the roof to the roof class, while another label can be used to associate one of the pixels making up the pool to the pool class. As another example, a label can associate a pixel to one of the two classes—foreground and background. The foreground class can refer to a pixel that is part of a specified object (e.g., object of interest), while the background class can refer to a pixel that is not part of the specified object. A label can also associate a pixel to one of many classes, each of which relates to the same object. For example, a pixel can be one of "definitely foreground," "likely foreground," "definitely background" (e.g., not foreground), and "likely background" (e.g., not likely foreground). In some embodiments, any other suitable label or combination of labels can be used. In some embodiments, the class can be one of a building, roof, a pool, a road, a trampoline, an automobile, a truck, a boat, a plane, a communication tower, a power transmission tower, a hedge, a porch, a patio, a deck, a tree trunk, and/or any other suitable object or combination of objects. In some embodiments, a label can associate a class to each of the pixels of the training images.

In some embodiments, a label can associate a class to multiple pixels of one of the training images. For example, a label can associate all the pixels making up the roof to the roof class. In some embodiments, all the pixels of all the training images can be associated to a class by the received labels.

At step 306, a classifier can be created based on the received training images and the received labels. The classifier can be configured to identify the class of each pixel of an image. In some embodiments, the classifier can be created using a machine learning system, which includes one or more classifiers such as an artificial neural network (ANN) including but not limited to a convolutional neural network (CNN), as would be appreciated by one of ordinary skill in the art.

At step 308, a target image can be received. In some embodiments, the target image is one of RGB, panchromatic, IR, UV, multi-spectral, hyperspectral, and/or any other suitable image. In some embodiments, the target image can be the same image type as the image type of the training images. For example, the image type of the target image and the training images can all be RGB.

At step 310, the target image can be divided into divisions. Each division can include one or more pixels. For example, a division can consist of one pixel. In another example, a division can consist of 1500 pixels or any other suitable number of pixels. In some embodiments, the target image is divided equally, such that the area size is the same for all the divisions. For example, a 256 pixel-by-256 pixel image, consisting of 65,536 pixels, can be divided into 4,096 divisions, where each division consists of 16 pixels. In some embodiments, the shape of each division can be the same. For example, each of the 4,096 divisions can be 4 pixel-by-4 pixel. In other embodiments, the shapes of different divisions can be different. For example, some of the 4,096 divisions can be 4 pixel-by-4 pixel, while some other divisions can be 8 pixel-by-2 pixel, or any other suitable size. In some embodiments, the target image is not divided equally, such that area sizes can be different between different divisions. For example, one division can consist of 1 pixel, another division can consist of 16 pixels, and another division can consist of 2500 pixels. In some embodiments, the division mechanism can be configured either automatically or manually. In some embodiments, the target image can be divided into divisions such that one or more divisions overlap. In other embodiments, the target image can be divided into divisions such that none of the divisions overlaps.

At step 312, a target pixel can be selected. In some embodiments, the target pixel can be from one of the divisions of the target image. In some embodiments, the center or near-center pixel from each of the divisions is selected as a target pixel. For example, in a 3 pixel-by-3 pixel division, the center pixel that is selected as the target pixel is the fifth pixel—counting from left to right, top to bottom (the $2^{nd}$ pixel from the left and $2^{nd}$ pixel from the top). In other embodiments, the target pixel is selected from only some of the divisions. For example, if a target image is divided into 1,000 divisions, a target pixel from each of 300 of these 1,000 divisions can be selected. In some embodiments, more than one target pixel can be selected from a division.

At step 314, a target class for a target pixel or pixels of the target image can be determined using a classifier. In some embodiments, this classifier is the classifier created at step 306. In some embodiments, a CNN can be used as the classifier. In some embodiments, the target class can be determined by comparing the target pixel(s) to neighboring pixels of the target image. For example, the color of a target pixel can be compared to the color of a neighboring pixel.

If the two colors are the same or similar, the class of the target pixel can be determined to be the same as the class of the neighboring pixel. In some embodiments, other suitable attributes can be compared among pixels. In some embodiments, one or more of the neighboring pixels can be immediately adjacent to the target pixel. In some embodiments, the target class can be one of a building, roof, a pool, a road, a trampoline, an automobile, a truck, a boat, a plane, a communication tower, a power transmission tower, a hedge, a porch, a patio, a deck, a tree trunk, and/or any other suitable object or combination of objects.

At step 316, a segmented image can be generated based on the target image and the target class determined for one or more target pixels. In some embodiments, the segmented image can be a heat map. Various techniques can be used to generate the segmented image. Non-limiting examples of techniques include graph-cut, GrabCut, CRFs, and manual. A graph cut can be used to achieve inference (e.g., label assignment). GrabCut is a graph-based method that can be used to estimate the color distribution of foreground and background objects using a Gaussian Mixed Model (GMM). A GMM can be used to form a CRF over pixel labels, where the CRF is associated with discriminative models. The CRF can use an energy function that includes a pairwise term that favors connected regions having the same label.

In GrabCut, some or all pixels can be assigned to the foreground and background with weights that can indicate how likely the pixel(s) belong to the assigned class. This construct can be represented with a graph. A graph can include nodes and edges, where the edges can describe a relationship between exactly two nodes. Additionally, an edge can have real-valued weights assigned to it to capture a relationship between the two nodes. For example, a graph can capture the flight connections between airports, where each flight can be represented as an edge from one node (airport) to another node, and the edge's weight can be the distance, price etc. Within the context of GrabCut, the set of nodes can include a node for each pixel and two label nodes (often referred to as the "source" and "sink," each corresponding to one of background and foreground). In this setting, edges can be formed between the pixel-nodes and the label-nodes. Additionally, edges can be formed between pixel-nodes and their neighboring pixel-nodes, where the weights indicate pixel similarity (e.g., closeness in color). Graph-cut can be used in GrabCut. Graph-cut can attempt to separate the sink from the source, so that there is no path from sink to source. Graph-cut can search for the min-cut, which can involve looking for the set of edges to be cut (in order to separate sink from source) with the smallest sum of their weights. A dual problem is max-flow, wherein the edge weights are interpreted as capacities of "pipes," and maximizing the "flow" from source to sink is desired. If the flow is maximized, the saturated pipes are cut.

Figure 4:
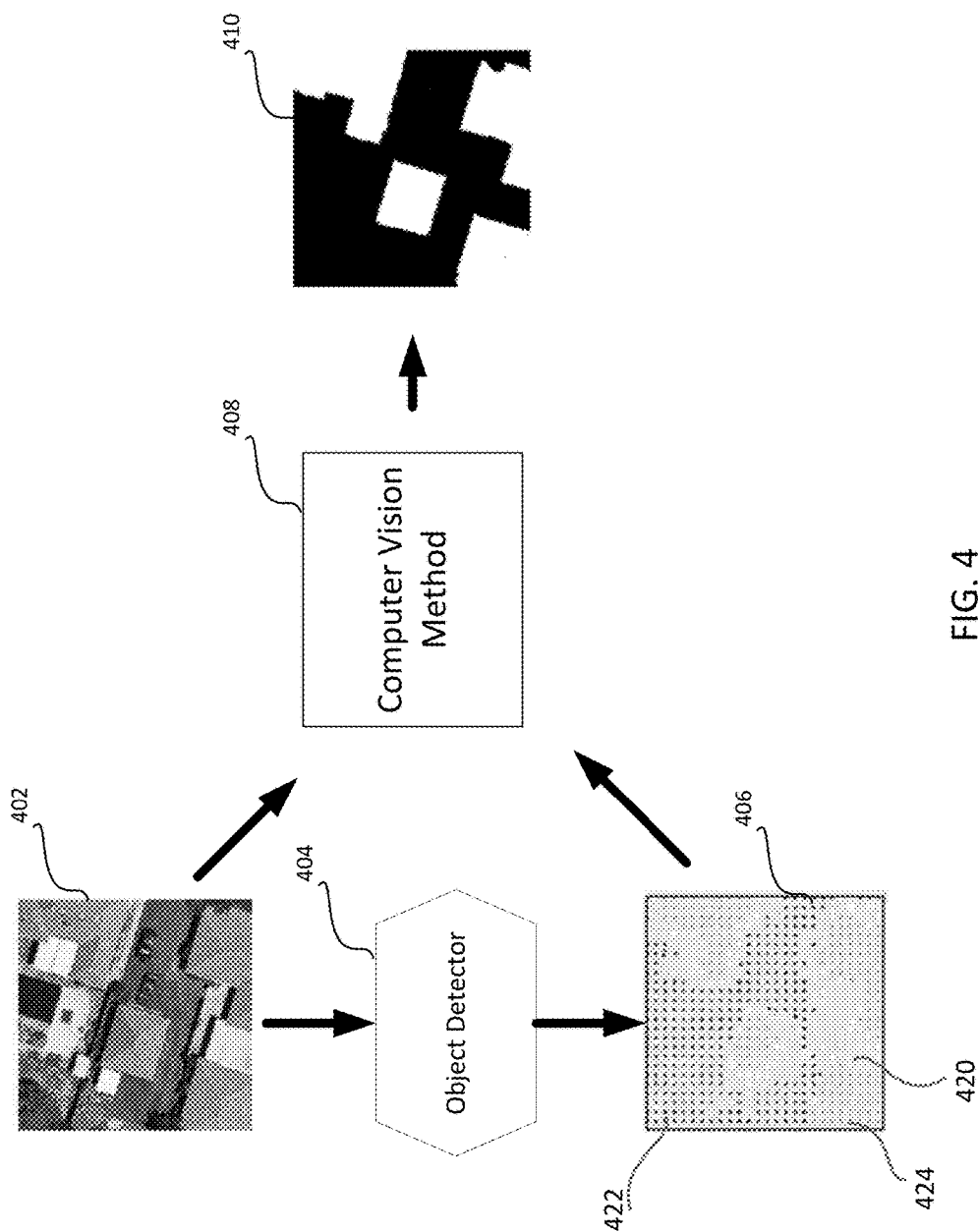
FIG. 4 illustrates an example of automatically identifying a class of a pixel according to some embodiments of the present disclosure.

FIG. 4 illustrates an example of using method 300 (FIG. 3) according to some embodiments of the present disclosure. In some embodiments, object detector 404 can be used to produce binary-class heat map 410 to show roof objects. Object detector 404 can implement and execute a classifier that can take image 402 as input. After object detector 404 divides 402 into multiple divisions, object detector 404 can select a center pixel from each of these divisions. Object detector 404 can then determine a class for each of these center pixels and generate label map 406 based on the determined class. Label map 406 can include automatically generated labels. In some embodiments, each white dot, such as 420, can represent the roof class, each black dot, such as 422, can represent the non-roof class, and each gray dot or gray area, such as 424, can respectively represent an unclassified dot or area. In some embodiments, the number or percentage of pixels that are given labels can be customized manually or automatically.

Computer vision method 408 can take image 402 and label map 406 as input. In some embodiments, computer vision method 408 can be a segmentation mechanism that takes hints or labels. Example segmentation mechanisms include a graph-cut, GrabCut, and conditional random fields. Computer vision method 408 can generate heat map 410 based on image 402 and label map 406. Heat map 410 can show all the roof objects in image 402 by indicating the roof objects as white areas and the non-roof objects as black areas.

Figure 5B:
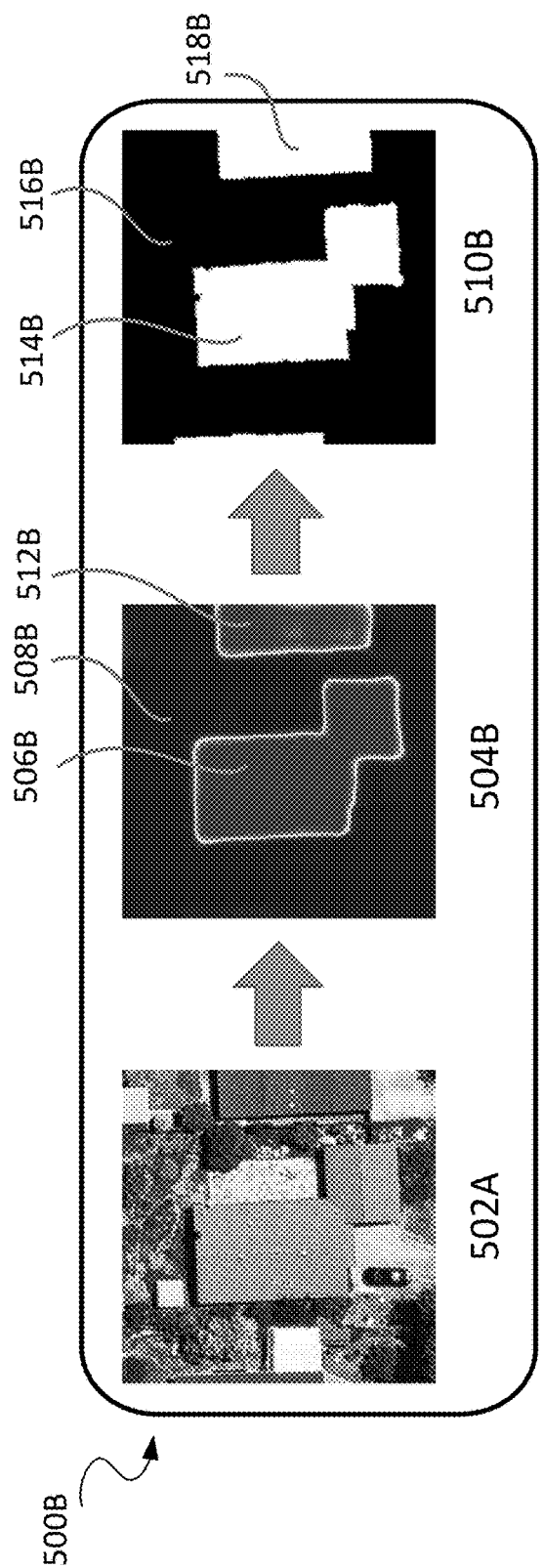
FIG. 5B illustrates an example of detecting objects according to some embodiments of the present disclosure.

FIGS. 5A and 5B illustrate the comparison of object detection between using method 500A, which is the prior art method of manually identifying labels, and using method 500B, which is in accordance with some embodiments of the present disclosure. Prior art method 500A takes in image 502A as an input. 504A shows hints, which have been manually entered by a human. In FIG. 5A, two types of hints can be provided: foreground and background. Foreground hints 506A and 512A are used to indicate an object type of interest, while background hints 508A are used to indicate any other areas that are not part of the object type of interest. The segmentation method, such as GrabCut, takes image 502A and the hints in 504A to generate a final binary foreground mask 510A. Binary foreground mask 510A shows foreground 514A and 518A in white, and background 516A in black.

Method 500B shows a method according to some embodiments of the present disclosure. Method 500B can take the same image (image 502A) as prior art method 500A. However, method 500B automatically generates labels by classifying divisions of image 502A by using a classifier. In method 500B, foreground labels 506B and 512B indicate an object type of interest, while background labels 508B indicate any other areas that are not the object type of interest. The segmentation method, such as GrabCut, takes in image 502A and labels 504B to generate a final binary foreground mask 510B. Binary foreground mask 510B shows foreground 514B and 518B in white, and background 516B in black. More pixels can be classified in method 500B than in prior art method 500A because with the prior art method, it is impractical for a human to provide hints for a large number of pixels. Thus, method 500B can result in a more accurate binary foreground mask 510B than binary foreground mask 510A produced by prior art method 500A. Moreover, unlike prior art method 500A, method 500B can be scalable to process a large number of pixels.

Figure 6:
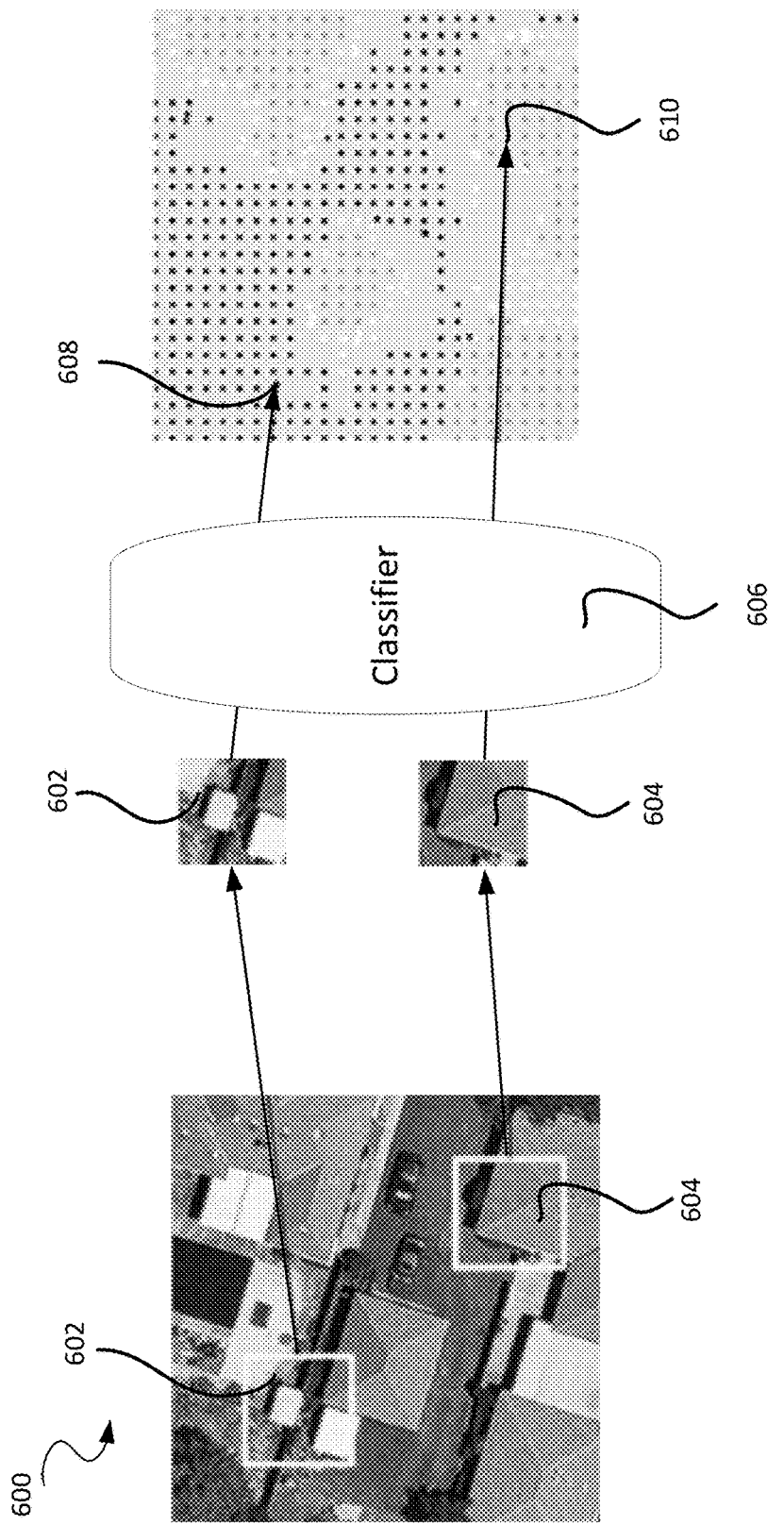
FIG. 6 illustrates an example of generating labels for a subset of divisions for an image according to some embodiments of the present disclosure

FIG. 6 illustrates an example of generating labels for a subset of divisions for an image according to some embodiments of the present disclosure. In some embodiments, a subset of total divisions, such as division 602 and division 604, can be selected. These selected divisions can be used as inputs to classifier 606, which can generate labels for these divisions. The generated labels for these divisions are shown at 608 and 610, respectively. By generating labels for only a subset of divisions, processing time and storage can be saved. These subsets can be chosen such that they cover objects or areas of interest, such as local windows, part roof, sub areas, or any other suitable object or areas of interest. In some embodiments, only the center pixel of a division can be analyzed. In this case, the division size (e.g., the number of pixels per division) can be selected to provide sufficient context for the classifier to identify the center pixel's class.

Segmentation Encoding for Efficient Classification

Dimensionality reduction (compression) techniques for representing image segmentation can be used for efficient pixel foreground classification. A non-limiting example of this process includes, given an RGB image, finding a set of discrete cosine transform (DCT) coefficients that best describes an implicit binary foreground segmentation. Applying the inverse DCT transformation to the coefficients produces the classification (e.g., at each pixel, the likelihood of being a foreground object).

In some embodiments, a classifier can be trained, where inputs are geospatial imagery (e.g., RGB and infrared images) and outputs (label space) are the parameters that characterize a compressed segmentation (e.g., coefficients of an orthogonal transformation).

Figure 7:
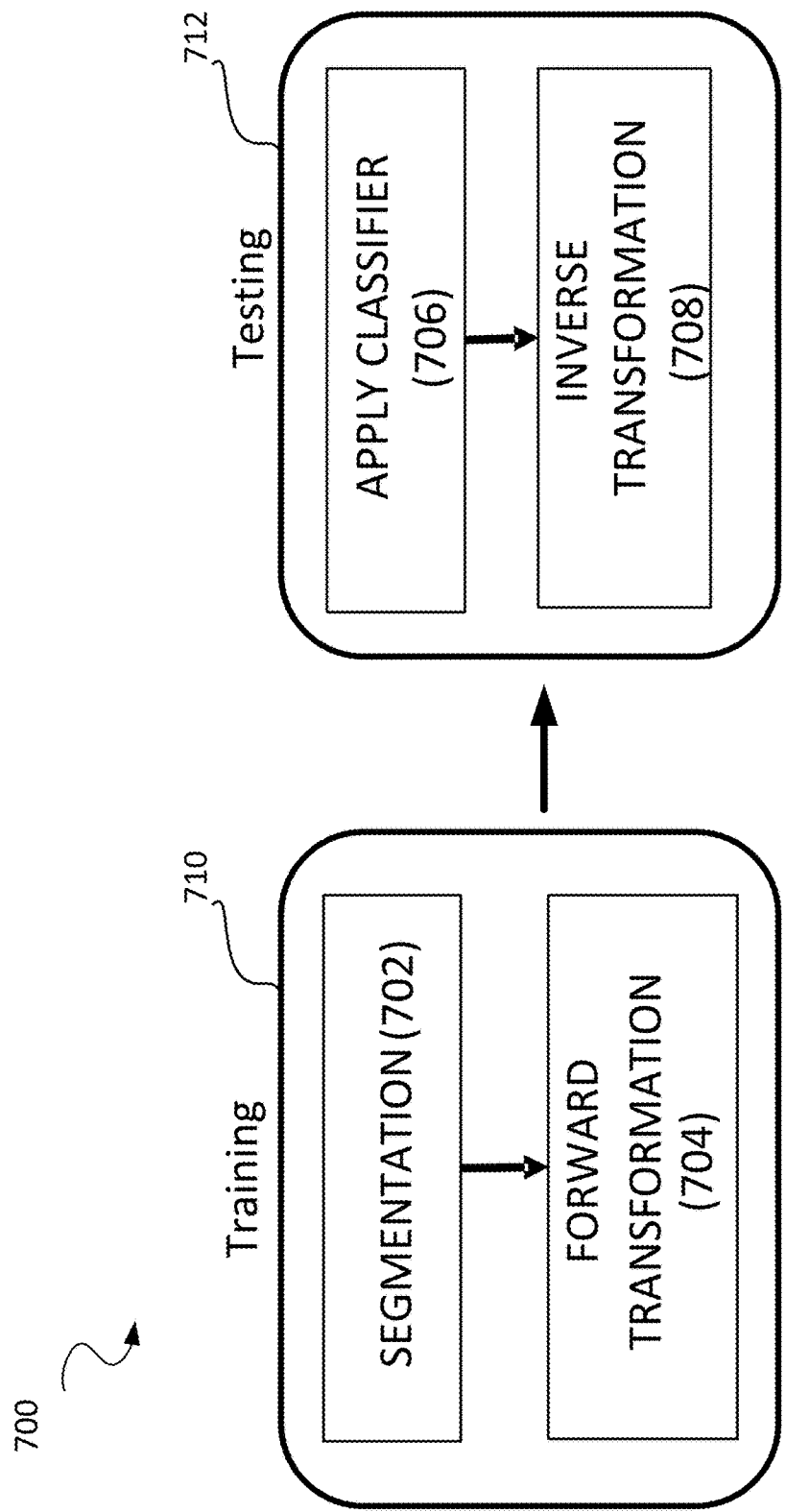
FIG. 7 illustrates an application of segmentation encoding for efficient pixel classification according to some embodiments of the present disclosure.

FIG. 7 illustrates an application 700 of segmentation encoding for efficient pixel classification in accordance with some embodiments of the present disclosure. In some embodiments, the application 700 can include the following two stages: a training stage 710 and a testing stage 712. The training stage 710 can be used to train a classifier to produce a set of parameters that can be inversely transformed to produce the resulting classification for an image. The testing stage 712 can be used to test the trained classifier from the training stage 710.

The training stage 710 can include a segmentation step 702 and a forward transformation step 704. At step 702, for a set of input imagery, a binary segmentation can be applied to produce corresponding foreground masks. Examples of segmentation include those based on techniques such as GrabCut and manual. At step 704, a forward transformation can be applied to the binary segmentations. In some embodiments, the most significant parameters of these segmentations can characterize the compressed version of the same. Examples of such compression transformation include DCT, wavelets, discrete Fourier transform, principal component analysis (PCA), non-negative Matrix Factorization (NMF), Hadamard transform, and/or any other suitable transformation. The input imagery associated with the binary segmentations and their associated compression parameters can be used to train a classifier. Examples of the classifier model include ANNs including CNNs.

After the classifier has been trained, the classifier can be tested at the testing stage 712, which can include an "apply classifier" step 706 and an inverse transformation step 708. At step 706, a test image can be supplied to the trained classifier that can produce a set of parameters (e.g., coefficients of one of the aforementioned orthogonal transform). At step 708, the inverse transformation can be applied to these parameters to produce the resulting classification (e.g., likelihood of foreground).

Figure 8:
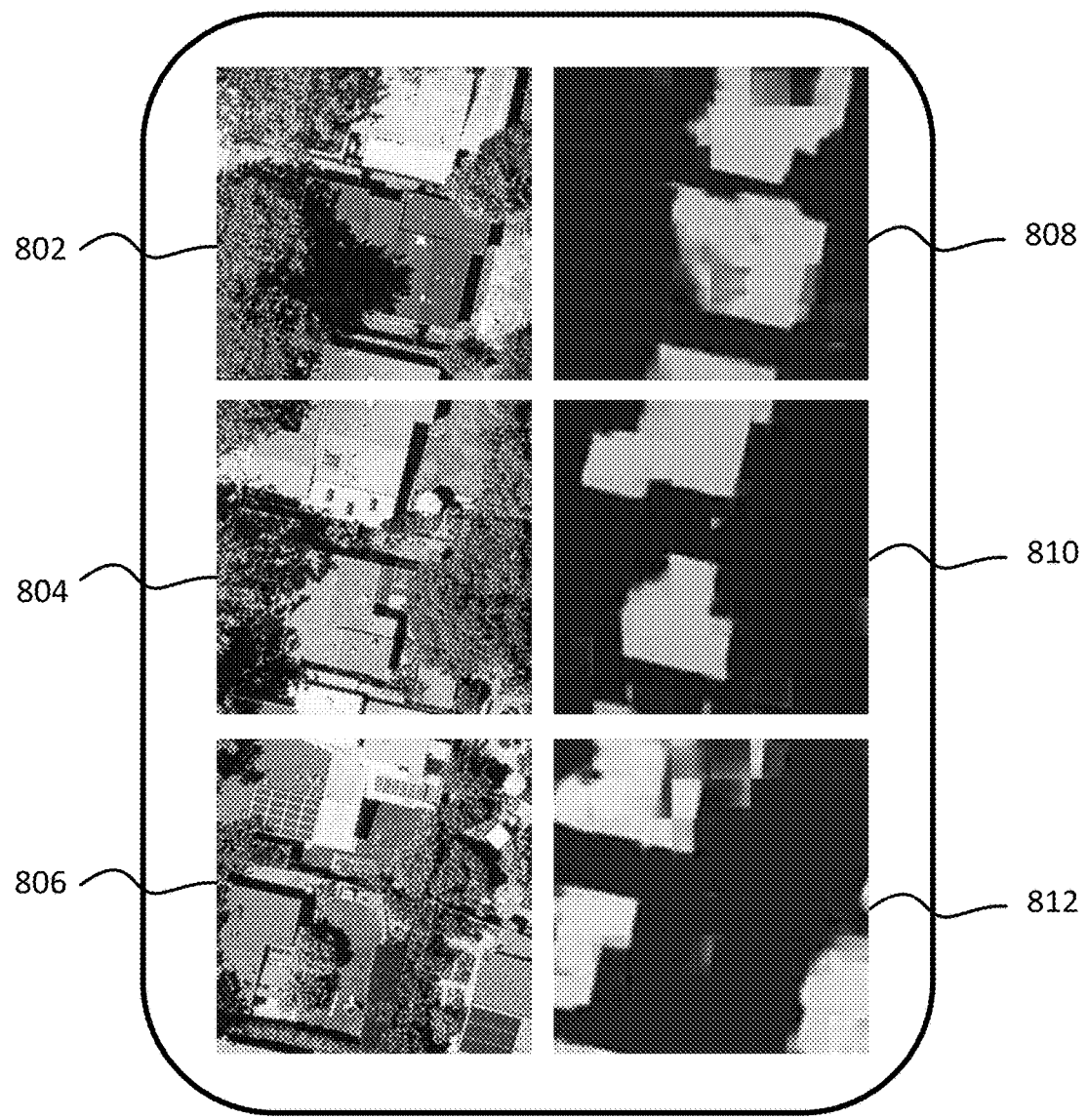
FIG. 8 illustrates examples of input and output for a classifier according to some embodiments of the present disclosure.

FIG. 8 illustrates examples of three RGB input images (802, 804, 806) and three corresponding output images (808, 810, 812) for the trained classifier. These RGB input images can be used for a classifier during a testing or production stage. For example, RGB input images 802, 804, and 806 can be the test images in the "apply classifier" step 706 (FIG. 7). The classifier can produce three sets of parameters based on these three images. At step 708 (FIG. 7), the classifier can apply the inverse transformation to these parameter sets such that the three corresponding output images 808, 810, and 812 are produced.

Pseudo Multi-Label Classification

In some embodiments, multi-label classification describes situations where multiple target labels are assigned to each input instance. This generalizes the concept of multi-class classification where each instance is restricted to have one class label. A common multi-label classification is semantic scene understanding (e.g., "this image patch contains a roof and pool") or segmentation (e.g., one label per pixel).

In classification, a distribution over object classes can be received when, for example, using an ANN. Thus, for a given input, a classifier that can distinguish between a set of classes can produce a normalized array of real-valued numbers that reflect the likelihoods of the classes for the given input. In some embodiments, this normalized array can include two real-valued numbers, where one number represents the likelihood of a pixel being a specific object (e.g., a roof) and the other number represents the likelihood of the pixel not being the specific object (e.g., not a roof). When a single class is desired, the class associated with the largest real-valued number can be selected. For example, if, for a pixel, the likelihood of roof object is 0.9 and the likelihood of not roof object is 0.1, the pixel can be classified as belonging to a roof object.

Figure 9:
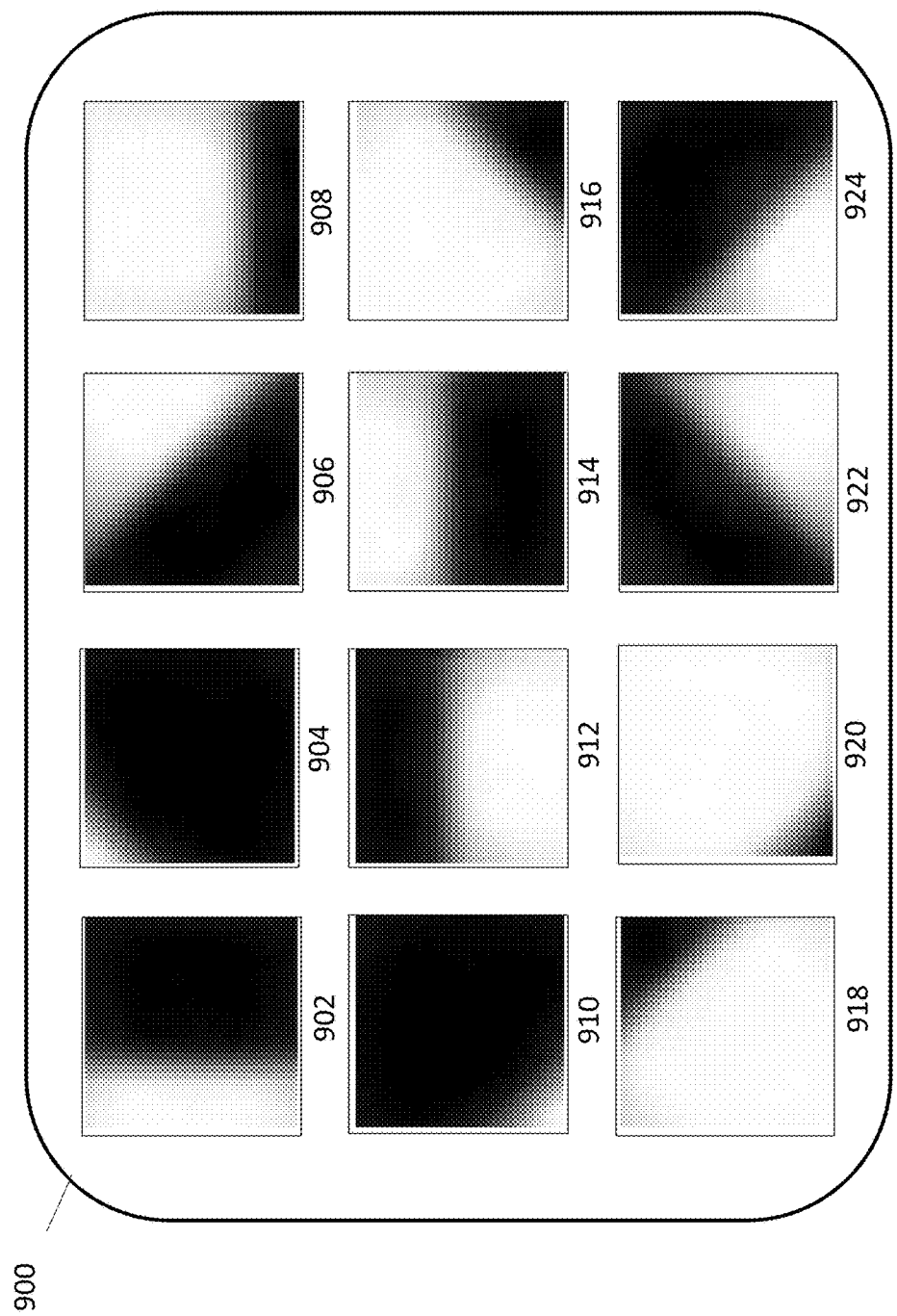
FIG. 9 illustrates an example portion of a label space in multi-label classification according to some embodiments of the present disclosure.

A classifier can also be configured to produce a non-normalized array of real-valued scalars. In this setting, the output is not considered to be a distribution over classes and, thus, the classifier can be used to solve a regression problem. In the context of training under pseudo multi-label classification, the set of labels are not object categories, such as "roof" and "trampoline," but rather a set of normalized or non-normalized array of floating point values that can be used to reconstruct the final segmentation output. In the case of regression, the non-normalized output parameters can be produced by any kind of invertible transformation that produces a more compact and generalized description of shape. PCA and DCT are two non-limiting examples that can compress and generalize shape (e.g., by considering most likely shapes or lower frequencies). In the case of classification, the classifier can indicate how similar the segmented version of an input image is to a set of classes (e.g., corresponding to discrete patterns). In this case, the classifier output can be interpreted as being the likelihood that the segmentation output looks like the pattern the class is associated with. These patterns can be shapes as "corners" and "rectangles" that are present in various locations within the image. The final output is then generated as the weighted average (or best match, etc.) of these patterns by using their likelihood as the weights. FIG. 9 illustrates examples of patterns used (described below).

Instead of using multiple labels to train (which is more difficult to train, design networks, and is slower), a single label can be used to describe the class of a shape of an object (or pattern) to be segmented within a small image chip region. In this setting, the output of the classifier can be a probability distribution over the space of classes (patterns). A chip region can be a portion of the image. In some embodiments, a chip region can represent an area of interest. In some embodiments, an image can be processed only at chip regions such that the whole image does not need to be processed. In some embodiments, a heat map (e.g., where each pixel is labeled with the likelihood of being a specific object such as a roof) can be segmented to produce a binary image of two classes (e.g., roof and not roof).

FIG. 9 illustrates an example portion 900 of a label space in multi-label classification in accordance with some embodiments of the present disclosure. The example portion 900 can include learned patterns 902, 904, 906, 908, 910, 912, 914, 916, 918, 920, 922, and 924. This example illustrates the cluster centers of a k-mean process against the discrete binary super-pixel pattern case. Each of the learned patterns represents a different cluster center. In some embodiments, different cluster centers are generated to produce a representative sampling for training. Although generating different cluster centers is not required for producing a representative sampling for training, it can be useful in creating a more equal distribution over the feature space. In some embodiments, different cluster centers can be generated using principal component analysis. The weighted average (expectation) of these learned patterns can be taken as the final heat map. In some embodiments, the family of patterns can include binary superpixels (either 0 or 1); affinity propagation, mean-shift, db-scan, patterns generated from k-means clustering learned from a training set; patterns generated from PCA over a training set; and low frequency DCT patterns.

Figure 20:
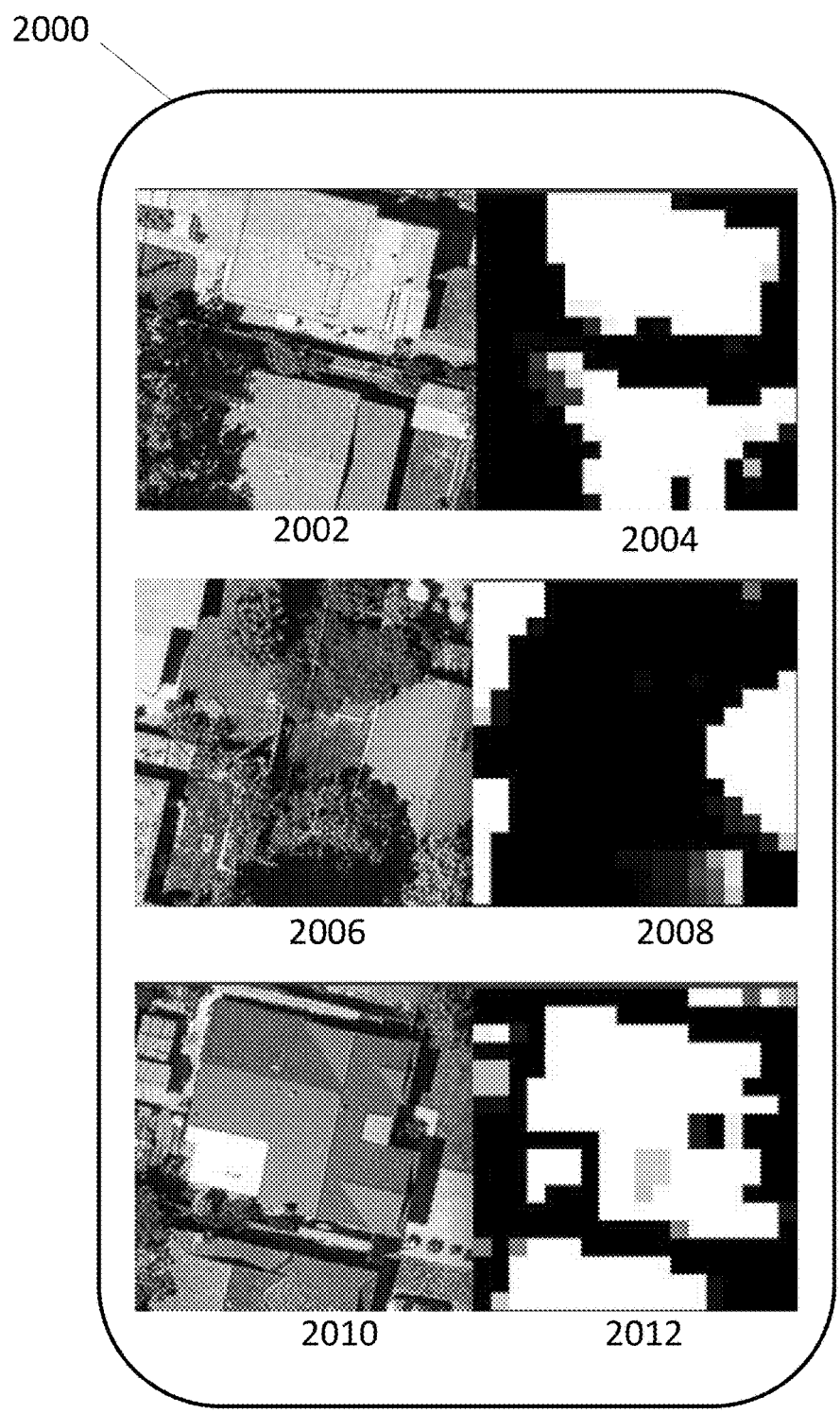
FIG. 20 illustrates examples involving the use of images representing the expectation taken over the predicted distribution of local binary super pixels according to some embodiments of the present disclosures.

FIG. 20 illustrates examples involving the use of images representing the expectation taken over the predicted distribution of local binary super pixels in 2000. These examples represent non-limiting examples of using pseudo multi-label classification. RGB images 2002, 2006, and 2010 can be inputs to a classifier using pseudo multi-label classification. The classifier can generate the corresponding output heat map images 2004, 2008, and 2012, respectively. In some embodiments, by using pseudo multi-label classification, the output can be reduced to a relatively small number of coefficients (e.g., several hundreds) that can represent image segmentations. This can increase processing speed and save storage space.

Figure 21:
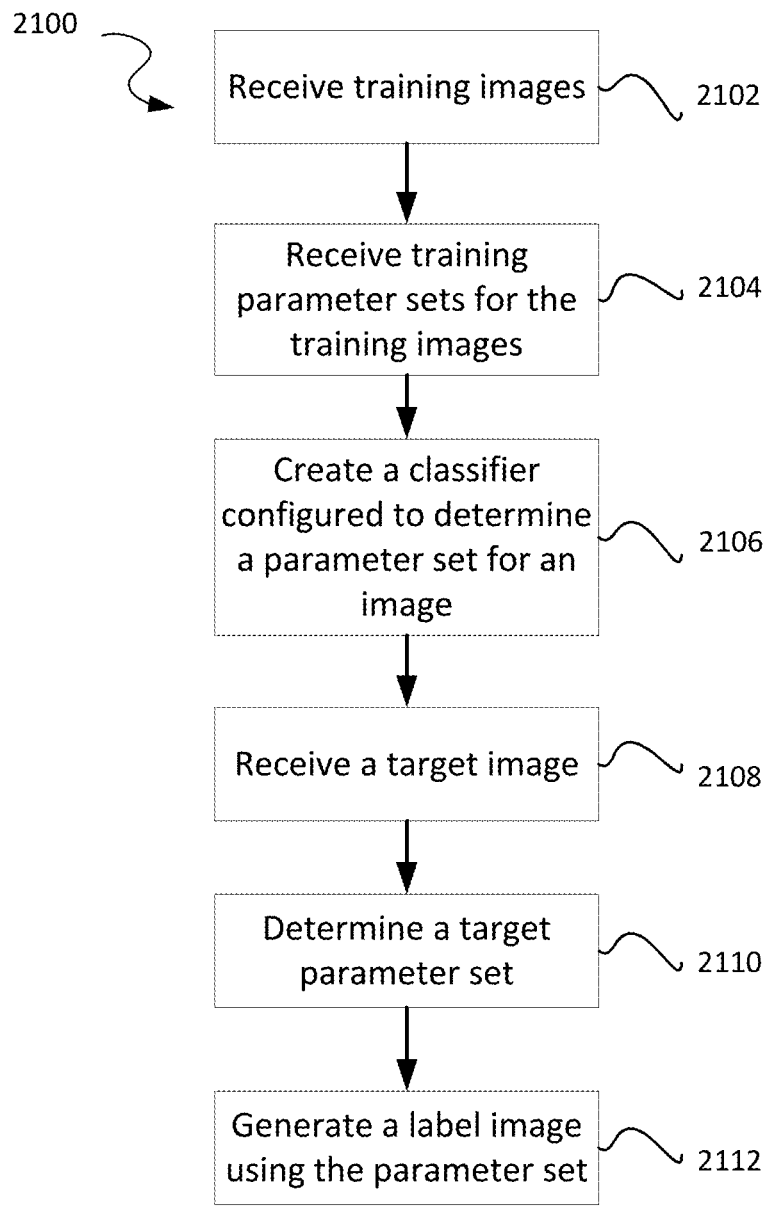
FIG. 21 illustrates a method for generating a label image based on a parameter set according to some embodiments of the present disclosure.

FIG. 21 illustrates a method 2100 of generating a label image based on a parameter set according to some embodiments of the present disclosure. In some embodiments, method 2100 can be modified by, for example, having steps combined, divided, rearranged, changed, added, and/or removed. In some embodiments, method 2100 can be performed at an object detector. In some embodiments, the object detector can be located in the imagery analysis server 2604 or any other suitable location of the system 2600.

At step 2102, training images can be received. The training images can include one or more pixels. In some embodiments, these training images can be the same image type. For example, these training images are all of one of the following image types: RGB, IR, and UV. In some embodiments, each of the training images is one of RGB, panchromatic, IR, UV, multi-spectral, hyperspectral, and/or any other suitable image. In some embodiments, an image can include two or more co-registered channels or bands of electromagnetic spectrum. For example, an image can include RGB and IR.

At step 2104, training parameter sets can be received. In some embodiments, each training parameter set can correspond to one or more labels that have been transformed using a transformation technique, such as DCT, wavelets, discrete Fourier transform, PCA, NMF, Hadamard transform, and/or any other suitable transformation. In some embodiments, the one or more labels can correspond to a different training image. In some embodiments, every training image corresponds to a training parameter set that represents labels for the training image.

At step 2106, a classifier can be created based on the training images and the parameter sets. The classifier can be configured to determine a parameter set for an image. In some embodiments, the classifier can be created using a machine learning system, such as an ANN or a CNN as would be appreciated by one of ordinary skill in the art.

At step 2108, a target image is received. At step 2110, a target parameter set that corresponds to one or more labels for the target image can be determined using the trained classifier. In some embodiments, this classifier is the classifier created at step 2106. In some embodiments, the target parameter set can correspond to one or more labels that have been transformed using a transformation technique, such as DCT, wavelets, discrete Fourier transform, PCA, NMF, and Hadamard transform. In some embodiments, the target image is one of RGB, panchromatic, IR, UV, multi-spectral, hyperspectral, and/or any other suitable image.

At step 2112, a label image can be generated by applying an inverse transformation to the target parameter set. For example, if the target parameter set generated at step 2110 corresponds to DCT, then an inverse transformation of DCT can be applied to this target parameter set to produce a label image or label map. In some embodiments, one or more pixels of the segmented image can be associated with a class. For example, a particular pixel of the label image can be associated with a roof. In some embodiments, the class can be two-class. In other embodiments, the class can be multi-class. An example of step 2112 is described in connection with FIG. 24 below.

In some embodiments, method 2100 can also include receiving other training parameter sets for the training images. For example, a training parameter set can include at least one of time, date, sun direction, sun position, latitude, longitude, and/or any other suitable parameter or combination of parameters. In some embodiments, this additional information from the training parameter sets can be related to corresponding training images. For example, the time value can be related to the time when the training image was captured. As another example, the latitude value can be related to the latitude of the location where the training image was captured. In some embodiments, the additional information from the training parameter sets can increase the accuracy of the classifier.

Figure 22:
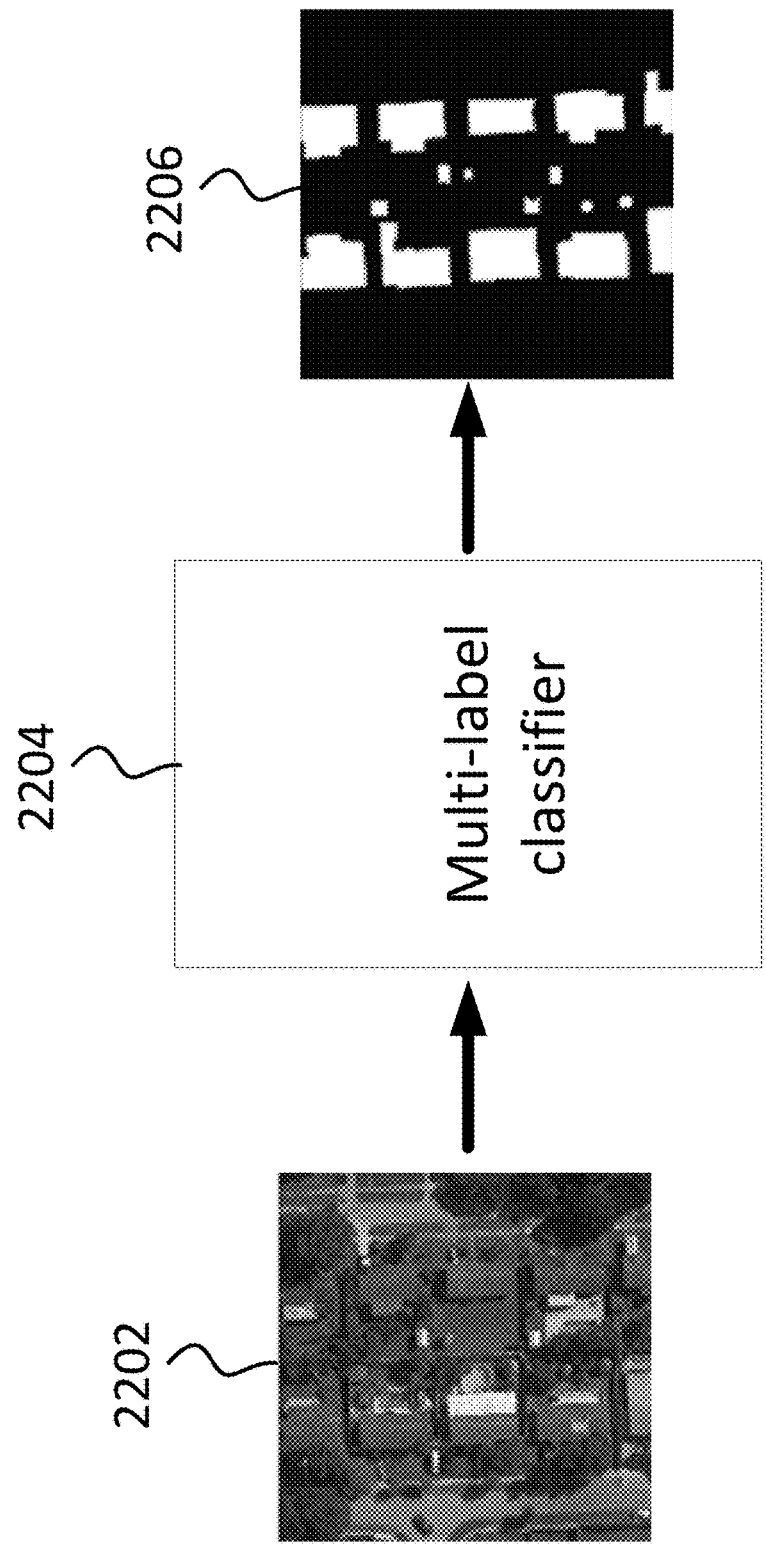
FIG. 22 illustrates an example input and output of the classifier according to some embodiments of the present disclosure.

FIG. 22 illustrates an example input and output of the classifier as described in connection with FIG. 21. Multi-label classifier 2204 is an example of a classifier created from step 2106 in FIG. 21. Multi-label classifier 2204 can receive an input, such as RGB image 2202 (e.g., from step 2108 in FIG. 21), and produce a segmented image 2206 (e.g., a heat map generated from step 2112 in FIG. 21). In some embodiments, segmented image 2206 can be represented as a heat map.

Figure 23:
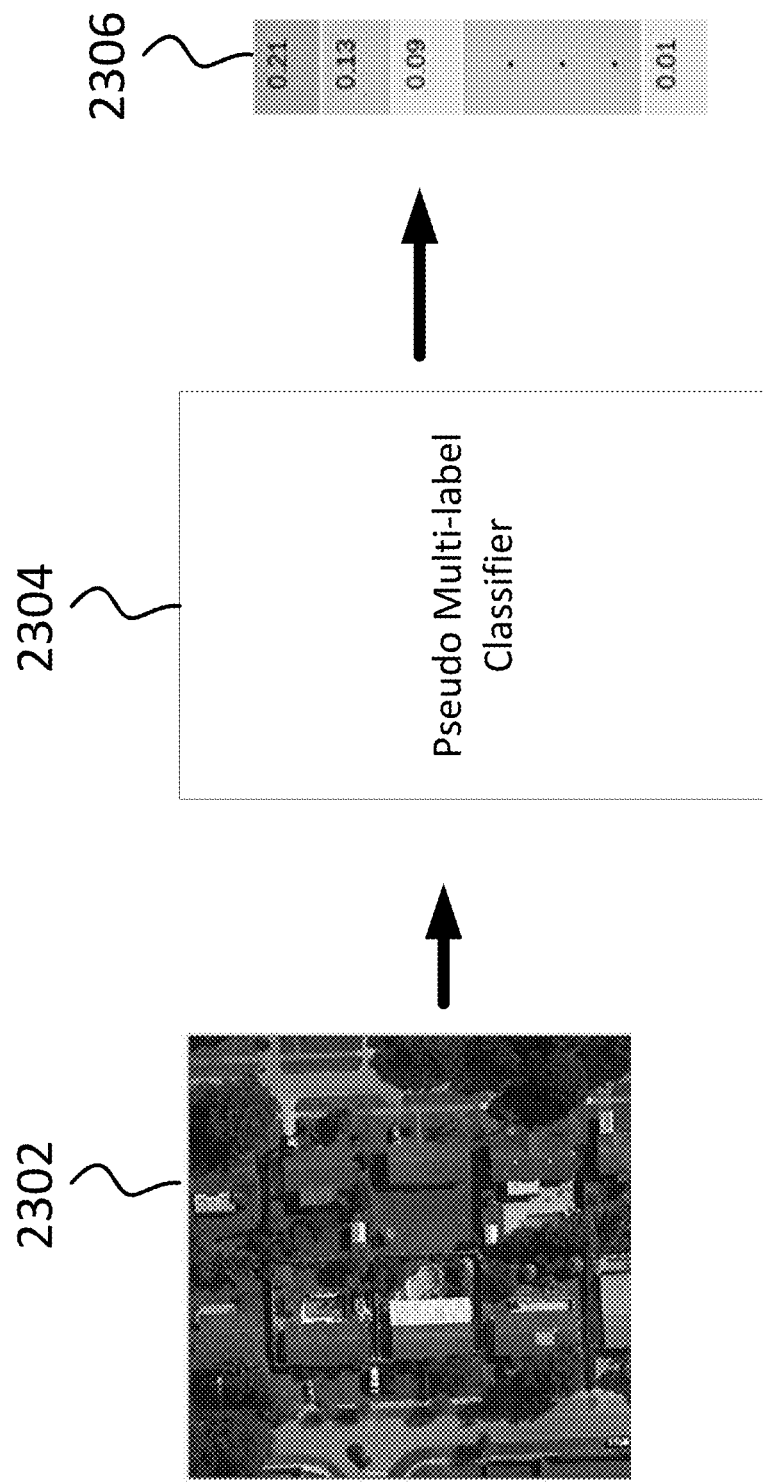
FIG. 23 illustrates an example input to a pseudo multi-label classifier according to some embodiments of the present disclosure.

FIG. 23 illustrates an example input to a pseudo multi-label classifier 2304 that can take an image 2302 (e.g., RGB image) as input and generate a parameter set 2306 as output. The parameter set 2306 can characterize an associated implicit label map under an orthogonal transformation (e.g., DCT, PCA, etc.). Non-limiting examples include the use of a CNN as the pseudo multi-label classifier 2304.

Figure 24:
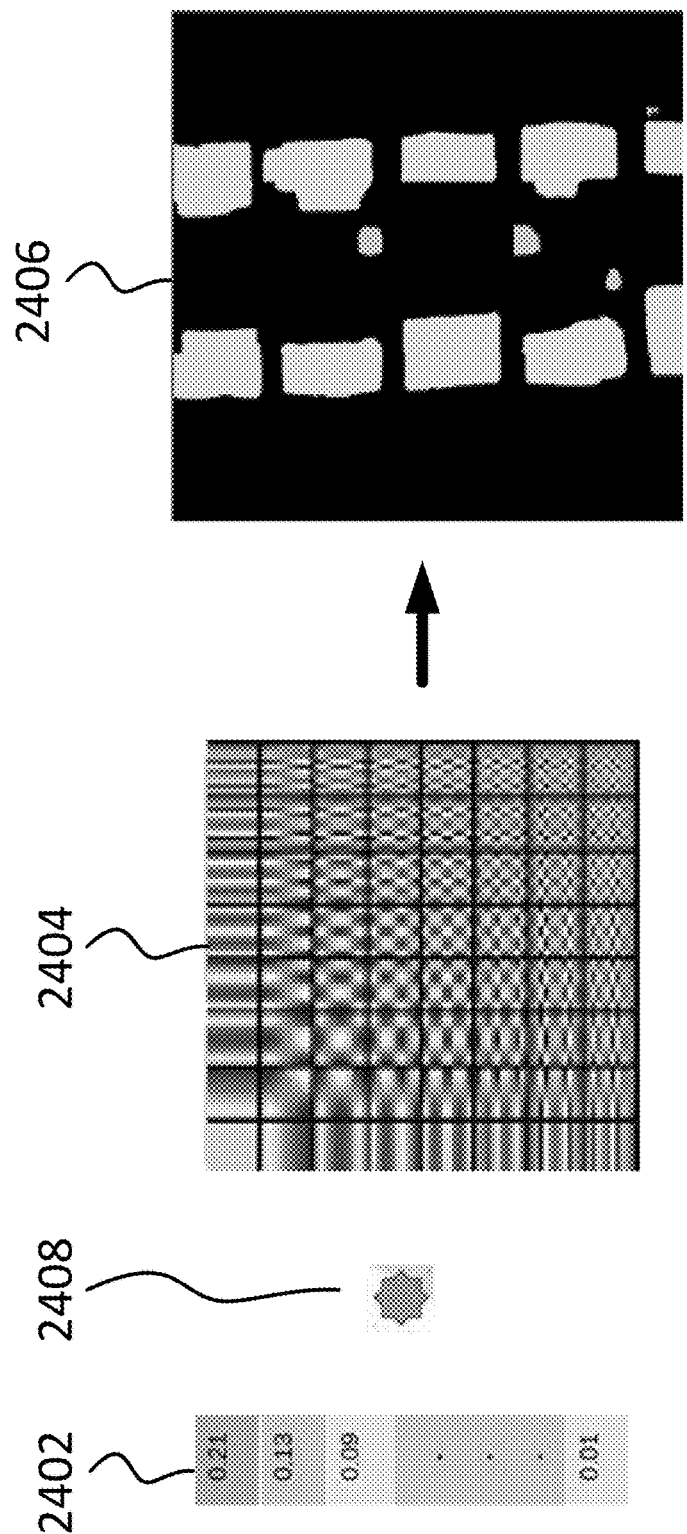
FIG. 24 illustrates an example parameter set and a label map formed from the parameter set according to some embodiments of the present disclosure.

FIG. 24 illustrates an example parameter set 2402 and a label map 2406 that is formed from the parameter set 2402. The parameter set 2402 is based on an orthogonal transformation using DCT. An image 2404 illustrates the 2D DCT frequencies that form the basis functions of the DCT transformation. A symbol 2408 represents applying the inverse DCT. The inverse DCT can be applied with correct normalization and summing over all the basis functions from the image 2404, where the product of each basis function and its corresponding coefficient in the parameter set 2402 is calculated. The resulting image can be a label map 2406, which can be a heat map that can show a class associated with each pixel of the segmented image. In some embodiments, a non-DCT transformation can be used instead of the DCT transformation.

Figure 35:
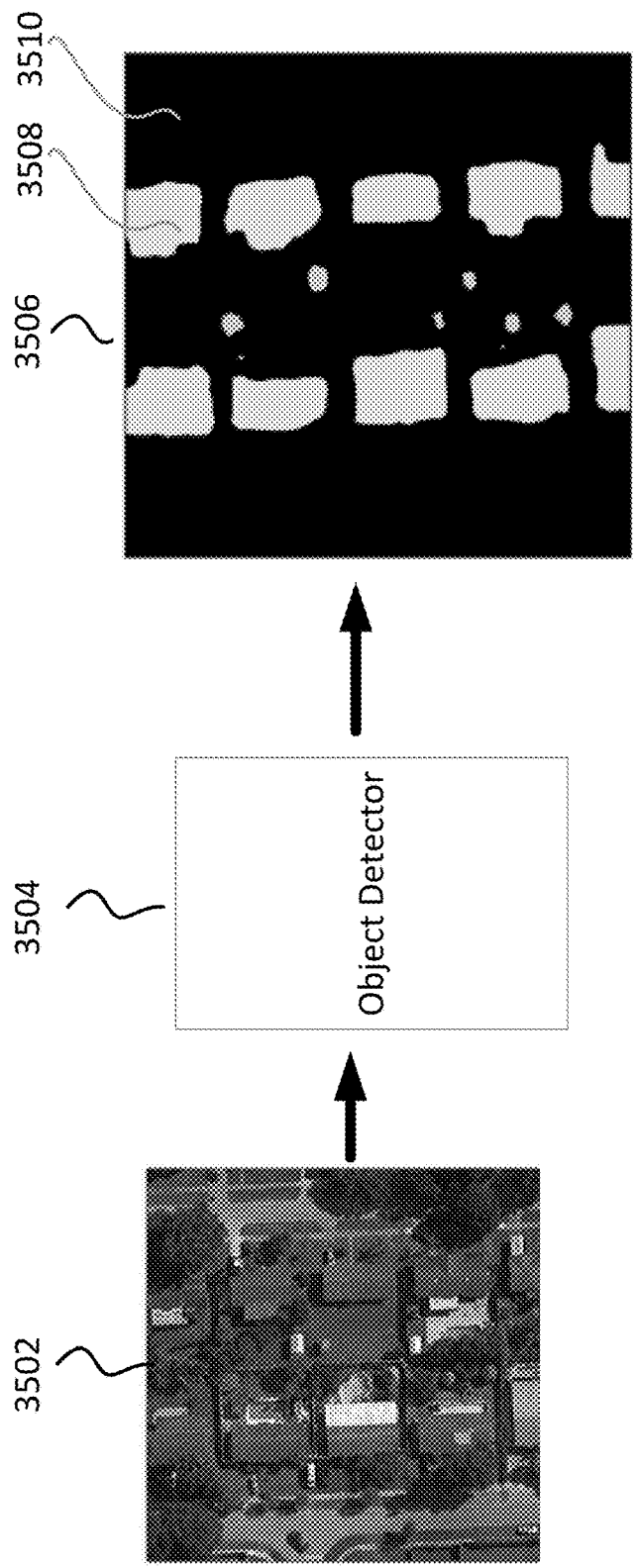
FIG. 35 illustrates an example of using an object detector according to some embodiments of the present disclosure.

FIG. 35 illustrates an example of using an object detector according to some embodiments of the present disclosure. Object detector 3504 can implement a method of generating a label image using a parameter set. For example, object detector 3504 can implement one or more steps of method 2100 (FIG. 21). Objector detector 3504 can take and process an input image, such as RGB image 3502. The output can be a label image. For example, the resulting label image can be a heat map 3506, where the light regions (e.g., light region 3508) show the roofs in the image and the dark regions (e.g., dark region 3510) show other structures.

Experiment Data

The accuracy and precision of the output from an object detector using machine learning can vary depending on many factors. These factors include, for example, the object detection method used, the type of input, the complexity of the input, the amount of data used in training the object detector, the quality of the data used in training the object detector, and the similarity between the training data and the input. For example, the more similar the input is to the training data, the more accurate the output is. As another example, using a large amount of training data can generally result in a more accurate output compared to using a small amount of training data.

Figure 36:
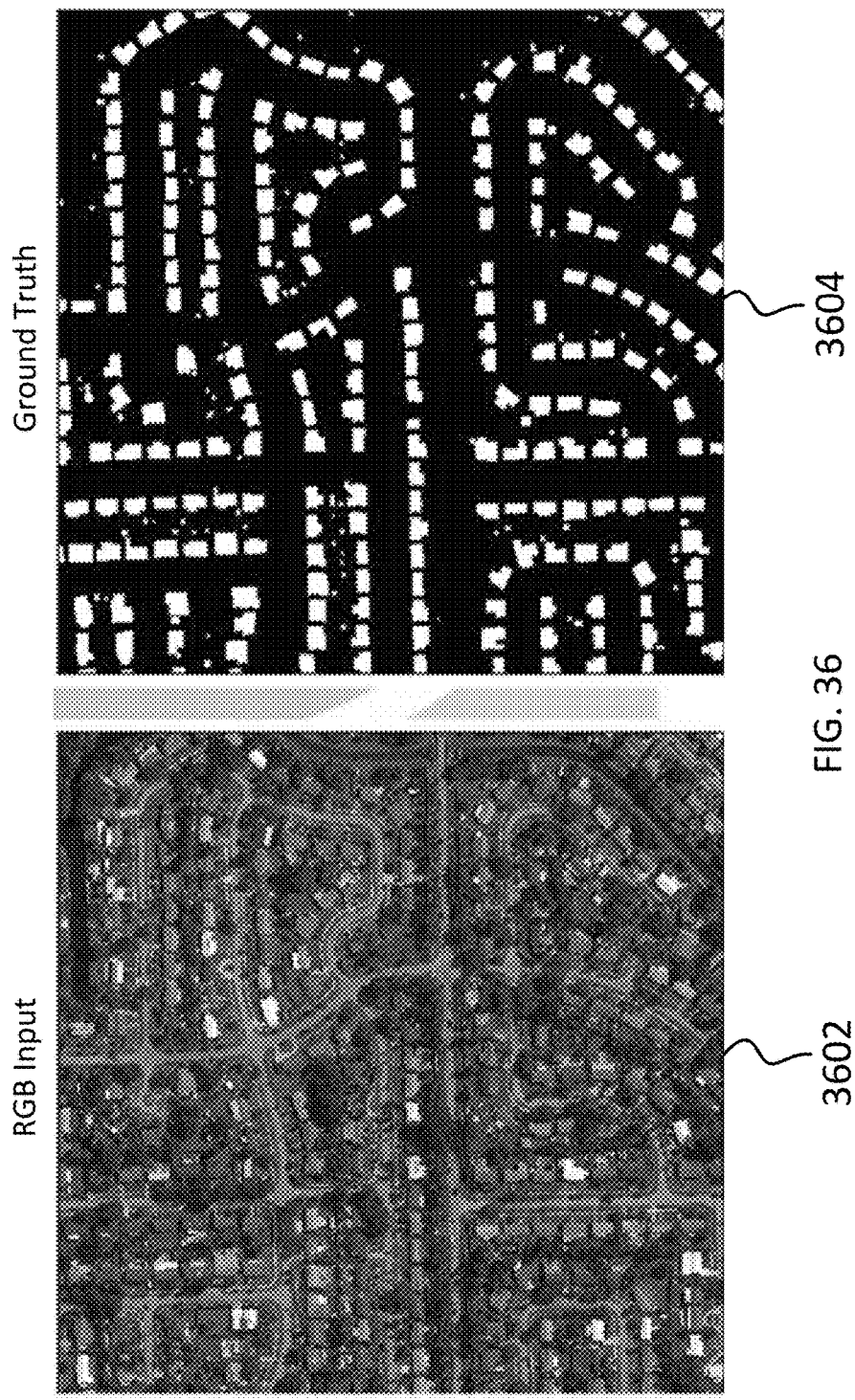
FIG. 36 illustrates an example of ground truth data generated from an RGB input according to some embodiments of the present disclosure.
Figure 37:
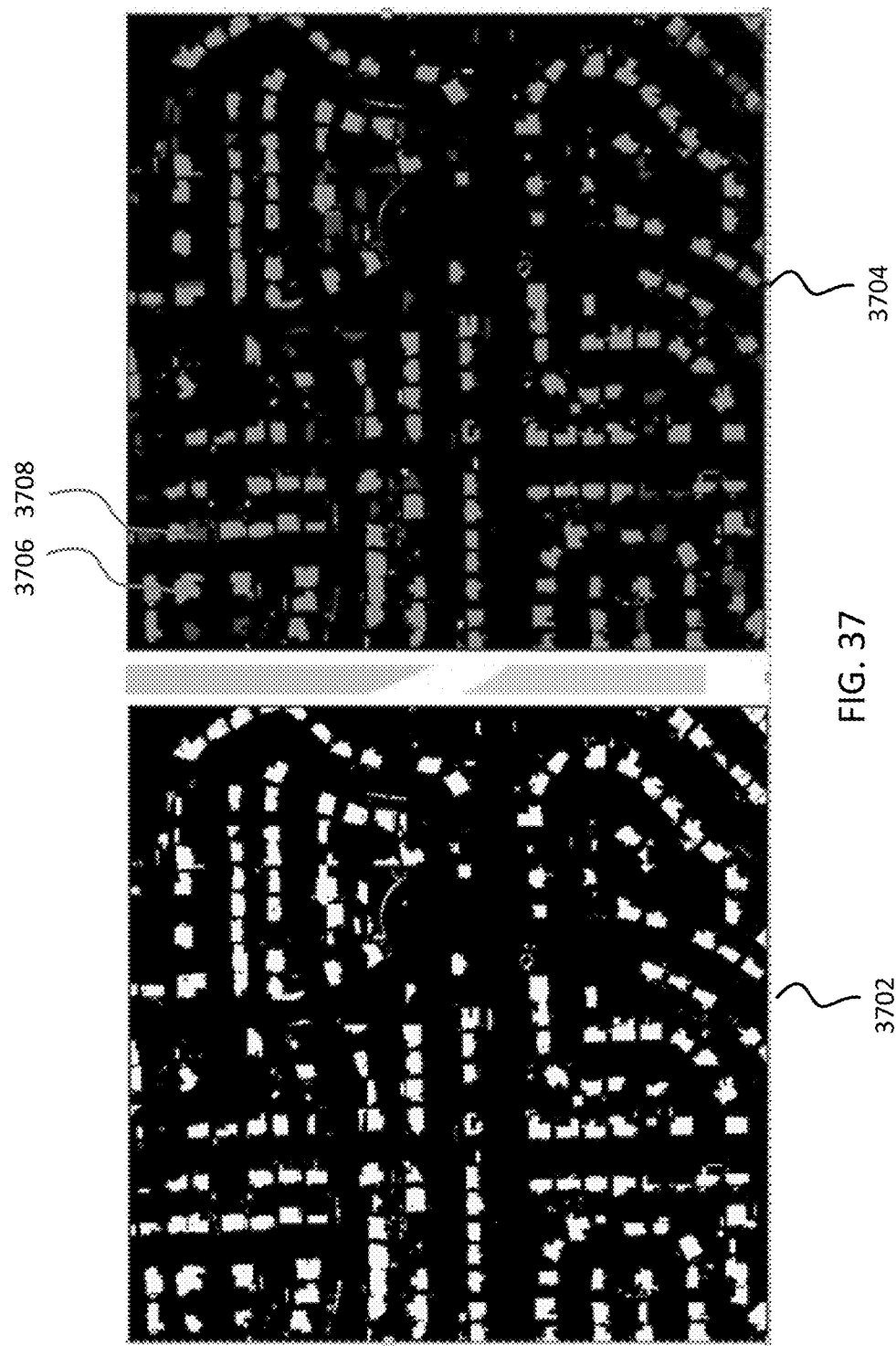
FIG. 37 illustrates a binary output generated from using a hybrid segmentation method according to some embodiments of the present disclosure.

FIG. 36 illustrates ground truth data 3604 generated from an RGB image 3602 as input. Ground truth data 3604 can be considered accurate, and thus, it can represent the reference data, to which experimental data can be compared. In some embodiments, the ground truth data 3604 can be generated manually using, for example, an interactive polygon editing tool. This ground truth data 3604 can be used to compare with the outputs from an object detector. FIGS. 37-39 illustrate using the same input as FIG. 36 (e.g., RGB image 3602). The outputs shown in these figures are, however, different because they use different object detection methods. The experimental data described in FIGS. 37-39 is for illustrative purposes.

FIG. 37 illustrates a binary output 3702 generated from using a hybrid segmentation method, such as method 300 (FIG. 3). The binary output 3702 can be evaluated for accuracy using ground truth data 3604. Another form of heat map 3704 can be used to show the level of accuracy for the binary output 3702. For example, an area where the color is the same or similar to segment 3706 (e.g., light gray) indicates that the area has been accurately segmented. A pixel in this area can be called a "true pixel." On the other hand, an area where the color is the same or similar to segment 3708 (e.g., dark gray) indicates that the area has not been accurately segmented. A pixel in this area can be called a "false pixel." In some embodiments, segmentation of an area can be considered accurate if the level of accuracy exceeds a threshold value. For example, given an area, if the percentage of an object in the area is correctly identified by the binary output 3702 as compared to ground truth data 3604, and the percentage exceeds a threshold value, segmentation of that area can be considered accurate. Moreover, a true positive occurs at a pixel when the observation (e.g., results of a disclosed system such as the binary output 3702) and the ground truth data both indicate the foreground at the pixel. A false positive occurs at a pixel when the observation indicates the foreground and the ground truth data indicates the background at the pixel. A false negative occurs at a pixel when the observation indicates the background and the ground truth data indicates the foreground at the pixel.

FIG. 38 illustrates a binary output 3802 generated from using a pseudo multi-label classification method, such as method 2100 (FIG. 21). Similar to heat map 3704 (FIG. 37), heat map 3804 can be used to show the level of accuracy for the binary output 3802. Heat map 3804 shows the resulting evaluation of this output, which is compared against ground truth data 3604.

FIG. 39 illustrates binary output 3902 generated from using a fully convolutional network(s) (FCN) with a pseudo multi-label classification method. The FCN(s) can be used to convert all fully-connected layers of a CNN into equivalent convolutional layers. This can allow input images of arbitrary size to be processed in one forward pass through the network instead of using separate image chips in their own forward passes. Consequently, the convolutional kernels in FCN(s) are required to be evaluated only once, independent of the actual number of chips that take them into account for classification. Similar to heat map 3704 (FIG. 37), heat map 3904 can be used to show the level of accuracy for the binary output 3902.

Machine Learning for Geometry Extraction

Digital Elevation and Height Maps from Multiple Images

Elevation is taken to be relative to a global reference (e.g., mean sea level). Height is taken to be relative to local environment (e.g., the height of buildings above the surface of neighbors). With one or more images of the same area, an above ground height model (AGHM) image can be generated using a classifier, where every pixel of the AGHM image can be assigned to a height above ground. The classifier can estimate elevations or heights of geographic regions and/or objects in images by direct or relative prediction without performing feature search or extraction. The classifier can generate an AGHM based on the estimation. In some embodiments, the elevations and heights can be represented as a heat map. In some embodiments, the specified geographic regions or objects can be determined relative to a baseline elevation. For example, the baseline elevation can be the ground elevation. Using the ground elevation, each object height, such as a building height, can be relative to the ground on which it stands. In other embodiments, the baseline elevation can be sea level.

Figure 25:
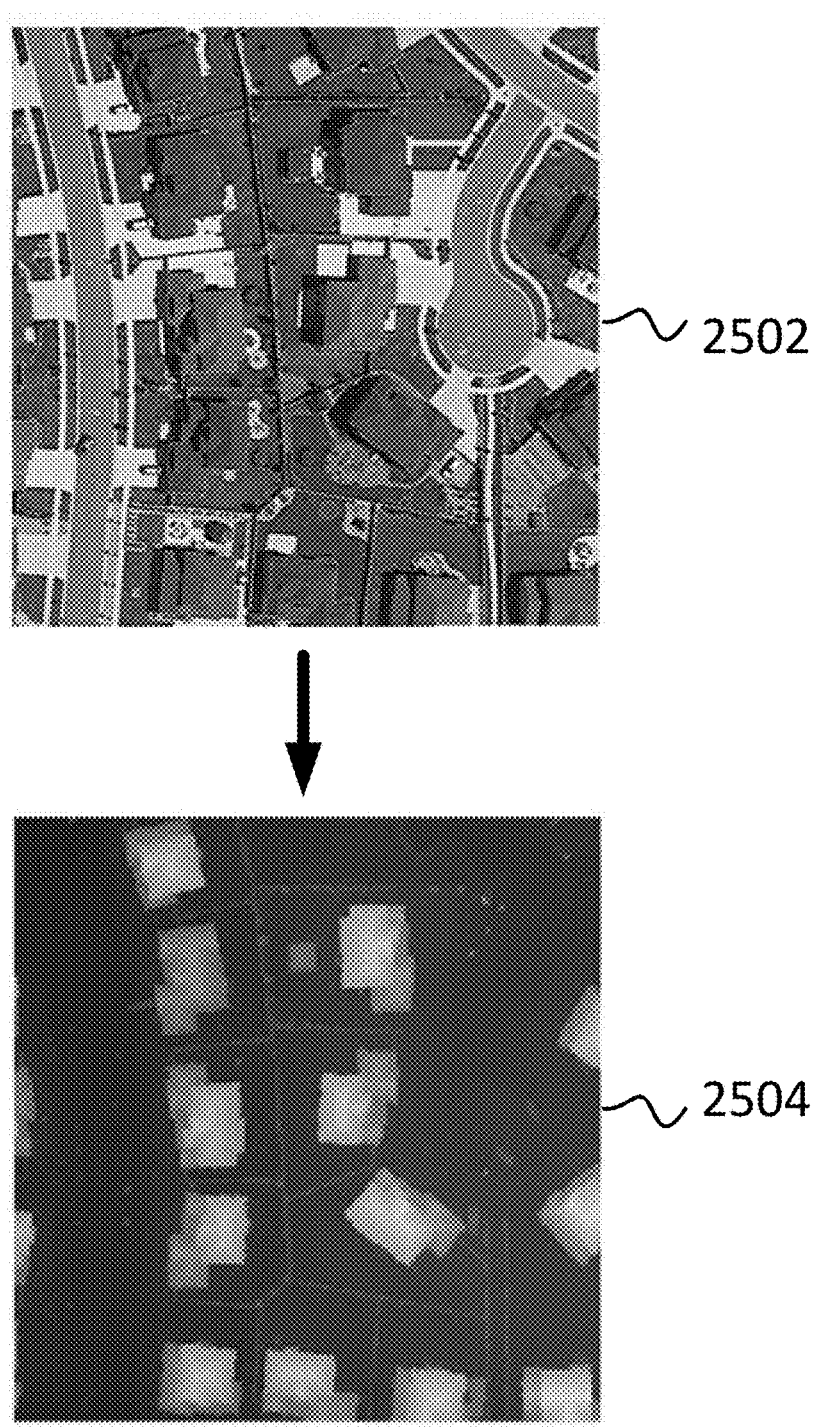
FIG. 25 illustrates an example RGB image and an example AGHM image according to some embodiments of the present disclosure.

FIG. 25 illustrates an example RGB image 2502 and an example AGHM image 2504. In some embodiments, a classifier can be created so that it takes in an RGB image (e.g., as shown in 2502) as an input and generates an AGHM image (e.g., as shown in 2504) as output.

In some embodiments, two types of images—a digital surface model (DSM) and a digital elevation model (DEM)—can be used to generate AGHM images. A DSM can represent the elevation of the tops of all reflected surfaces, including both natural and built environments. A DEM image can show the baseline ground elevation without any structure (e.g., buildings) or vegetation (e.g., trees). In some embodiments, the DEM is a 3D surface model. In some embodiments, a model (e.g., DSM, DEM) can be a 2D surface that resides in 3D. In some embodiments, a model can be a 2D surface that projects into a 2D map. In some embodiments, a model can refer to both the 3D and 2D variants. The height above ground can be derived by taking the difference between the DSM and the DEM. Using this difference, the object height that is relative to the ground on which it stands can be determined. Both DSM and DEM can be derived, for example, from LIDAR or stereo reconstruction. Stereo reconstruction can involve taking two or more images of the same object from different locations.

A machine learning network can be trained to learn methods—such as photogrammetric techniques (e.g., stereo rectification) and variants of block-matching techniques—to determine the disparity or shift between matching points across multiple images. These methods can further rely on explicit regularization and smoothing frameworks (e.g., Markov Random Fields) to ensure that nearby or neighboring pixels have similar depth values and that depth values for each pixel are not far from their original estimates. In some embodiments, a machine learning network can be trained to learn these methods within the context of a deep neural network (DNN).

In some embodiments, common key points in different images can be identified. The relative distance between these common key points on each respective image can be used to estimate the location of the camera/aperture and/or the location of each key point.

In some embodiments, a machine learning network can use one or more of the following data items for training to create a classifier: two or more raw 2D images; ground sampling distance (GSD); relative estimated camera/aperture locations for each image; camera location; and an AGHM as ground-truth. In some embodiments, machine learning uses an ANN or a CNN. In some embodiments, a trained classifier can receive 2D images and optionally the camera location(s), and output an AGHM.

Machine learning has many advantages. For example, a machine-learned device does not require handcrafted feature design and extraction, classical stereo-rectification, epipolar geometry, and block-matching. The device can also accommodate regions of homogeneous intensity or color. The device does not need explicit regularization. Moreover, it is edge-preserving, which is desired for subsequent processing, such as segmentation.

During the training stage, the label space for the classifier can be a heat map, whose ground truth can be derived from LIDAR measurements or classical stereo vision. For example, LIDAR measurements can be in the form of point clouds or derived data such AGHMs. In some embodiments, the training can be performed with single pixels, such as sparse 3D LIDAR points. During the test or execution stage of the classifier, the output can be a heat map.

Different feature spaces can be used to train a network. Below is a description of four non-limiting examples of feature spaces.

First, a feature space can include a set of images defining the same geographic area taken from sensors, whose relative pose (translation and rotation) is fixed. For example, images can be taken from one nadir sensor and four oblique sensors configured in a circular pattern. "Nadir" and "oblique" refer to the orientation of the sensor relative to the ground target. A nadir sensor can point directly below at its target (e.g., camera axis is vertical relative to its target). An oblique sensor can point at angle to its target. The network can be trained just for this particular "stereo" or "n-focal rig." Both the intrinsic camera parameters (e.g., pinhole camera matrix and those related to lens distortion) and the extrinsic camera parameters (e.g., relative position and orientation of camera to a world coordinate system) can be implicit to the model. In other words, these intrinsic and extrinsic camera parameters may not need to be directly estimated.

Second, a feature space can include a set of images defining the same geographic area taken from sensors whose relative pose is not fixed. The feature space can further include a set of relative poses and intrinsic parameters of these sensors. For example, the pose can be represented as a 6 real-valued number, and each sensor can have real-valued numbers as its parameters. The network can take in these additional parameters in addition to the images.

Third, a feature space can include a set of images, all of which are projected onto the same geographic surface (e.g., WGS84 with web-mercator), defining the same geographic area. An example includes image tiles which lie in the same coordinate space. The set of relative poses and camera parameters—both intrinsic and extrinsic—is implicit to the model and can be learned by the network. The network can be trained just for a specific "stereo-rig" or "n-focal-rig."

Fourth, a feature space can include a set of images, all of which are projected onto the same geographic surface (e.g., WGS84 with web-mercator), defining the same geographic area. In contrast to the third example, the set of relative poses and camera parameters—both intrinsic and extrinsic—are part of the feature space. In other words, this set is explicitly given as input to the network. Consequently, the network is not only trained for a specific "stereo-rig" or "n-focal-rig," but also can be used for multiple configurations.

For all types of features spaces, including the example feature spaces described above, dense reconstruction can be achieved, for example, by applying the training method to scaled images followed by, in post-processing, interpolation/regularization techniques, such as triangulation and Markov Random Fields.

Figure 33A:
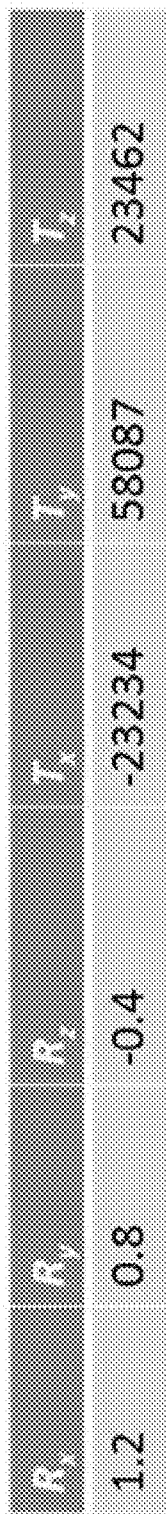
Figure 33B:
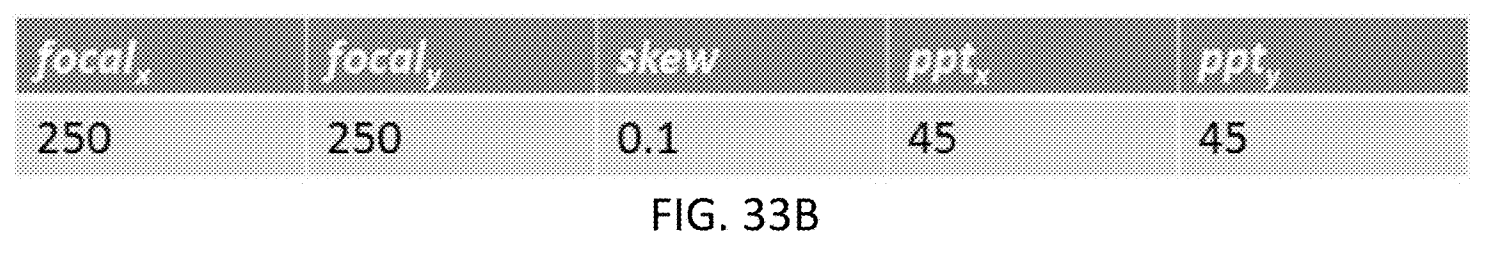
Figure 33D:
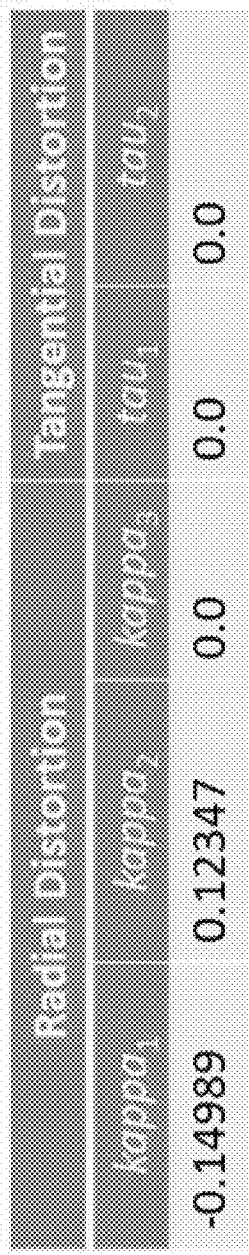

FIGS. 33A-D illustrate example parameter values related to a sensor in accordance with certain embodiments of the present disclosure. FIG. 33A illustrates extrinsic camera parameters. The $R_x$, $R_y$, and $R_z$ refer to rotation about three cardinal axes in a reference frame. The $T_x$, $T_y$, and $T_z$ refer to translation in a reference frame. FIG. 33B illustrates intrinsic camera parameters. The $focal_x$ and $focal_y$ refer to focal length in cardinal dimension in an image. The skew refers to shear distortion. The $ppt_x$ and $ppt_y$ refer to the principal point in an image. FIG. 33C illustrates date, time, latitude, and longitude. FIG. 33D illustrates lens distortion parameters. The kappa and tau parameters refer to radial and tangential distortion coefficients often associated with lens.

Figure 10A:
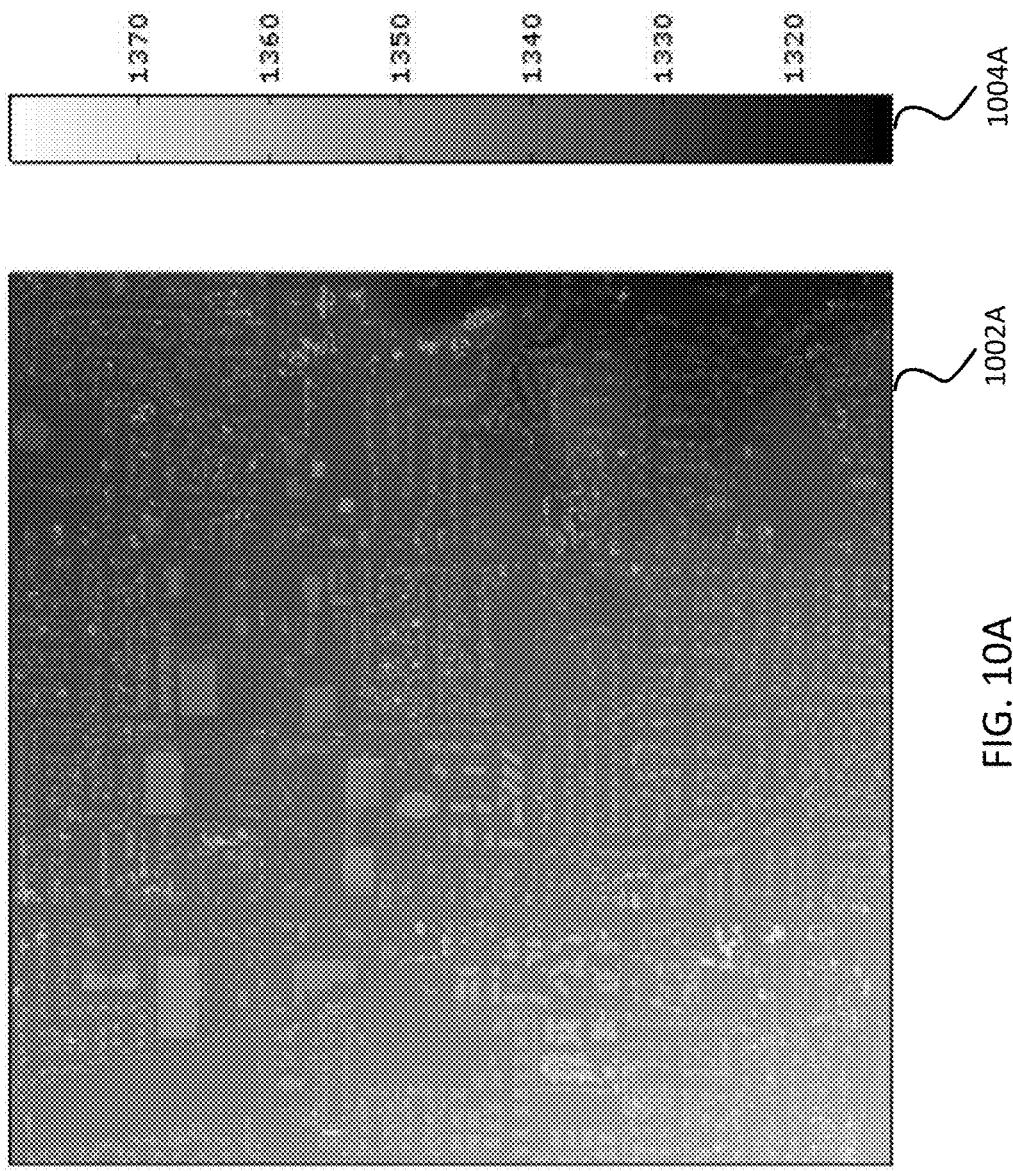
FIGS. 10A, 10B, and 10C respectively illustrate an example set of a DSM image, a DEM image, and an AGH image according to some embodiments of the present disclosure.
Figure 10B:
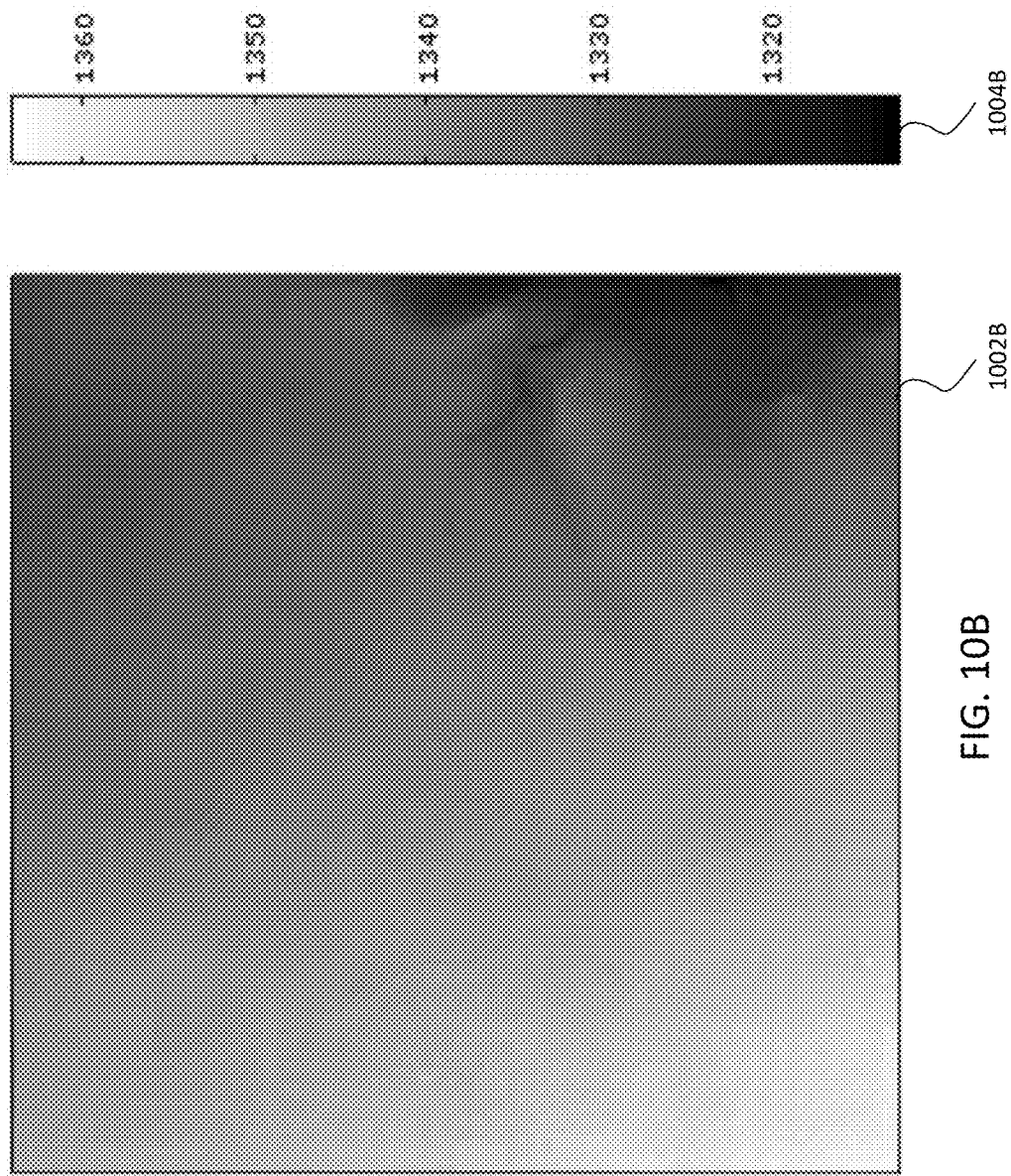
Figure 10C:
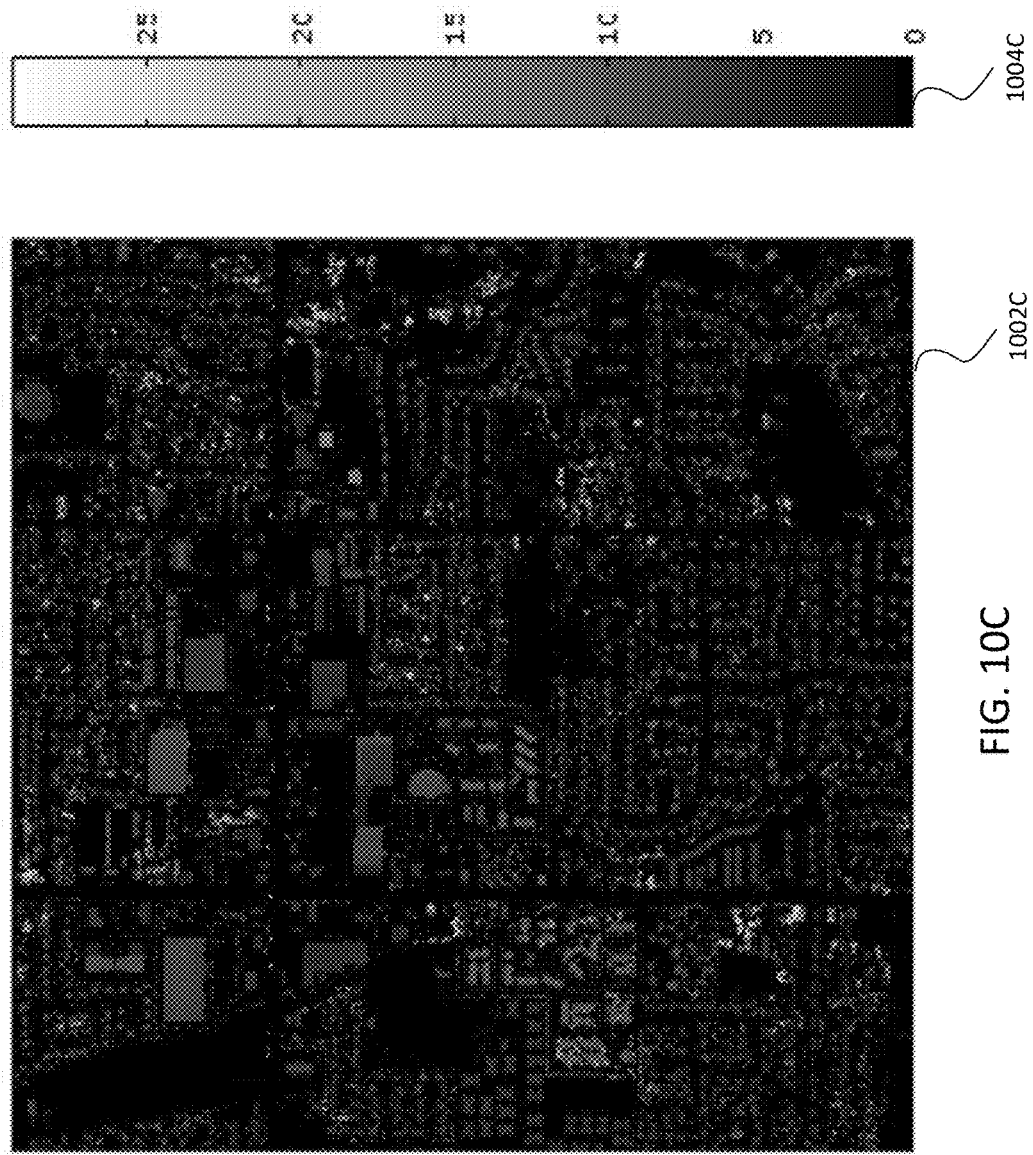

FIGS. 10A-C illustrate an example set of a DSM image, a DEM image, and an AGH image, respectively, in accordance with certain embodiments of the present disclosure. In FIG. 10A, DSM image 1002A is a grayscale image, where various heights of the objects in DSM image 1002A are indicated by varying shades of grayscale. For example, the brighter the color (e.g., closer to white), the higher up the indicated object is from a reference level (e.g., higher elevation), compared to the darker color (e.g., closer to black). In some embodiments, the brighter the color indicates, the closer the object is to the sensor or camera that captured the image from above the object. Legend 1004A provides mapping between a spectrum of brightness to an elevation of a given point (measured on top surface). The elevation can, for example, be measured in reference to above the sea level. Legend 1004A provides a range of elevations of about 1310 meters to 1380 meters.

In FIG. 10B, DEM image 1002B is a grayscale image, where the height of each pixel that represents the area in the image is indicated by varying shades of grayscale. For example, the brighter the color (e.g., closer to white), the higher up the indicated area is from a reference level (e.g., higher elevation), compared to the darker color (e.g., closer to black). In some embodiments, the brighter the color, the closer the area is to the sensor or camera that captured the image from above the area. Legend 1004B provides mapping between a spectrum of brightness to an elevation of a given point (measured from a top surface). The elevation can, for example, be measured in reference to above the sea level. Legend 1004B provides a range of elevations of about 1310 meters to just over 1360 meters. In some embodiments, these elevations are the baseline ground elevations without any built structure or vegetation.

In FIG. 10C, AGH image 1002C is a grayscale image that is generated based on DSM image 1002A and DEM image 1002B. Legend 1004C provides a mapping between a spectrum of brightness to an AGH of a given point. In some embodiments, AGH image 1002C can be generated by subtracting the elevation given in DEM image 1002B from the elevation given in DSM image 1002A for every pixel.

Figure 11A:
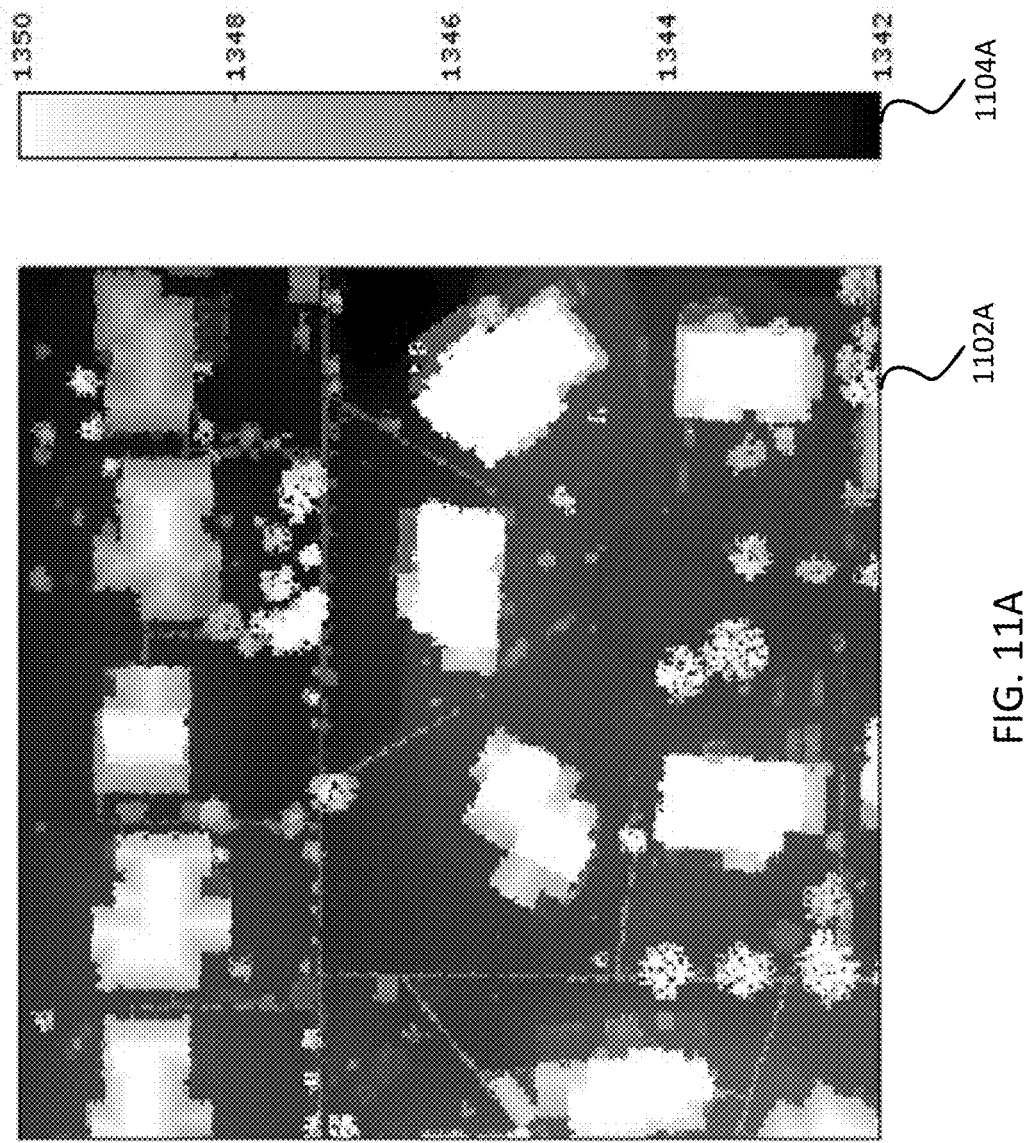
FIGS. 11A, 11B, and 11C respectively illustrate an example set of a DSM image, a DEM image, and an AGH image according to some embodiments of the present disclosure.
Figure 11B:
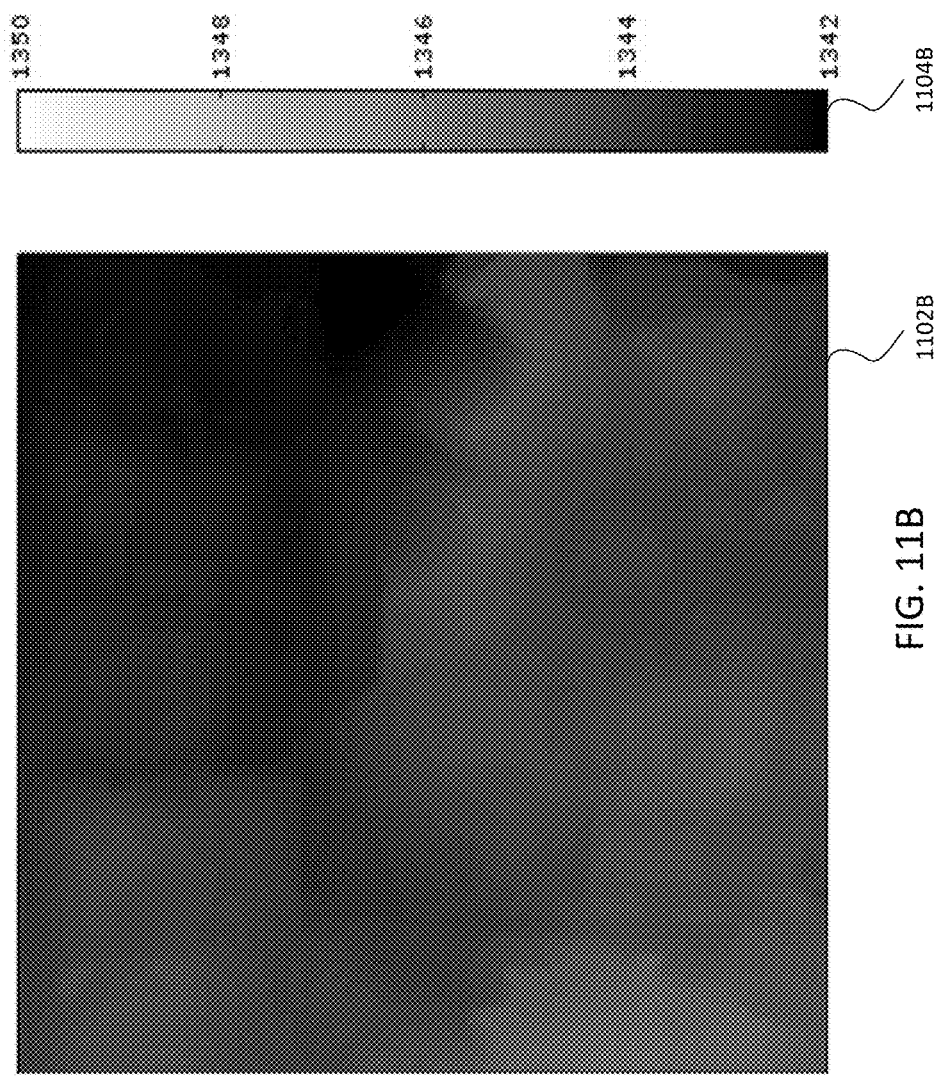
Figure 11C:
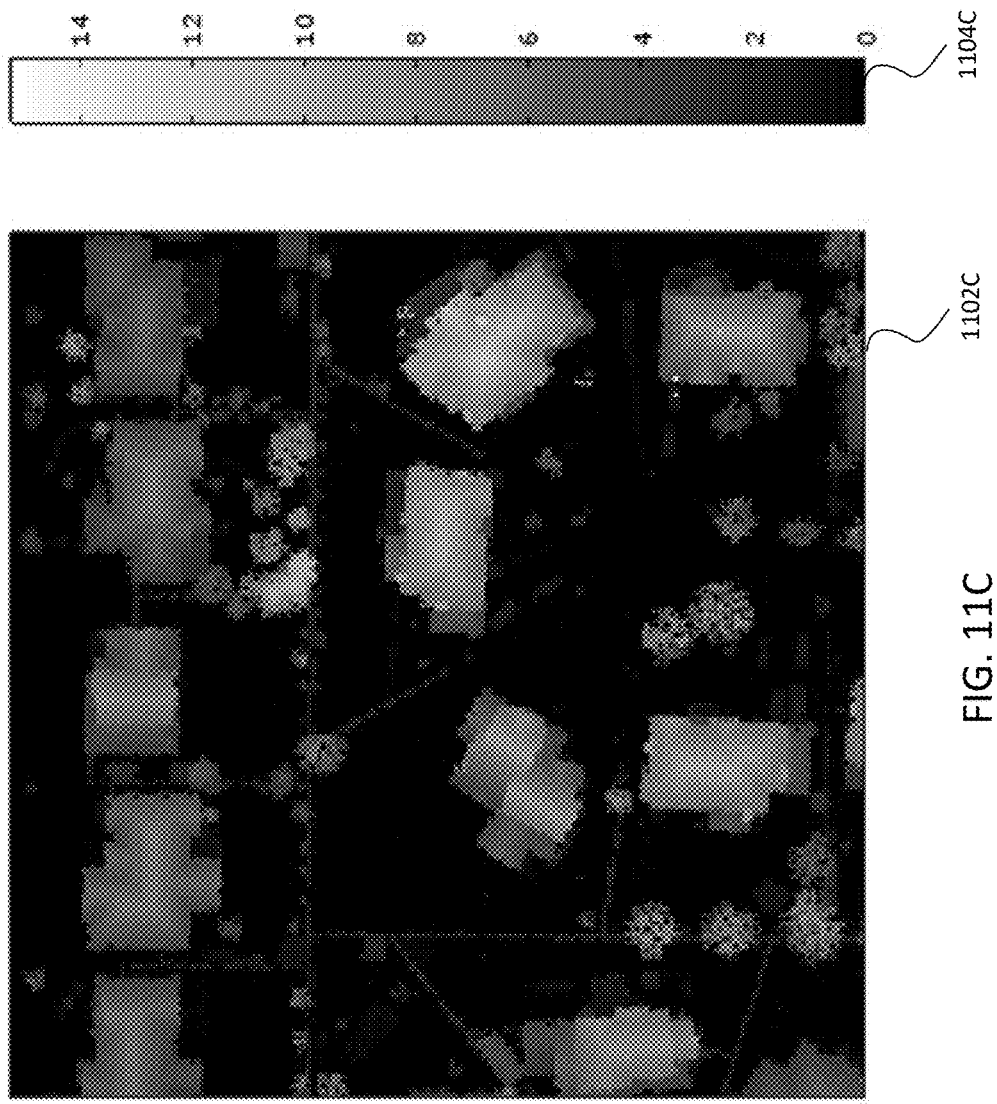

FIGS. 11A-C illustrate another example set of a DSM image, a DEM image, and an AGH image, respectively, in accordance with certain embodiments of the present disclosure. In FIG. 11A, DSM image 1102A is a grayscale image, where various heights of the objects in DSM image 1102A are indicated by varying shades of grayscale. For example, the brighter the color (e.g., closer to white), the higher up the indicated object is from a reference level (e.g., higher elevation), compared to the darker color (e.g., closer to black). In some embodiments, the brighter the color indicates, the closer the object is to the sensor or camera that captured the image from above the object. Legend 1104A provides mapping between a spectrum of brightness to an elevation of a given point (measured on top surface). The elevation can, for example, be measured in reference to above the sea level. Legend 1104A provides a range of elevations of about 1342 meters to 1350 meters.

In FIG. 11B, DEM image 1102B is a grayscale image, where the height of each pixel that represents the area in the image is indicated by varying shades of grayscale. For example, the brighter the color (e.g., closer to white), the higher up the indicated area is from a reference level (e.g., higher elevation), compared to the darker color (e.g., closer to black). In some embodiments, the brighter the color, the closer the area is to the sensor or camera that captured the image from above the area. Legend 1104B provides mapping between a spectrum of brightness to an elevation of a given point (measured from a top surface). The elevation can, for example, be measured in reference to above the sea level. Legend 1104B provides a range of elevations of about 1342 meters to about 1350 meters. In some embodiments, these elevations are the baseline ground elevations without any built structure or vegetation.

In FIG. 11C, AGH image 1102C is a grayscale image that is generated based on DSM image 1102A and DEM image 1102B. Legend 1104C provides a mapping between a spectrum of brightness to an AGH of a given point. In some embodiments, AGH image 1102C can be generated by subtracting the elevation given in DEM image 1102B from the elevation given in DSM image 1102A for every pixel.

Elevations and elevation ranges are not limited to those described in FIGS. 10A-C and 11A-C. Elevations can be any numbers, and elevation ranges can be any range of numbers.

Figure 12:
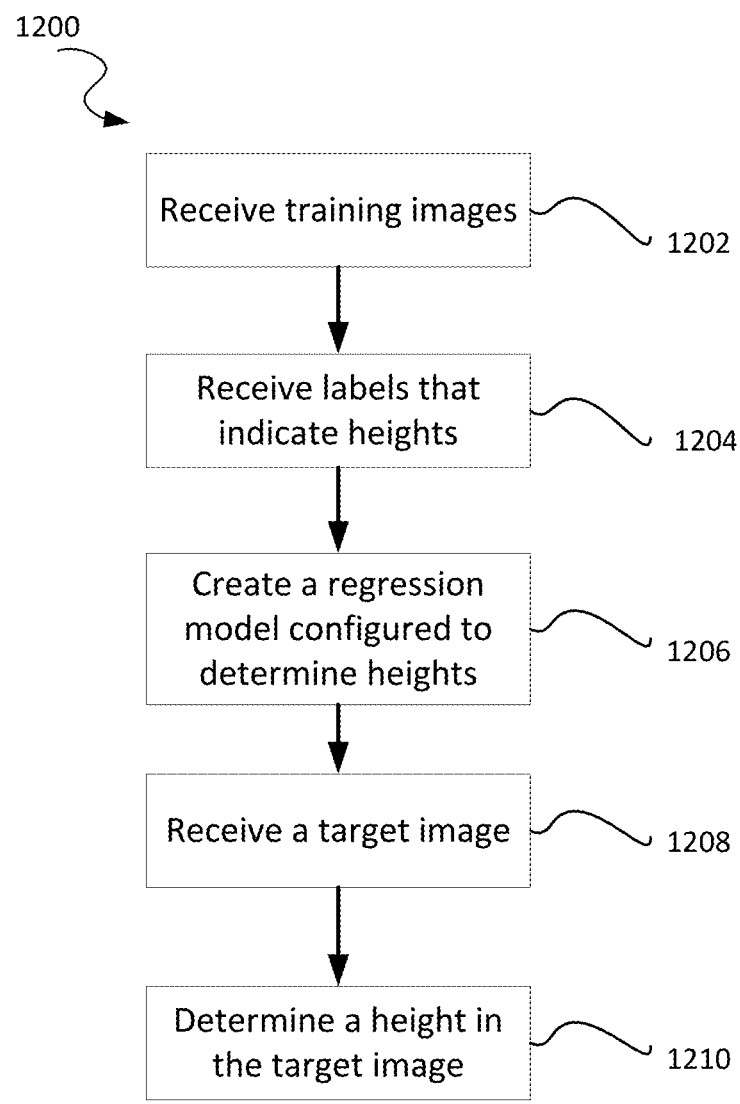
FIG. 12 illustrates a method of determining heights of one or more regions in an image according to some embodiments of the present disclosure.

FIG. 12 illustrates a method 1200 of determining heights of one or more regions in an image according to some embodiments of the present disclosure. In some embodiments, method 1200 can be modified by, for example, having steps combined, divided, rearranged, changed, added, and/or removed. In some embodiments, method 1200 can be performed at an extractor. In some embodiments, method 1200 can use one of the four feature spaces described above.

At step 1202, training images can be received. In some embodiments, each of the training images is one of RGB, panchromatic, IR, UV, multi-spectral, hyperspectral, and/or any other suitable image. In some embodiments, each training image can include one or more regions, where each region includes one or more pixels. The training images can include one or more pixels. In some embodiments, these training images can be the same image type. For example, these training images are all of one of the following image types: RGB, IR, and UV. In some embodiments, the training images can be from one or more sensors. In some embodiments, the one or more sensors can be at fixed positions. In some embodiments, in addition to the training images, parameters related to the position(s) of the sensor(s), orientations of the sensors relative to one another, and/or orientation of illumination source that associates formation of the training images can be received. Examples of these parameters can include, for example, time, date, sun direction, sun position, latitude, longitude, and/or any other suitable parameter or combination of parameters. In some embodiments, a latitude and/or a longitude are coordinate(s) for the position of a sensor. In other embodiments, a latitude and/or a longitude are coordinate(s) for the position of an object or an image. In some embodiments, parameters related to positions of the sensor(s) that are configured to capture the training images can be received. In some embodiments, the training images can be projected onto a same geographic surface that defines the region(s).

At step 1204, labels can be received. In some embodiments, each of these labels can indicate a height for one or more pixels of a region. In some embodiments, a label can indicate a height for more than one pixel that represents one or more regions.

At step 1206, a regression model can be created based on the received training images and the received training labels. The regression model can be configured to determine a height of one or more regions of an image. In some embodiments, the regression model can be created using a machine learning system, such as an ANN or a CNN as would be appreciated by one of ordinary skill in the art.

At step 1208, a target image can be received as an input to the regression model. In some embodiments, the target image is one of RGB, panchromatic, IR, UV, multi-spectral, hyperspectral, and/or any other suitable image. The target image can have one or more target regions. In some embodiments, the target image is the same type as the training images. For example, if the training images are RGB, the target image can also be RGB. In other embodiments, the target image is a different type from the training images. In some embodiments, when the target image is a different type from the training images, the target image can be transformed to the same type as the training images.

At step 1210, one or more heights of the one or more target regions can be determined using the regression model. In some embodiments, this regression model is the regression model created at step 1206.

In some embodiments, during both the training stage and execution stage, additional parameters can be received. These additional parameters can include parameters related to (1) positions of the one or more sensors and (2) orientation of illumination source that associates formation of the training images. Examples of these parameters include time, date, sun direction, sun position, latitude, longitude, and/or any other suitable parameter or combination of parameters.

Figure 13:
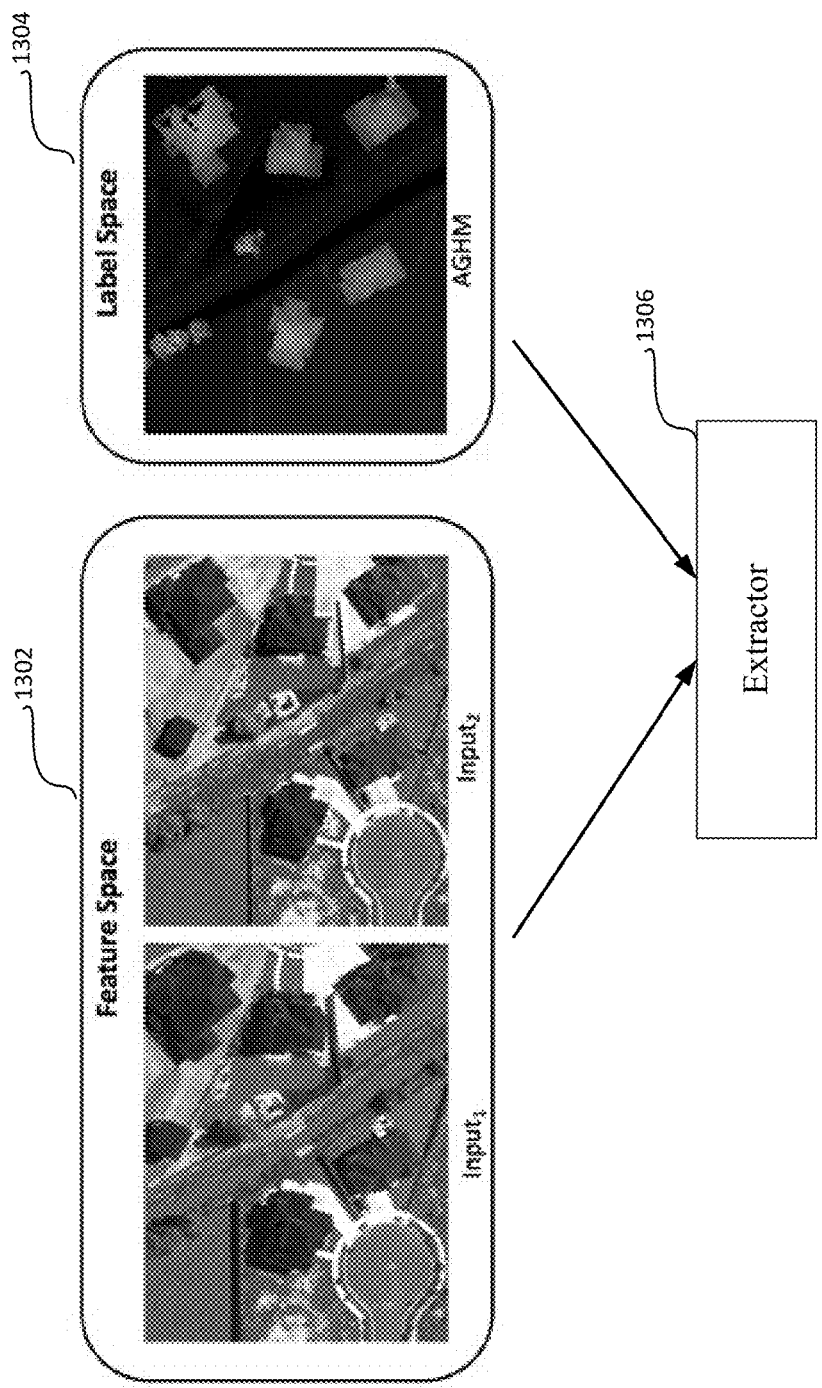
FIG. 13 illustrates example images in a feature space and a label space according to some embodiments of the present disclosure.

FIG. 13 illustrates example images in a feature space 1302 and a label space 1304. Feature space 1302 includes two input images—Input$_1$ and Input$_2$. Label space 1304 includes one input image, which is an AGHM image. An extractor 1306 can take these three images as input, in addition to other images, for training and creating a regression model that is configured to determine the heights of different regions in an image.

Surface Roughness (Object Height) from Shadows

Given a nadir image, traditional computer vision methods use shadows, date, time, and geographic position (latitude and longitude) information to triangulate height. These methods, however, require a significant amount of human interaction, and thus are slow and expensive. Moreover, these methods are not robust in the presence of vegetation because it is difficult to automatically detect shadow lines on uneven and cluttered surfaces, although in remote sensing images, there is typically enough information for humans to infer shadow lines, if not the height of structures.

Disclosed methods and systems can directly estimate the elevation or height of a specified region or object from various types of images, such as those from monocular imagery. The elevation or height can be relative to a baseline elevation and can be represented as a heat map. For example, the baseline elevation can be the ground elevation. Using the ground elevation, each object height, such as a building height, can be relative to the ground on which it stands. In other embodiments, the baseline elevation can be the sea level.

A machine learning network can be trained on what humans can directly see such that there is no need to segment shadows or extract shadow boundary features which may be noisy. In some embodiments, a machine learning network can be trained to learn these methods within the context of an ANN, a DNN or a CNN as would be appreciated by one of ordinary skill in the art.

The machine learning network can be trained with various types of data, such as data regarding building height and location (e.g., AGHM and table of values), images of buildings (e.g., nadir or near-nadir imagery), and information regarding the location of the camera and the sun.

During the training stage, the label space for the classifier can be a heat map, whose ground truth can be derived from LIDAR measurements or classical stereo vision. For example, LIDAR measurements can be in the form of point clouds or derived data such AGHMs. In some embodiments, the training can be performed with single pixels, such as sparse 3D LIDAR points.

The feature space can include an image representing a geographic area; a date and time; and a geographic point (latitude and longitude). In some embodiments, a set of date and time and a set of latitude and longitude are encoded as real-valued numbers. These two sets can infer the direction of the sun-light when and where the image is acquired.

For all types of features spaces, including the example feature space described above, dense reconstruction can be achieved, for example, by applying the training method to scaled images followed by, in post-processing, interpolation/ regularization techniques, such as triangulation and Markov Random Fields.

After the machine learning network has been trained, a classifier can be created such that it can receive a single image (e.g., nadir image) and parameters such as sun and camera locations. Using these input values, the classifier can output height estimates, a DEM, or a "roughness map." In some embodiments, the roughness map is analogous to an AGHM but only offers relative height changes or roughness. The output can be in the form of a heat map or a set of values. In some embodiments, a geometry-based model can be built, where shadows from a 3D model are generated by the known light position and compared to the input data.

Roof Pitch from Shading Using Deep Learning

Traditional computer vision methods cannot automatically distinguish the pitch of a rooftop from a monocular nadir image. Manual methods require humans to make certain assumptions and include additional data.

Disclosed methods and systems can automatically distinguish roof pitch from images. For a given roof, disclosed methods and systems can also estimate the roof's dominant pitch. For example, given an image that includes a roof, a disclosed method or system can take the image as an input and determine the dominant pitch of the roof (e.g., as 30 degrees).

A machine learning network, such as a CNN, can be trained with images such as monocular images; location and heat map of structures of interest; and/or ground truth regarding roof pitch for each building. The images may contain visible and/or non-visible bands (e.g., IR). An advantage lies in having many bands that provide complimentary information. Explicit modeling of reflectance can involve material constants with respect to Lambertian Law and other techniques.

In some embodiments, the machine learning network can be trained further with information regarding camera and sun location, hyperspectral imagery, multispectral imagery, and/or differential intensity gradients in various spectrums.

Given multiple faces of the same roof of the same material, the machine learning network can estimate the pitch by using computer graphics models, such as lighting and shading models.

During the training stage, the label space for the classifier can be a single real-valued number that represents the dominant pitch. For example, the dominant pitch can be expressed in degrees or percentages.

Different feature spaces can be used to train a network. Here, two non-limiting example feature spaces are provided. First, a feature space can include an image or set of images representing a roof. A network can be trained for a given combination of date, time, and geographic position (latitude and longitude). Second, a feature space can include an image or a set of images representing a roof along with a date, a time, and a geographic position (latitude and longitude) as real-valued numbers. The non-imagery portion of this feature space can be used to infer the direction of the sun-light at the location and/or time of image acquisition. The non-imagery portion can also be given through a normalization pre-processing of the input image. For example, the input image can be rotated so that the sun direction is from the South and the shadows are cast Northward. The input image can further be scaled so that the shadow cast by a roof of fixed height is always the same size in pixels.

After the machine learning network has been trained, the classifier can take the appearances of each face in multiple spectra (e.g., RGB, IR) and a model that describes the reflectance of the sun light from a surface with given material properties. Additionally, the material constants can be estimated whenever a sufficient number of facets are visible. The output of the production classifier can include a map of the buildings and roof pitch.

Figure 14:
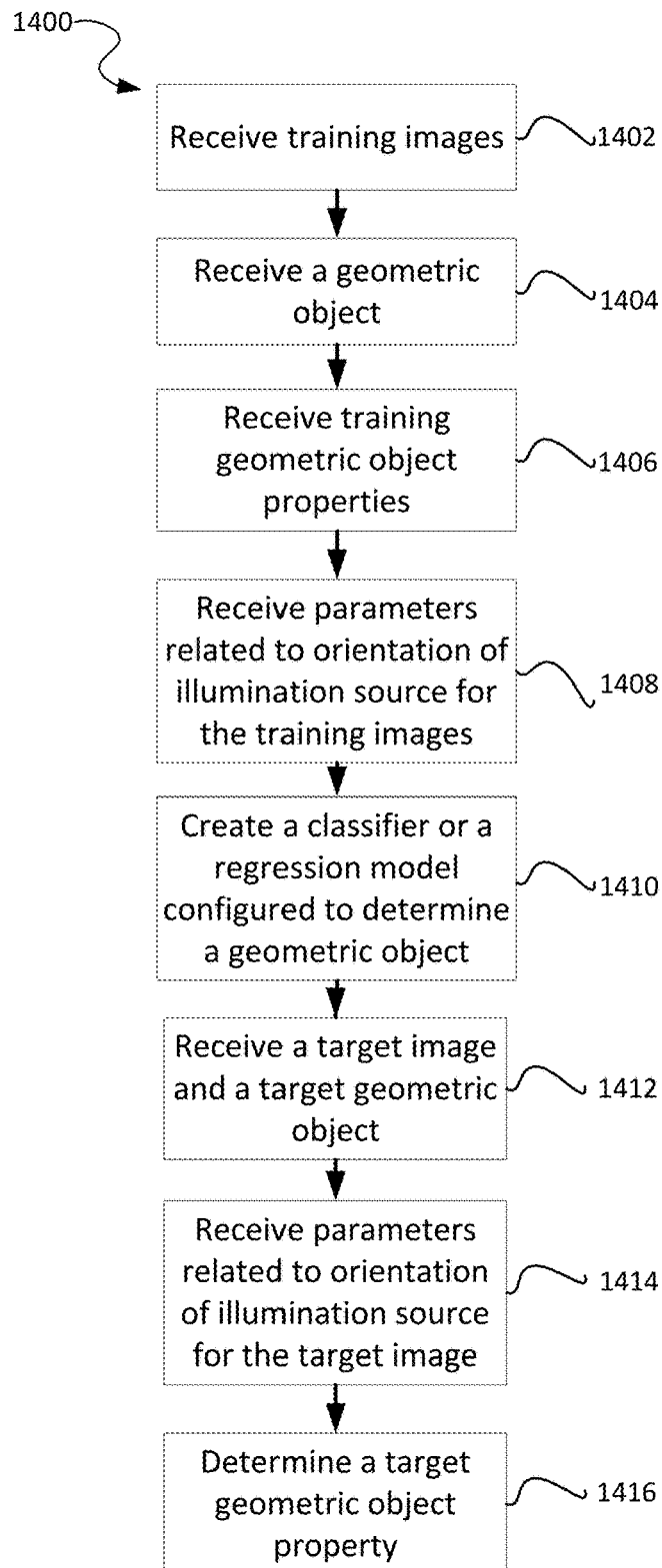
FIG. 14 illustrates a method for determining a geometric object property according to some embodiments of the present disclosure.

FIG. 14 illustrates method 1400 for determining a geometric object property according to some embodiments of the present disclosure. In some embodiments, method 1400 can be modified by, for example, having steps combined, divided, rearranged, changed, added, and/or removed. In some embodiments, method 1400 can be performed at an extractor.

At step 1402, training images can be received. In some embodiments, each of the training images is one of RGB, panchromatic, IR, UV, multi-spectral, hyperspectral, and/or any other suitable image. In some embodiments, these training images can be the same image type. For example, these training images are all of one of the following image types: RGB, IR, and UV.

At step 1404, a geometric object that corresponds to a portion of the training image(s) can be received. In some embodiments, a geometric object can be at least one of a point, a contour, an area, or a binary mask on a training image. In some embodiments, a geometric object can be other suitable portions of the training image. The geometric objects can be used to point to objects or regions of interest in the training images. For example, if a geometric object is an area on a training image, the geometric object can be used to point to the area that covers the boundary of a building of interest in the training image.

At step 1406, training geometric object properties can be received. Each geometric object property can identify a corresponding geometric object by, for example, identifying a property or attribute of the corresponding geometric object. In some embodiments, a geometric object property can be one of slope, pitch, dominant pitch, material, area, height, or volume. For example, if a corresponding geometric object is a roof, the geometric object property can identify the pitch of the roof.

At step 1408, parameters related to the orientation of an illumination source for the training images can be received. These parameters can include at least one of time, date, sun direction, sun position, latitude, longitude, object material, and/or any other suitable parameter or combination of parameters. In some embodiments, one or more of these parameters can provide information from the formation of the training images. For example, if a training image of a location is taken at 3:05 pm on Jul. 1, 2000, where the location's latitude is 64.2008 degrees North and the longitude is 149.4937 degrees West, one or more of the following can be used for training: 3:05 pm, Jul. 1, 2000, 64.2008 degrees North, and 149.4937 degrees West.

At step 1410, a classifier and/or a regression model can be created based on the training images, the geometric object, the training geometric object properties, and the parameters for the training images. The classifier and/or the regression model can be configured to determine a geometric object property for an image. In some embodiments, the classifier and/or the regression model can be created using a machine learning system, such as an ANN or a CNN as would be appreciated by one of ordinary skill in the art.

At step 1412, a target image and a target geometric object that corresponds to a portion of the target image can be received. In some embodiments, the target image is one of RGB, panchromatic, IR, UV, multi-spectral, hyperspectral, and/or any other suitable image. In some embodiments, the target image can be the same image type as the image type of the training images. For example, the image type of the target image and the training images are all RGB. In some embodiments, a target geometric object can be at least one of a point, a contour, an area, or a binary mask on a training image. In some embodiments, a target geometric object can be other suitable portions of the target image. The target geometric objects can be used to point to objects or regions of interest in the target image. For example, if a target geometric object is an area on the target image, the target geometric object can be used to point to the area that covers the boundary of a building of interest in the target image.

At step 1414, parameters related to the orientation of an illumination source for the target image can be received. These parameters can include at least one of time, date, sun direction, sun position, latitude, longitude, object material, and/or any other suitable parameter or combination of parameters. In some embodiments, these parameters for the target image can be the same type of parameters as for the training images. In some embodiments, one or more of these parameters can provide information from the formation of the target image.

At step 1416, a target geometric object property can be determined. The target geometric object property can identify a corresponding geometric object by, for example, identifying a property or attribute of the corresponding geometric object. In some embodiments, the target geometric object property can be one of slope, pitch, dominant pitch, material, area, height, or volume. For example, if the corresponding geometric object is a roof, the target geometric object property can identify the dominant pitch of the roof.

FIG. 34 illustrates an example of determining a geometric object property according to some embodiments of the present disclosure. RGB image 3402 can be an input that is provided to an extractor. In some embodiments, the extractor can implement one or more steps of method 1400 (FIG. 14). The extractor can detect that there is an object of interest 3406. In this example, object of interest 3406 is a pool. In some embodiments, object of interest 3406 can be outlined on a different background as shown in image 3404 than the original image (RGB image 3402). In some embodiments, the object of interest 3406 can be identified automatically by using a method, such as method 300 (FIG. 3). In other embodiments, the object of interest can be identified manually. The extractor can identify a target geometric object property for the object of interest 3406. For example, the extractor can determine that the area of the pool is 40 m$^2$ as shown in 3410. In some embodiments, the target geometric object property can be displayed on top of RGB image 3402 as shown in image 3408.

Deep Learning for Alignment

Machine Learning Multi-Modal Image Stack Registration

In the domain of recovering structure from remote or aerial imaging, it may be useful to align images of the same scene that are acquired under disparate illumination conditions, viewing geometries, and sensor types and configurations. Traditional computer vision methods use discrete feature matching, feature distance functions, and regularization components in an optimization that are explicitly and separately defined. Traditional computer vision methods also use information theoretic distances or rely on jointly estimating the transformation and an underlying structural model.

These traditional methods, however, are not scalable, can be inefficient, and can be inaccurate. For example, the traditional methods face difficulty in matching features across disparate bands as the feature appearance can be radically different (e.g., IR band UV band). As another example, the information theoretic distances described above do not scale well with a number of bands.

To solve these problems, systems and methods according to some embodiments of the present disclosure can apply machine learning, such as DNNs, to multi-modality image registration by learning the parameters of a geometric transformation that maps the space of one image into that of another. These systems and methods can extend to mapping one image set (of co-registered images) to another image set (of co-registered images). In some embodiments, the terms "channels," "bands," and "electronic magnetic spectrums" can be used interchangeably in the context of multi-modality.

Parcel alignment is one instance of multi-modal image stack registration. Parcel alignment techniques, for example, can align an RGB image with a binary parcel mask.

In some embodiments, the machine learning based parcel alignment method can be generalized to the problem of multi-modal image registration, where the binary parcel mask can be replaced with a set of co-registered geo-spatial images. In other embodiments, three or more multimodal image stacks can be simultaneously aligned to a common space (e.g., as in bundle adjustment or unbiased atlas formation). Co-registered complementary images can provide more information to support robust registration than single channel (mono-modal) images alone.

Vision Based Parcel Alignment

There are various databases of (1) geospatial imagery and sensory information, and (2) parcel boundary information, which can provide polygons describing property lines. It is generally useful to have good alignment when overlaying parcel boundary information over the top of imagery or other data layers. This is a known industry challenge for multiple reasons. For example, parcel data can come from disparate databases. As another example, boundaries can be defined and encoded in different ways or projected on different surfaces.

Imagery, computer vision, and machine learning can be used to derive hints of where parcel boundaries should line up, and then use these hints for alignment to find a best fit. For example, a method or system can identify probable roadways and seek a uniform setback. As another example, a method or system can identify fences, sidewalks or other typical real property boundaries, and use these for best fit alignment.

The final parcel boundaries can be estimated by using a robust estimator that minimizes joint distances from all hints, using a distortion model. Example techniques for transformation include similarity, perspective, thin-plate-splines, piece-wise affine, B-Splines, and higher order bivariate polynomials.

Machine Learning Based Parcel Alignment

Another approach to parcel based alignment involves learning the parameters of a transformation that maps the space of geospatial imagery (and optionally, co-registered sensory information such as IR) to the space of parcel boundaries (encoded as binary mask images) using machine learning methods including, but not limited to, CNNs. Once this transformation, which is represented by a set of parameters, is learned, the parcel boundaries can be mapped to the space of geospatial imagery. The learned transformation can be global or local, and can be recovered in a multi-scale fashion. A transformation can be global if the transformation is applied uniformly to every pixel within an image. A transformation can be local if different parameters of the transformation are used to define the transformation in different regions of the image. Multi-scale in this setting can refer to: (1) (in resolution) the use of a learned transformation at a course level of spatial resolution to initialize the estimation of a transformation at a finer level of spatial resolution; and/or (2) (in transformation parameter complexity) the use of learned transformation of a low order (e.g., translation) to initialize the estimation of a transformation of higher order (e.g., thin-plate-splines). Example techniques for transformation include similarity, perspective, thin-plate-splines, piece-wise affine, B-Splines, and higher order bivariate polynomials. These transformations can be characterized as sets of real-valued numbers.

Figure 15:
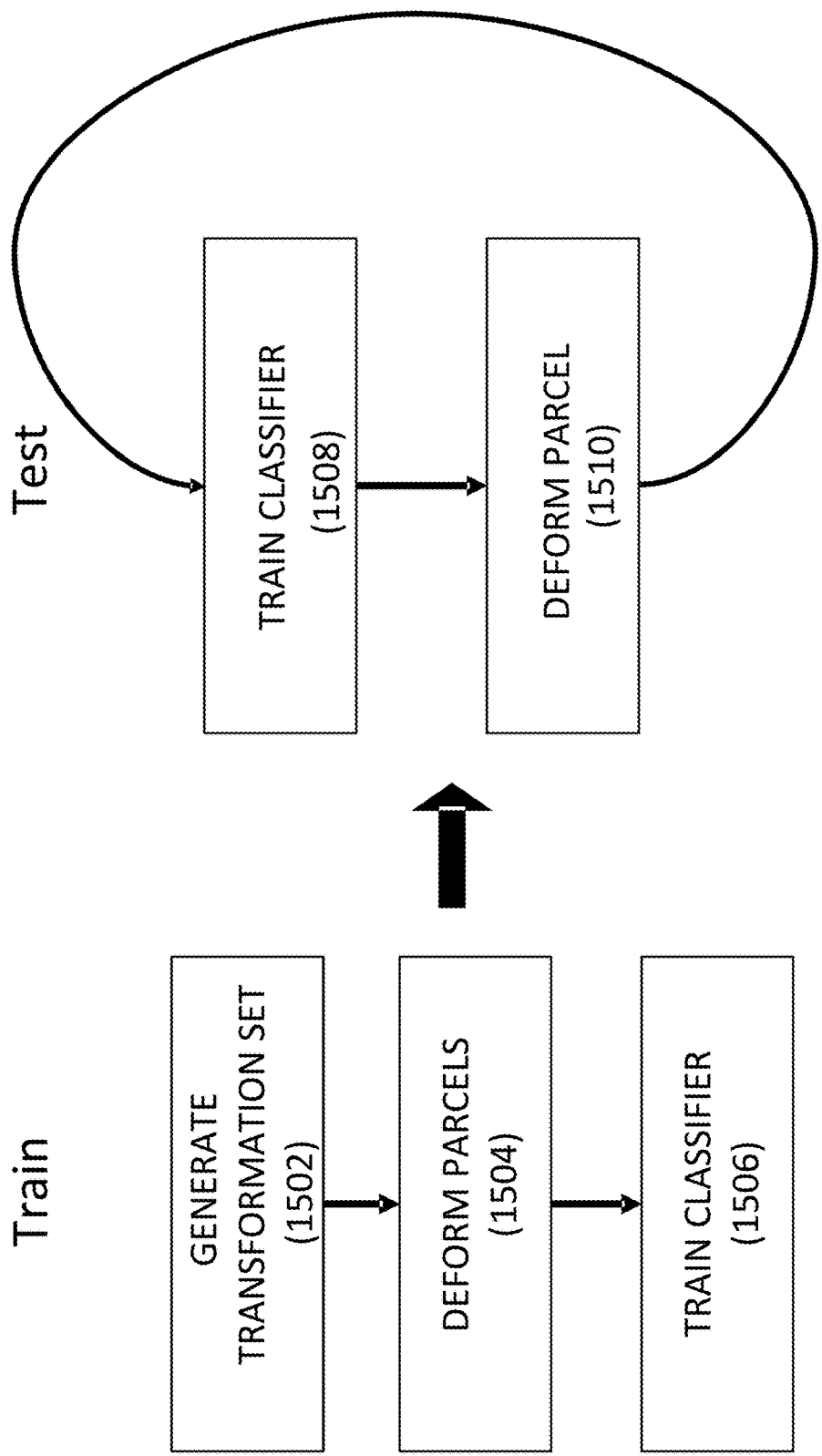
FIG. 15 illustrates a method for training a classifier model (e.g., a CNN) for learning the parameters of a transformation that maps the space of geospatial imagery to the space of parcel boundaries according to some embodiments of the present disclosure.

FIG. 15 illustrates a method of training a classifier model (e.g., a CNN) for learning the parameters of a transformation that maps the space of geospatial imagery to the space of parcel boundaries in accordance with certain embodiments of the present disclosure. Steps 1502, 1504, and 1506 can be executed during the training stage; steps 1508 and 1510 can be executed during the test stage. At step 1502, a pseudo-random set of transformation can be generated from a selected transformation group. At step 1504, for a given geospatial image and associated parcel data pair, each pseudo-random transformation can be applied to the given parcel data, thereby producing a family of deformed parcels all based off the original images. In some embodiments, this process can be repeated for many geospatial images and associated parcel data pairs.

In some embodiments, the input feature space to the classifier can be defined to be the set of geospatial images (and optionally, co-registered sensory information such as infrared) and deformed parcel data. The output label space can be defined to be the associated pseudo-random transformations. At step 1506, the classifier model can be trained using these input-output pairs from step 1504.

At the test stage, the trained CNN model can be first applied to geospatial imagery (and, optionally, co-registered sensory information) and an associated novel instance of parcel mask to produce the transformation (step 1508). At step 1510, using this transformation, the input parcel mask can be deformed or resampled to the space of the geospatial imagery. In some embodiments, the parcel mask alignment can be refined iteratively by deforming the parcel mask with the output parameters from the trained classifier and repeating process until convergence is achieved. Example tests of convergence can include classifier model cost function minimization, preset maximum number of iterations, and normed change in transformation parameters falls below a set threshold.

Machine Learning for Alignment Via Direct Estimation of Transformation Parameters In some embodiments, techniques described above related to parcel alignment can be generalized to alignment via direct estimation. Transformation parameters can be used for this purpose.

Figure 16:
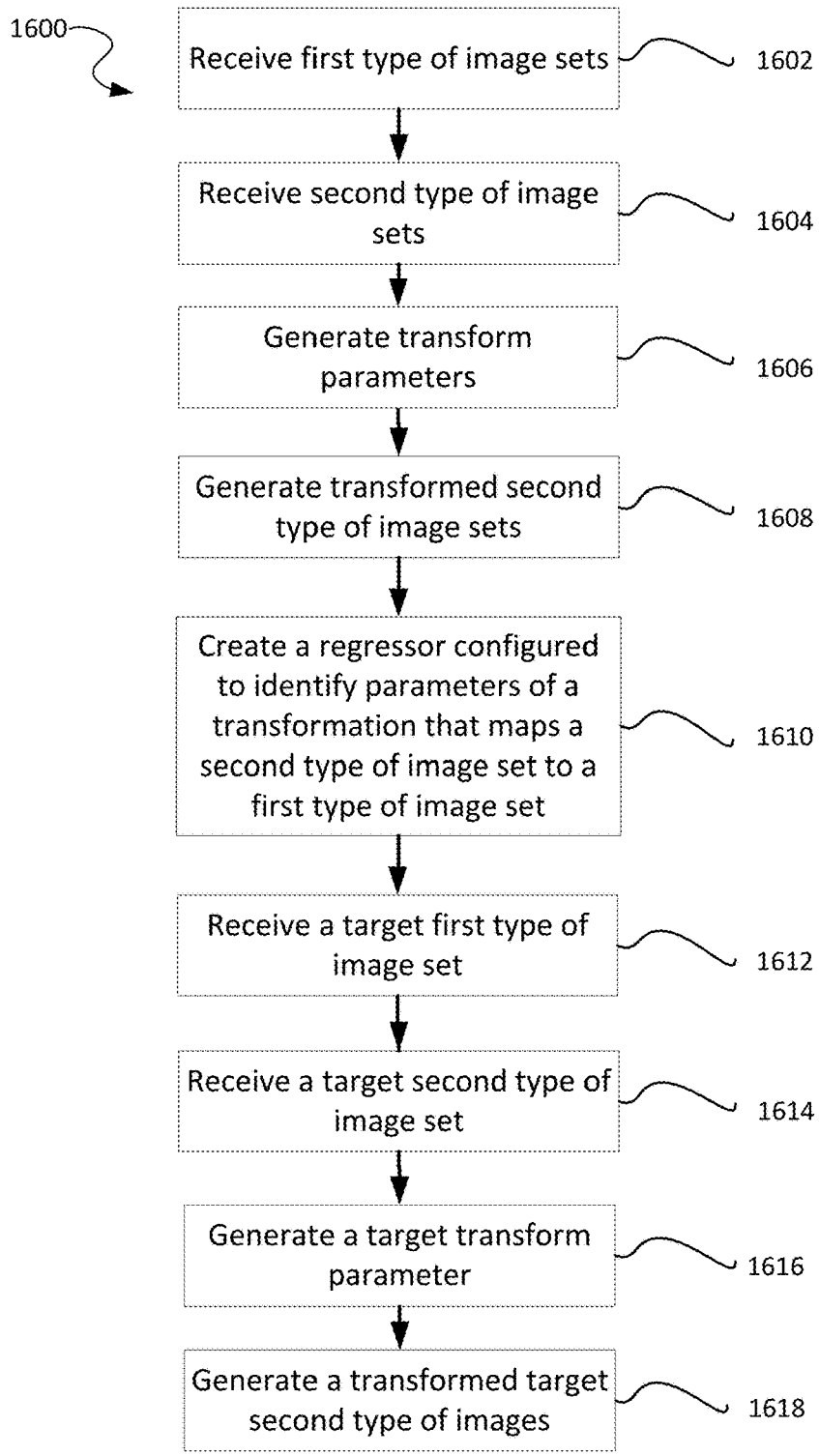
FIG. 16 illustrates a method for identifying parameters of a transformation that maps a first type of image set to a second type of image set according to some embodiments of the present disclosure.

FIG. 16 illustrates a method 1600 of identifying parameters of a transformation that maps a first type of image set to a second type of image set in accordance with some embodiments of the present disclosure. In some embodiments, method 1600 can be modified by, for example, having steps combined, divided, rearranged, changed, added, and/or removed. In some embodiments, method 1600 can be performed at an aligning device.

At step 1602, a first type of image sets can be received. In some embodiments, each first type of image set can include one or more first type of images. In some embodiments, one or more of the first type of image sets can include two or more co-registered images. Co-registered images can refer to aligned images, where specific pixel coordinates of those images represent the identical physical location (e.g., a location on the surface of the Earth, often expressed as a latitude and longitude). Consequently, these co-registered images can share, at least in part, the same scene. In some embodiments, one or more of the first type of image sets can include a fixed image stack of co-registered images of disparate bands in the electromagnetic spectrum. In some embodiments, the first type of image sets is one of RGB, panchromatic, IR, UV, multi-spectral, hyperspectral, and/or any other suitable image.

At step 1604, a second type of image sets can be received. In some embodiments, the number of the received first type of image sets can be the same as the number of the received second type of image sets. In some embodiments, each of the second type of image sets can be aligned with a different one of the first type of image sets. In some embodiments, one or more of the second type of image sets can include moving image stack of co-registered images of disparate bands in the electromagnetic spectrum. In some embodiments, the moving image stack can be co-registered with the fixed image stack from step 1602. In some embodiments, the second type can be a parcel map. In some embodiments, the second type of image sets is one of RGB, panchromatic, IR, UV, multi-spectral, hyperspectral, and/or any other suitable image.

At step 1606, transform parameters can be generated. In some embodiments, one or more of these transform parameters are generated using a computer randomizer that can produce pseudo random data. In some embodiments, the number and/or type of generated transform parameters can be customized. In some embodiments, the number and/or type of generated transform parameters can be either statically or dynamically set.

At step 1608, the transformed second type of image sets can be generated. In some embodiments, these transformed second type of image sets can be generated for each of the first type of image sets, where each of the transformed second type of image sets for each of the first type of image sets can be generated by transforming a respective one of the second type of image sets using a different one of the transform parameters. For example, the moving image stack from step 1604 can be deformed based on the generated transform parameters from step 1606. In some embodiments, this transformation results in the total number of transformed second type of image sets that equals the number of the second type of image sets multiplied by the number of transform parameters. In some embodiments, the operations in step 1608 can produce the ground truth.

At step 1610, a regressor can be created based on the first type of image sets, the transform parameters, and the transformed second type of image sets. In some embodiments, the regressor can be trained to learn a transformation as would be appreciated by one of ordinary skill in the art. The regressor can be configured, given a first type of image set and a second type of image set, to identify parameters of a transformation that maps the second type of image set to the first type of image set.

At step 1612, a target first type of image set can be received. In some embodiments, the target first type of image set is one of RGB, panchromatic, IR, UV, multi-spectral, hyperspectral, and/or any other suitable image.

At step 1614, a target second type of image set can be received. In some embodiments, the target second type of image set is one of RGB, panchromatic, IR, UV, multi-spectral, hyperspectral, and/or any other suitable image.

At step 1616, a target transform parameter can be generated using the regressor based on the received target first type of image set and the received target second type of image set.

At step 1618, a transformed target second type of images can be generated by transforming the target second type of image set using the target transform parameters so that the transformed target second type of image set can be aligned with the target first type of image set.

Convergence in transformation between multiple images or image sets can depend on the amount of alignment between them. A condition for meeting convergence in transformation can be set statically or dynamically. For example, a condition can be set such that convergence in transformation is met if two images align for more than 80% (or any other suitable percentage) of their pixels. In some embodiments, a method or system can determine whether convergence in transformation is met. If convergence is not met, steps 1614, 1616, and/or 1618 can be repeated. In some embodiments, these steps can be repeated until convergence in transformation is met.

The transform parameters and the target transform parameter can be generated and/or used for various transformation techniques, such as translation, similarity, perspective, thin-plate-splines, piece-wise affine, B-spline, and high-order bivariate polynomials. In some embodiments, all the transform parameters and the target transform parameter can use the same technique (e.g., one of the above listed technique).

Figure 17:
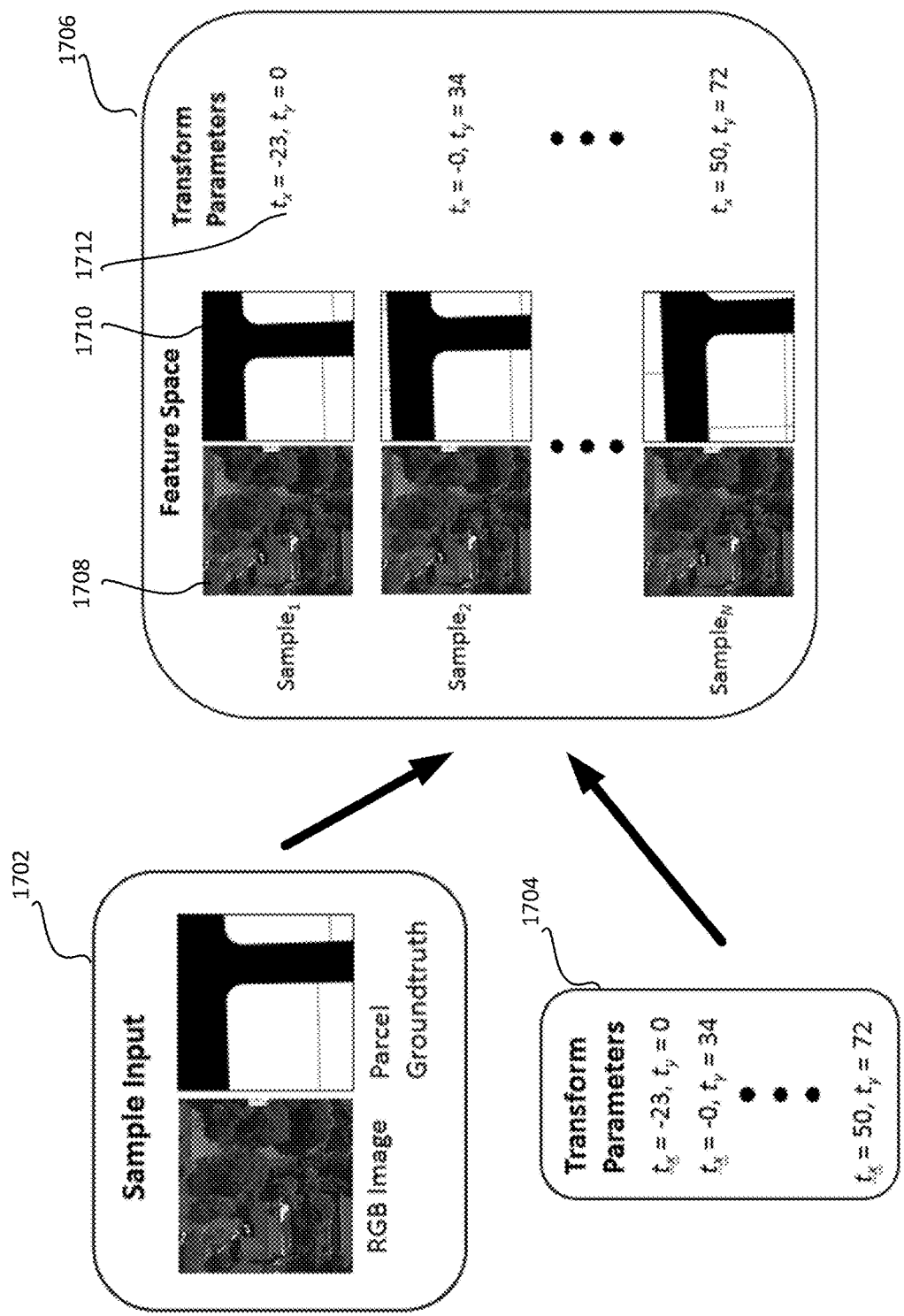
FIG. 17 illustrates a training example that uses sample input, transform parameters, and pairs of feature space and transform parameters according to some embodiments of the present disclosure.

FIG. 17 illustrates a training example that uses a sample input 1702, transform parameters 1704, and pairs of feature space and transform parameters 1706. Sample input 1702 can include an RGB image (a first type of image set) and a parcel ground truth image (a second type of image set). Sample input 1702 can represent example types of data that can be used at steps 1602 and 1604 (FIG. 16). In some embodiments, an aligning device can generate transform parameters 1704. In some embodiments, the aligning device can generate one or more of these transform parameters by using a computer randomizer that can produce pseudo random data. In some embodiments, the number and/or type of generated transform parameters can be customized. In some embodiments, the number and/or type of generated transform parameters can be either statically or dynamically set. This set of parameters can represent an example type of transform parameters generated at step 1606 (FIG. 16). In 1706, a feature space can have a number of sample pairs of images. The first image in a pair (e.g., image 1708) can represent an RGB image, while the second image (e.g., image 1710) in the pair can represent a parcel ground truth image that has been transformed using one of the transform parameters (e.g., transform parameters 1712). These sample pairs can be examples of transformed second type of image sets from steps 1608 (FIG. 16).

Weighting of Low Resolution Channels with High Resolution Asynchronous Overlay

There are certain use cases for which one may have multiple sets of geospatial data, none of which are sufficient to answer a given question. But once overlaid, aligned, and used to inform one another, accurate inferences can be drawn.

For example, one may want to determine roof material, and in particular, distinguish wood shingles from brown asphalt shingles or other materials. One may have access to accurate, high resolution (e.g., 30 cm GSD), low cost imagery in RGB. This imagery can be used to locate and/or identify clean unobscured patches of roof. However, at this resolution brown asphalt shingles may be indistinguishable from brown wood shake shingles in RGB. Further, one may have access to low resolution (e.g., 1.5 m GSD) hyperspectral imagery. This imagery can differentiate between asphalt and wood based on hyperspectral reflectance, but this low resolution may be unable to determine whether a patch of roof is obscured (e.g., with a solar panel, skylight, shadow, etc.) and likely to give an inaccurate reading.

By overlaying the RGB (for accurate masking in the x-y dimensions) and hyperspectral (to obtain signal in the relevant wavelength), one can make an accurate estimate in cases such as the example above. These two image sets may be obtained from different platforms at different times. For example, hyperspectral data from a satellite can be received on a given day and RGB data can be received from an airplane at a later date. The imagery can be aligned based on coordinates, where the images can be assumed to be of the same object.

Another example can be overlaying a DEM, which is accurate in z-dimension (height), but must be accurately aligned in x-y using higher resolution RGB imagery.

Figure 19A:
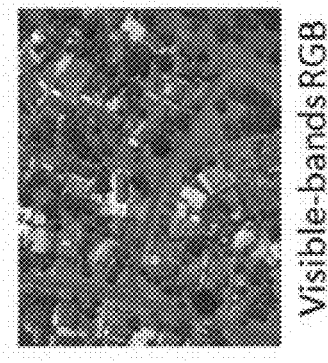
FIGS. 19A and 19B illustrate an example of an RGB image and corresponding images of different multi-spectral bands.
Figure 19B:
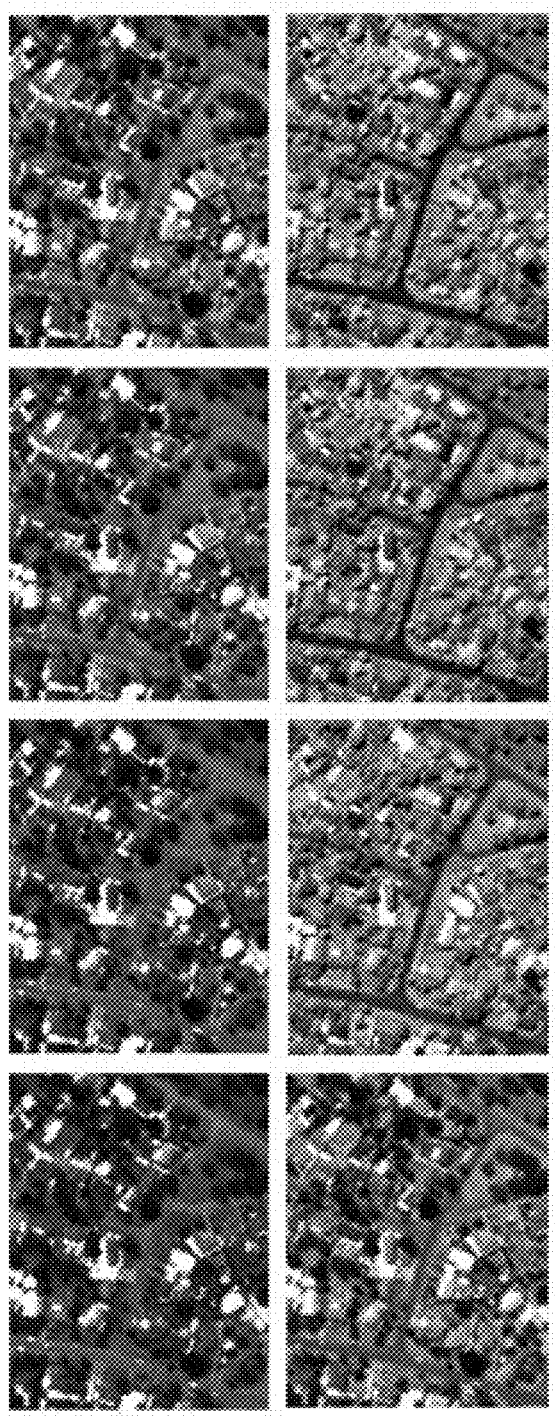

FIG. 19A illustrates an example RGB image, which is within visible bands. FIG. 19B illustrates eight example images of different multi-spectral bands that are associated with the RGB image in FIG. 19A. Each of these example images corresponds to light response in discrete bands in the electromagnetic spectrum. Analogously, the red, green, blue bands are sensitive to light centered near 645 nm, 555n, and 470 nm respectively. Two or more images of different multi-spectral bands can be combined to classify ground material (e.g., vegetation and roof types).

Mixed Image Resolution/Modality Alignment

Systems and methods in accordance with the present disclosure can align two or more raster images with disparate modalities, such as resolutions, bands, and/or electronic magnetic spectrums. In some embodiments, machine learning is used for estimating corresponding key points across images of disparate modalities and identify transform parameters using these key points. Using these transform parameters, two or more images with disparate modalities can be aligned. Once they are aligned, they can be combined to draw inferences about the scene they describe. These systems and methods solve problems in traditional methods, where hand crafting matching key-point feature extraction across multiple modalities (e.g., IR band vs. UV band) is a difficult task. These traditional methods often rely on sparsely populated joint distribution of image intensities or estimation of underlying structure, which can be inaccurate and are not scalable.

Figure 18:
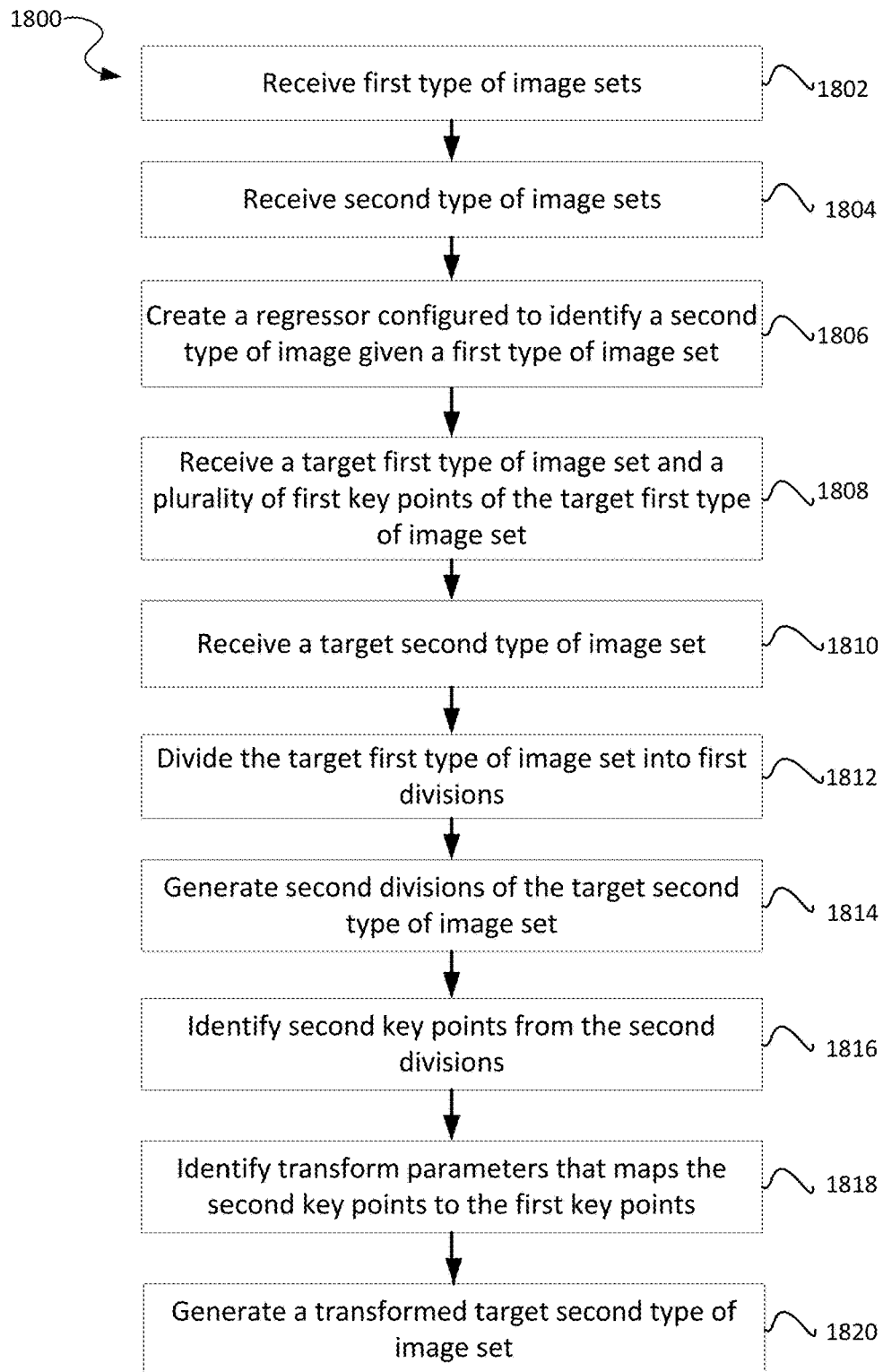
FIG. 18 illustrates a method of aligning images based on identifying a second type of image set given a first type of image set according to some embodiments of the present disclosures.

FIG. 18 illustrates a method 1800 of aligning images based on identifying a second type of image set given a first type of image set in accordance with some embodiments of the present disclosure. In some embodiments, method 1800 can be modified by, for example, having steps combined, divided, rearranged, changed, added, and/or removed. In some embodiments, method 1800 can be performed at an aligning device.

At step 1802, a first type of image sets can be received. In some embodiments, each first type of image set can include one or more first type of images. In some embodiments, one or more of the first type of image sets can include two or more co-registered images. In some embodiments, one or more of the first type of image sets can include a fixed image stack of co-registered images of disparate bands in the electromagnetic spectrum. In some embodiments, the first type of image sets is one of RGB, panchromatic, IR, UV, multi-spectral, hyperspectral, and/or any other suitable image.

At step 1804, a second type of image sets can be received. In some embodiments, the number of the received second type of image sets can be the same as the number of the received first type of image sets. In some embodiments, each of the second type of image sets can be aligned with a different one of the first type of image sets. In some embodiments, one or more of the second type of image sets can include moving image stack of co-registered images of disparate bands in the electromagnetic spectrum. In some embodiments, the moving image stack can be co-registered with the fixed image stack from step 1802. In some embodiments, the second type of image sets is one of RGB, panchromatic, IR, UV, multi-spectral, hyperspectral, and/or any other suitable image.

At step 1806, a regressor can be created based on the first type of image sets and the second type of image sets. In some embodiments, the regressor can be created based on learning an association between image stacks of the first type and the image stacks of the second type. The regressor can be configured, given a first type of image set, to identify a second type of image set.

At step 1808, a target first type of image set and first key points of the first type of image set can be received. In some embodiments, one or more of the first key points can be objects that have been identified manually, semi-manually, or automatically. In some embodiments, an object detector, such as the one described in FIG. 3, can be used to detect one or more of the first key points. In some embodiments, the target first type of image set is one of RGB, panchromatic, IR, UV, multi-spectral, hyperspectral, and/or any other suitable image.

At step 1810, a target second type of image set can be received. In some embodiments, the target second type of image set is one of RGB, panchromatic, IR, UV, multi-spectral, hyperspectral, and/or any other suitable image.

At step 1812, the target first type of image set can be divided into first divisions. In some embodiments, each of the first divisions can be centered around a different one of the first key points.

At step 1814, second divisions of the target second type of image set can be generated based on the first divisions. At step 1816, second key points can be identified, where each second key point is from a different division of the second divisions. In some embodiments, an object detector, such as the one described in FIG. 3, can be used to detect one or more of the second key points.

At step 1818, transform parameters can be identified. These transform parameters can map the second key points to the first key points. At step 1820, a transformed target second type of image set can be generated by transforming the target second type of image set using the transform parameter so that the transformed target second type of image set is aligned with the target first type of image set. For example, the first key points may be associated with roofs in the target first type of images, and the second key points may be associated with roofs in the target second type of images. To map and align each roof from the target first type of image set to the corresponding roof from the target second type of image set, the target second type of images can be transformed using the transform parameters. In some embodiments, these transform parameters are similar in the format as example target parameters 1704 shown in FIG. 17.

Convergence in transformation between multiple images or image sets can depend on the amount of alignment between them. A condition for meeting convergence in transformation can be set statically or dynamically. For example, a condition can be set such that convergence in transformation is met if two images align for more than 80% (or any other suitable percentage) of their pixels. In some embodiments, a method or system can determine whether convergence in transformation is met. If convergence is not met, a different transform parameter can be selected and used for transforming the target second type of image set. In some embodiments, the process of using a different transform parameters to transform the target second type of image set can be repeated until convergence is met.

The transform parameters can be generated and/or used for various transformation techniques, such as translation, similarity, perspective, thin-plate-splines, piece-wise affine, B-spline, and high-order bivariate polynomials. In some embodiments, all the transform parameters can use the same technique (e.g., one of the above-listed techniques).

Geospatial Change Detection

It can be useful and valuable to flag some geospatial changes as of interest or not of interest. This can be a laborious process when executed manually. Examples of geospatial changes that may be of interest include moss on roof, shingle loss, hurricane ripping off roof, additions to existing structures, and introduction of new structures. Examples of geospatial changes that may not be of interest include snow on roof and seasonal foliage present on roof.

In some embodiments, a classifier can be trained to take an image and determine whether there has been a change. If there has been a change, the classifier can further determine whether the change is significant or not significant. In some embodiments, object-oriented deep learning can be used for change detection. For example, the presence of a pool can be determined. As another example, areas of material change can be identified. In some embodiments, parameter changes can be reported.

In some embodiments, a list of changes that are of interest can be created. For example, such a list can include information on whether someone can build an addition, can cut a tree, the presence of a pool, and the presence of a patio.

Humans can look at images to determine whether a change has occurred. A neural network in accordance with some embodiments is a structural form used in deep learning that can know, for example, whether the leaves on a tree is a change of consequence. For example, if information related to whether the leaves have fallen off the tree is of interest, the leaves on the tree can be a change of consequence. In some embodiments, crowd source can be utilized to generate ground-truth labeling of objects.

Tree Size Analyzer/Estimator

In some embodiments, a tree size analyzer or estimator can use geospatial imagery combined with other data sets to create information of interest. For example, given satellite imagery (e.g., 12" GSD RGB, as well as hyperspectral), a tree's diameter and the tree type can be estimated by using the geometry and texture to guess the tree type. Once an estimate of diameter and type are known, a full tree model can be developed based on a separate database of tree growth models. For example, an evergreen tree has a certain shape, meaning that a given diameter can be predictive of a certain height, trunk diameter, bough diameter, and/or mass.

Information from the tree analyzer can be useful, for example, in estimating the potential damage related to a tree falling on a nearby structure.

Best Guess of Occluded Polygons

Figure 31:
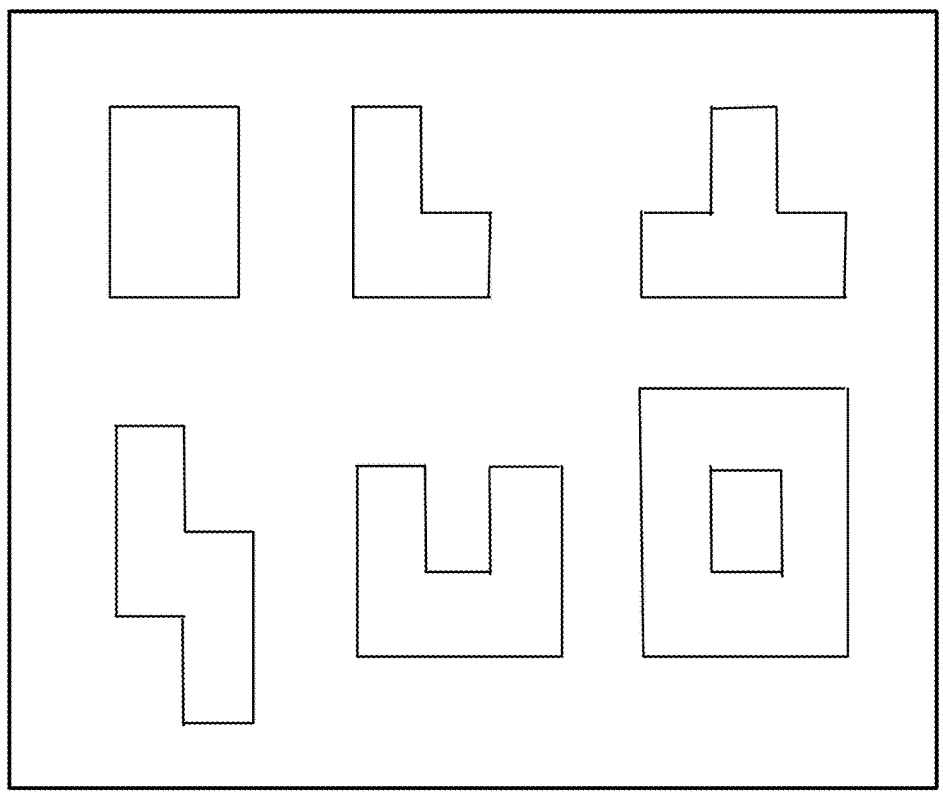
FIG. 31 illustrates an example of a library of template shapes according to some embodiments of the present disclosure.

It can be useful and valuable to estimate the underlying shape of an occluded polygon. For example, in a nadir image, the shape of the corner of a house can be estimated even if occluded by an overhanging tree. In this context, a dictionary or library of template shapes to be matched to partially-defined polygons can be maintained. FIG. 31 illustrates an example of a library of template shapes. The different shapes within the dictionary or library can capture the expected modes of variation in the occluded polygons to be estimated. This can be solved with several approaches. One approach can involve the following five steps: (1) segment regions (e.g., houses, trees); (2) fit polygons to segmented regions; (3) where house regions are adjacent to tree regions, assume occluded house regions may underlay the tree regions; (4) use intersection of rectilinear borders of house regions to predict hidden vertices; and (5) construct new house polygon using rectilinear edges and vertices including hidden vertices. Another approach can involve the following three steps: (1) learn or define a set of likely polygons or polygon rules (e.g., rectilinear, 90 degree vertices, etc.); (2) segment house and tree regions; and (3) fit polygon from defined library based on segmentation, and regarding tree segments as uncertain.

Autoencoders for Satellite and Aerial Imagery

Figure 32A:
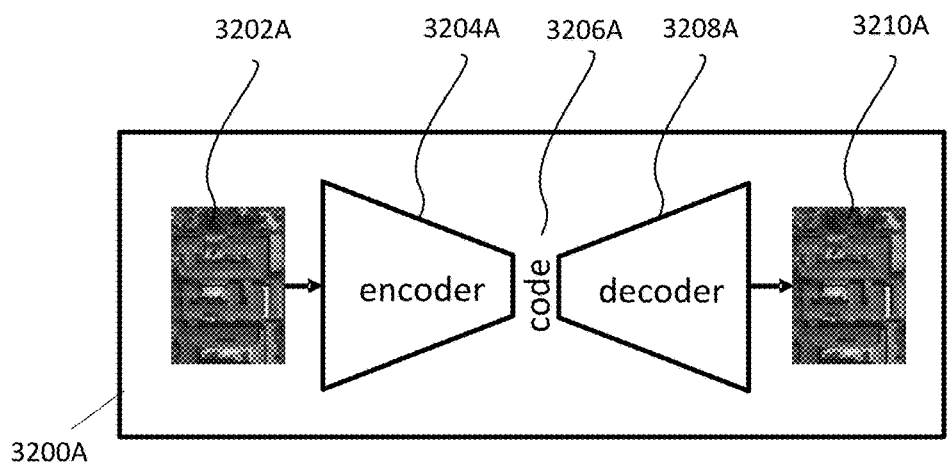
FIGS. 32A and 32B illustrate an application of autoencoders to multiple machine learning tasks according to some embodiments of the present disclosure.
Figure 32B:
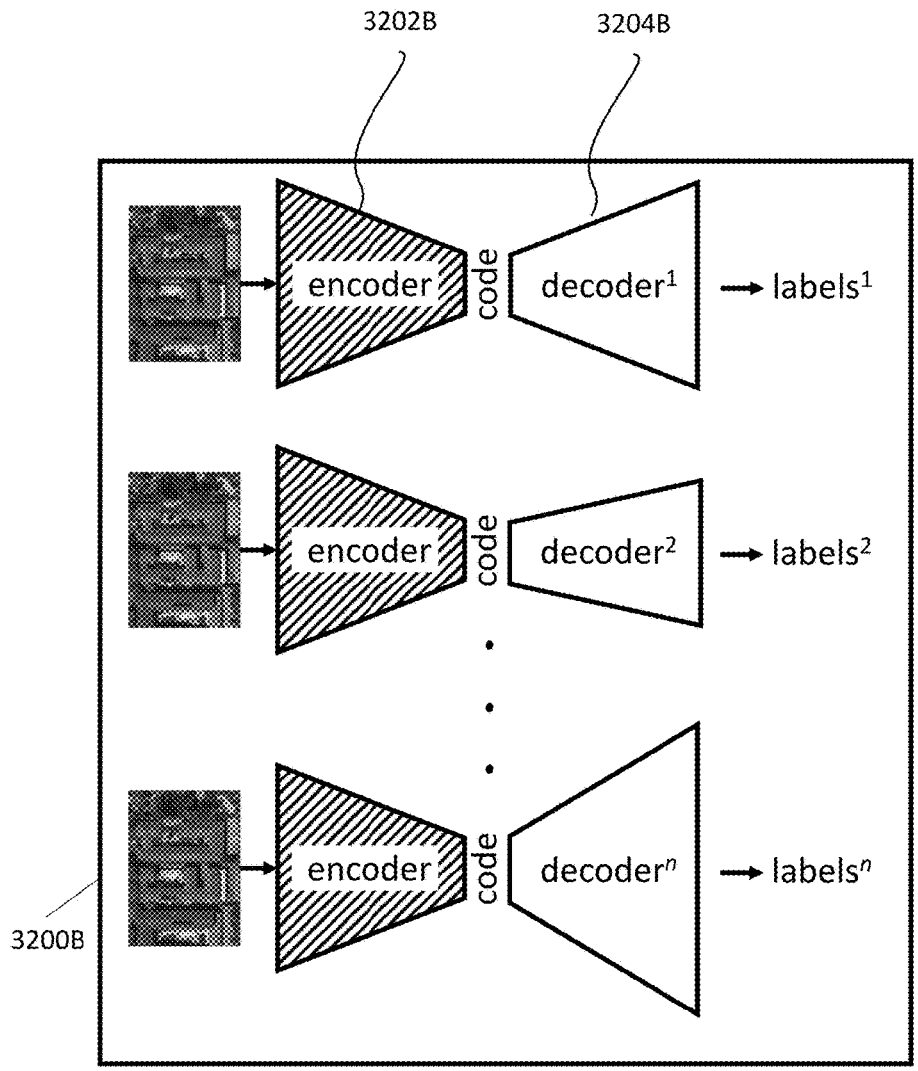

An autoencoder in an artificial neural network can be used to learn a representation (or an encoding) for a set of data (often digital images). It can be viewed as a generative model in that images can be reconstructed from this representation. FIGS. 32A-B illustrate an application of autoencoders to multiple machine learning tasks in accordance with some embodiments of the present disclosure. Block 3200A illustrates that the structure of an autoencoder is like an hourglass with input images (e.g., image 3202A) on one end fed through the first half of the network (e.g., the encoder stage 3204A) to the neck (e.g., code 3206A) and then through the second half of the network (e.g., the decoder stage 3208A) producing the same image (e.g., image 3210A). In some embodiments, autoencoders can be trained to extract the essence of aerial and satellite images that serves to remove redundant information and noise (compression) as well as capture low-level features that characterize this type imagery.

In some embodiments, an autoencoder (e.g., the encoder 3202B) can be first trained. Subsequently, the resulting encoder half can be used to train a family of networks each for a different purpose (e.g., roof pixel classification) as illustrated in block 3200B. Decoder 3204B can be used to decode any code encoded by encoder 3202B to generate labels. This approach has additional advantages including (1) training the autoencoder can be fast since ground truth is, by construction, readily available (e.g., any geospatial imagery will) and (2) training newly designed networks are easier since the encoder stage is performed only once.

Geospatial Image Label Transfer

When trying to automatically identify objects from images using learning algorithms, it can be advantageous to have labeled images and/or labeled attributes. Separately, acquired images require tradeoffs between resolution, coverage, cost and frequency.

In the case of geospatial images, multiple sets of images can share common, known locations. The images of a common location can be identified via their GIS metadata, and the labels can be shared or transferred. This can be valuable in the following example case: (1) costly high resolution images are gathered and labeled by hand; and (2) these labels are transferred to satellite imagery which is of poorer pixel resolution and could not be labeled by hand for certain features (e.g., roof material). But where there remains a sufficient signal in the data, a useful classifier can still be trained to recognize the attribute in satellite data Alternatively, this can also be called geospatial image registration and masking. This can be relevant when there are multiple geospatial data sets that cover the same physical area (e.g., 2 sets of images, both of which can be geo-registered and overlap the same area on the surface of the earth). The core concept is to use one of the data sets to define areas of intersect (e.g., using high resolution RGB imagery to find a clean spot on a rooftop), and a second dataset to extract additional information about the region of interest (e.g., information from a hyperspectral image in the region of interest in order to determine roof material type, which could not be known from the RGB data alone). This can also be used, for example, by getting a digital elevation map from one image source, and a shadow map from a second source, then using the digital elevation map to extract height information from the shadows mapped onto the digital elevation map surface.

Distinguishing Roof Types

It can be useful and valuable to distinguish roof material attributes (e.g., wood vs tile shingles), as well as roof age at scale. Non-optimal data, such as low resolution satellite images, can be used. A given material can behave in a certain way with respect to reflectance, given known parameters (e.g., sun spectrum/angle/intensity, camera angles), and desired parameters (e.g., age, material). The desired parameters can be extracted from the image based on the hyperspectral data (outside visible range). Calibration can be performed based on (1) ground truth, and (2) an image classifier.

Additionally, the image data can be made more accurate by properly selecting and sampling uniform aspects of the roof (e.g., on a common plane; avoiding edges; devoid of shadows, roof debris, and structures such as A/C units or skylights).

From nadir imagery, relative geometry of roof joints (where facets of the roof meet along a ridge) can provide cues for roof geometry. Using a texture-based edge detector, a skeleton of the roof projection can be constructed (e.g., rejecting solar panel roof boundaries). More information can be gathered from a medial axis representation estimated from the roof boundary using traditional techniques (or vice versa). The relative geometry of roof joints (e.g., encoded using histograms of number of angles at an intersection of ridges, and perhaps lengths of incident edges) can characterize roof type and complexity.

Roof Pitch from Drone Aerial Imagery

Classical computer vision methods can be applied to recovering roof pitch from aerial images (e.g., from airplanes and drones), global positioning systems (GPS), inertial measurement units (IMUs), and gyroscopes. These methods include a range of techniques from recovering depth from stereo to the more sophisticated structure from motion (SFM) where bundle adjustment and graph optimization methods are used with images acquired around and above roofs to reconstruct shape. In all methods, the optimization process is constrained to planar surfaces, suitable for structures of the built environment.

Roof footprints localized on the acquired imagery, or mapped to the same from another geospatial imagery source, can be used to identify facet (planar surfaces) to roof associations. Estimating the dihedral angles made by these facets and a horizontal ground plane produce the roof pitch.

Roof Pitch from Shading

From a 3D roof model, the calculation of pitch/slope of a roof facet immediately follows from geometry. In this method, a 3D roof model is fitted using both spatial and appearance information. Shading information can be used as a cue for form, position, and depth (in particular, roof facet orientation) and depends on material properties. Non-limiting examples of shading model components include: ambient reflection, diffuse (Lambertian) reflection, specular reflection, etc. Given a sufficient number of input image channels (e.g., RGB, panchromatic, IR, UV, multi-spectral, hyperspectral, etc.), roof facet orientation and intrinsic color/texture (proxy for material) can be estimated using a shading model.

In another embodiment, the parameter space of this model (e.g., intrinsic color, facet orientation, etc.) can be reduced using any combination of (but not limited to) the following simplifying assumptions: (1) roof ridge lines are parallel to horizontal ground plane; (2) neighboring roof facets incident to the same ridge line are symmetric in the sense that they have the same pitch/slope; and/or (3) the space of allowable roof pitch/slope is limited to a discrete set of common values. Non-limiting examples of parameters include values of run/rise that are 12/1, 12/2, 12/3, etc., where the run value can be defined to be the horizontal length, and the rise value can be defined to be the vertical length of a general right triangle, whose hypotenuse is the roof surface. The roof surface can be used to calculate the roof pitch or slope.

Condition Estimation

In some embodiments, systems and methods can be utilized to estimate conditions of a road, parcel, and/or roof (e.g., effective age).

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. Unless otherwise noted, examples provided in this disclosure are not limiting.

As such, those skilled in the art will appreciate that the conception, upon which this disclosure is based, may readily be utilized as a basis for the designing of other structures, systems and methods for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

For example, a device, such as an object detector or an aligning device, can cover implementations in a single hardware/software device or in multiple hardware/software devices. In some embodiments, each of the multiple hardware/software devices can process different parts of the device functionality.

As another example, machine learning can cover various deep learning architectures, including a deep neural network (DNN), a convolutional neural network (CNN), a deep belief network (DBN), and a recurrent neural network (RNN). Moreover, a reference to a particular architecture does not limit the given application to that particular architecture. Systems and methods in accordance with embodiments of this disclosure can be applied to any type of machine learning or deep learning architecture.

Yet in another example, unless otherwise noted, the term image can cover any kind of image from any detectable band of the electromagnetic spectrum, including IR, UV, panchromatic, multi-spectral, or hyperspectral images. An image can be RGB, grayscale, or black and white. An image can be any resolution, including high resolution and low resolution. An image may be taken by various methods and/or devices, including satellites, drones, robots, stationary or moving camera or sensor devices, and humans using a camera or sensor device. An image may be taken as a digital image or as an analog image. An image may have been originated as an analog image but later converted to a digital format. An image can indicate a 2D array of pixels with one or more mutually co-registered channels or bands per pixel, summarizing the same area. Non-limiting examples include (1) a 1-channel image that can be a panchromatic image, a grayscale image, a label map, a binary mask, or any other suitable image with one channel; (2) a 3-channel image that can be an RGB image, a blue-green-red (BGR) image, or any other suitable image with three channels; (3) a 4-channel image that can be an RGB and IR image or any other suitable image with four channels; and (4) a 8-channel image that can be an 8-band multi-spectral image. Generally, the channels can represent different bands of the electromagnetic spectrum, to which a detector is sensitive.

What is claimed is:

1. A method of aligning images, comprising:
   receiving, at an aligning device, N first type of image sets, wherein N>1, wherein each of the N first type of image sets includes one or more first type of images;
   receiving, at the aligning device, N second type of image sets, wherein each of the N second type of image sets includes different one or more second type of images, wherein each of the N second type of image sets is aligned with a different one of the N first type of image sets;
   generating, at the aligning device, M transform parameters, wherein M>1;
   generating, at the aligning device, M transformed second type of image sets for each of the N first type of image sets so that there are N*M total transformed second type of image sets, wherein each of the M transformed second type of image sets for each of the N first type of image sets is generated by transforming a respective one of the N second type of image sets using a different one of the M transform parameters;
   creating, at the aligning device, a regressor configured to identify parameters of a transformation that maps a second type of image set to a first type of image set, wherein the regressor is created based on the N first type of image sets, the M transform parameters, and the N*M total transformed second type of image sets;
   receiving, at the aligning device, a target first type of image set and a target second type of image set;
   generating, at the aligning device using the regressor, a target transform parameter based on the target first type of image set and the target second type of image set; and
   generating, at the aligning device, a transformed target second type of image set by transforming the target second type of image set using the target transform parameter so that the transformed target second type of image set is aligned with the target first type of image set.

2. The method of claim 1, wherein the first type of images are red-green-blue images, and the second type of images are parcel maps.

3. The method of claim 1, wherein each image in the first type of image sets, the second type of image sets, the target first type of image set, and the target second type of image set is one of a red-green-blue, panchromatic, infrared, ultraviolet, multi-spectral, or hyperspectral image.

4. The method of claim 1 further comprising determining, at the aligning device, whether the target transform parameter results in convergence.

5. The method of claim 4 further comprising, if it is determined that the target transform parameter does not result in convergence, performing the following steps until convergence: (1) generating, at the aligning device, a new target transform parameter; and (2) determining, at the aligning device, whether the new target transform parameter results in convergence.

6. The method of claim 1, wherein one or more of the N first type of image sets includes a plurality of co-registered first type of images.

7. The method of claim 1, wherein the transform parameters and the target transform parameter are for at least one of translation, similarity, perspective, thin-plate-splines, piece-wise affine, B-spline, or high-order bivariate polynomials.

* * * * *